US012712769B2

(12) United States Patent
MolavianJazi et al.

(10) Patent No.: US 12,712,769 B2
(45) Date of Patent: Aug. 18, 2026

(54) ON-DEMAND SYNCHRONIZATION AND COMMUNICATION

(71) Applicant: Samsung Electronics Co., Ltd., Suwon-si (KR)

(72) Inventors: Ebrahim MolavianJazi, San Jose, CA (US); Jeongho Jeon, San Jose, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 19/014,200

(22) Filed: Jan. 8, 2025

(65) Prior Publication Data

US 2025/0247277 A1 Jul. 31, 2025

Related U.S. Application Data

(60) Provisional application No. 63/626,930, filed on Jan. 30, 2024.

(51) Int. Cl.

*H04L 27/02* (2006.01)
*H04W 56/00* (2009.01)
*H04W 74/0833* (2024.01)

(52) U.S. Cl.

CPC ........... *H04L 27/02* (2013.01); *H04W 56/001* (2013.01); *H04W 74/0833* (2013.01)

(58) Field of Classification Search

CPC ......... H04L 27/02; H04L 27/10; H04L 27/18; H04W 56/001; H04W 56/0025; H04W 74/0833; H04W 74/0866; H04W 74/0891

(Continued)

(56) References Cited

U.S. PATENT DOCUMENTS

2019/0200296 A1 6/2019 Liu et al.
2020/0059862 A1 2/2020 Wong et al.

(Continued)

FOREIGN PATENT DOCUMENTS

EP 4228191 A1 8/2023
WO 2024016169 A1 1/2024

OTHER PUBLICATIONS

"3rd Generation Partnership Project; Technical Specification Group Radio Access Network; NR; Physical channels and modulation (Release 18) ", 3GPP TS 38.211 V18.1.0, Dec. 2023, 159 pages.

(Continued)

*Primary Examiner* — Young T. Tse

(57) ABSTRACT

Apparatuses and methods for on-demand synchronization and communication. A method for an electronic device includes identifying an identity (ID) for the electronic device or an ID for a group of electronic devices that includes the electronic device and receiving a first trigger in a monitoring occasion (MO) from a set of MOs. The first trigger includes a signal for timing acquisition that comprises a predetermined sequence based on an on-off-keying (OOK) waveform and a physical channel based on the OOK waveform. The physical channel is after the signal. The method further includes determining, based on the first trigger, indication for the ID for the electronic device or the ID for the group of electronic devices and a paging cause and transmitting or receiving a number of signals or channels based on the paging cause.

20 Claims, 19 Drawing Sheets

(58) Field of Classification Search
USPC ....... 375/259, 260, 268, 269, 272, 279, 356; 370/208, 210, 329, 330, 341, 343, 345; 455/67.11, 500, 517
See application file for complete search history.

(56) References Cited

U.S. PATENT DOCUMENTS

2020/0221508 A1 7/2020 Huang et al.
2020/0267646 A1* 8/2020 Nam ................. H04W 52/0235
2022/0353814 A1* 11/2022 Takeda .............. H04W 52/0229
2023/0284180 A1* 9/2023 Oh ........................ H04L 5/0053 370/329

OTHER PUBLICATIONS

"3rd Generation Partnership Project; Technical Specification Group Radio Access Network; NR; Multiplexing and channel coding (Release 18)", 3GPP TS 38.212 V18.1.0, Dec. 2023, 293 pages.
"3rd Generation Partnership Project; Technical Specification Group Radio Access Network; NR; Physical layer procedures for control (Release 18)", 3GPP TS 38.213 V18.1.0, Dec. 2023, 298 pages.
"3rd Generation Partnership Project; Technical Specification Group Radio Access Network; NR; Physical layer procedures for data (Release 18)", 3GPP TS 38.214 V18.1.0, Dec. 2023, 289 pages.
"3rd Generation Partnership Project; Technical Specification Group Radio Access Network; NR; Physical layer measurements (Release 18)", 3GPP TS 38.215 V18.1.0, Dec. 2023, 33 pages.
"3rd Generation Partnership Project; Technical Specification Group Radio Access Network; NR; Medium Access Control (MAC) protocol specification (Release 18)" , 3GPP TS 38.321 V18.0.0, Dec. 2023, 309 pages.
"3rd Generation Partnership Project; Technical Specification Group Radio Access Network; NR; Radio Resource Control (RRC) protocol specification (Release 18)", 3GPP TS 38.331 V18.0.0, Dec. 2023, 1608 pages.
"3rd Generation Partnership Project; Technical Specification Group Radio Access Network; NR; NR and NG-RAN Overall Description; Stage 2 (Release 18)", 3GPP TS 38.300 V18.0.0, Dec. 2023, 265 pages.
"3rd Generation Partnership Project; Technical Specification Group Radio Access Network; NR; User Equipment (UE) procedures in Idle mode and RRC Inactive state (Release 18)", 3GPP TS 38.304 V18.0.0, Dec. 2023, 56 pages.
"3rd Generation Partnership Project; Technical Specification Group Services and System Aspects; Study on Ambient power-enabled Internet of Things (Release 19)", 3GPP TR 22.840 V19.0.0, Dec. 2023, 119 pages.
"3rd Generation Partnership Project; Technical Specification Group Radio Access Network; Study on Ambient IoT (Internet of Things) in RAN (Release 18)", 3GPP TR 38.848 V18.0.0, Sep. 2023, 23 pages.
"3rd Generation Partnership Project; Technical Specification Group Radio Access Network; Study on low-power wake- up signal and receiver for NR (Release 18)", 3GPP TR 38.869 V18.0.0, Dec. 2023, 261 pages.
International Search Report and Written Opinion issued Apr. 28, 2025 regarding International Application No. PCT/ KR2025/ 001230, 9 pages.

* cited by examiner

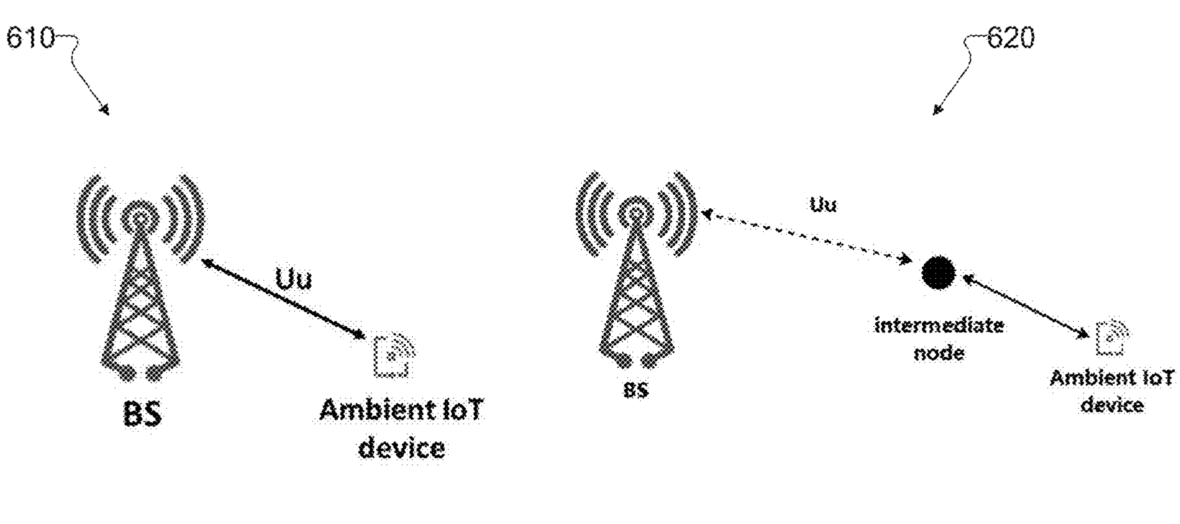
FIG. 6A FIG. 6B
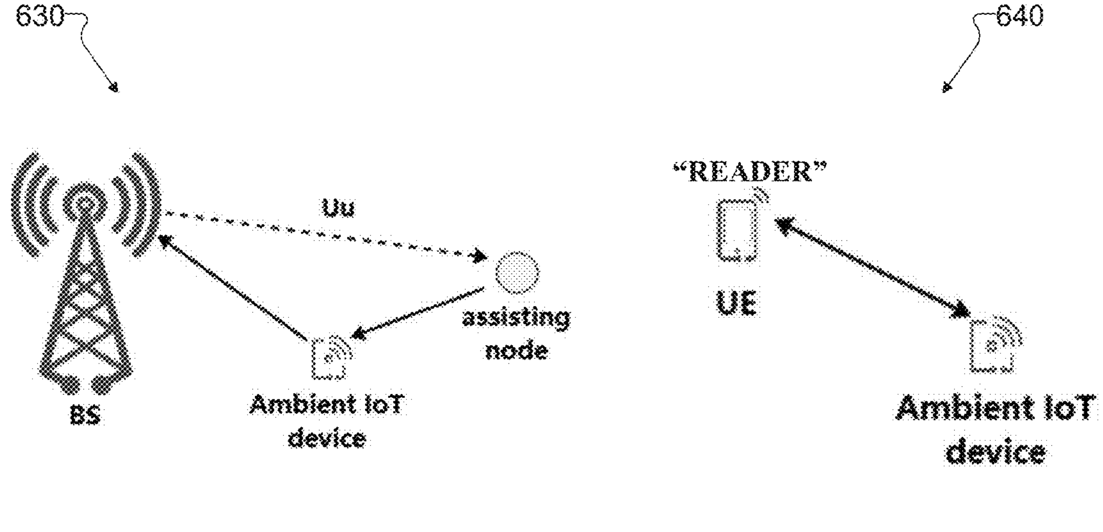
FIG. 6C
FIG. 6D

ON-DEMAND SYNCHRONIZATION AND COMMUNICATION

CROSS-REFERENCE TO RELATED AND CLAIM OF PRIORITY

The present application claims priority under 35 U.S.C. § 119 (e) to U.S. Provisional Patent Application No. 63/626,930 filed on Jan. 30, 2024, which is hereby incorporated by reference in its entirety.

TECHNICAL FIELD

The present disclosure relates generally to wireless communication systems and, more specifically, the present disclosure is related to apparatuses and methods for on-demand synchronization and communication.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance. To meet the demand for wireless data traffic having increased since deployment of 4G communication systems, and to enable various vertical applications, 5G communication systems have been developed and are currently being deployed.

SUMMARY

The present disclosure relates to on-demand synchronization and communication.

In one embodiment, a method for an electronic device is provided. The method includes identifying an identity (ID) for the electronic device or an ID for a group of electronic devices that includes the electronic device and receiving a first trigger in a monitoring occasion (MO) from a set of MOs. The first trigger includes a signal for timing acquisition that comprises a predetermined sequence based on an on-off-keying (OOK) waveform and a physical channel based on the OOK waveform. The physical channel is after the signal. The method further includes determining, based on the first trigger, indication for the ID for the electronic device or the ID for the group of electronic devices and a paging cause and transmitting or receiving a number of signals or channels based on the paging cause.

In another embodiment, an electronic device is provided. The electronic device includes a processor configured to identify an ID for the electronic device or an ID for a group of electronic devices that includes the electronic device and a transceiver operably coupled with the processor, the transceiver configured to receive a first trigger in a MO from a set of MOs. The first trigger includes a signal for timing acquisition that comprises of a predetermined sequence based on an OOK waveform and a physical channel based on the OOK waveform. The physical channel is after the signal. The processor is further configured to determine, based on the first trigger, indication for the ID for the electronic device or the ID for the group of electronic devices and a paging cause. The transceiver is further configured to transmit or receive a number of signals or channels based on the paging cause.

In yet another embodiment a first electronic device is provided. The first electronic device includes a processor configured to identify an ID for a second electronic device or an ID for a group of electronic devices that includes the second electronic device and a transceiver operably coupled with the processor. The transceiver is configured to transmit a first trigger in a MO from a set of MOs. The first trigger includes a signal for timing acquisition that comprises of a predetermined sequence based on an OOK waveform and a physical channel based on the OOK waveform, wherein the physical channel is after the signal. The first trigger indicates the ID for the second electronic device or the ID for the group of electronic devices and a paging cause. The transceiver is further configured to receive or transmit a number of signals or channels based on the paging cause.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6A, 6B, 6C, and 6D illustrate example systems for A-IoT according to embodiments of the present disclosure;

DETAILED DESCRIPTION

Figure 1:
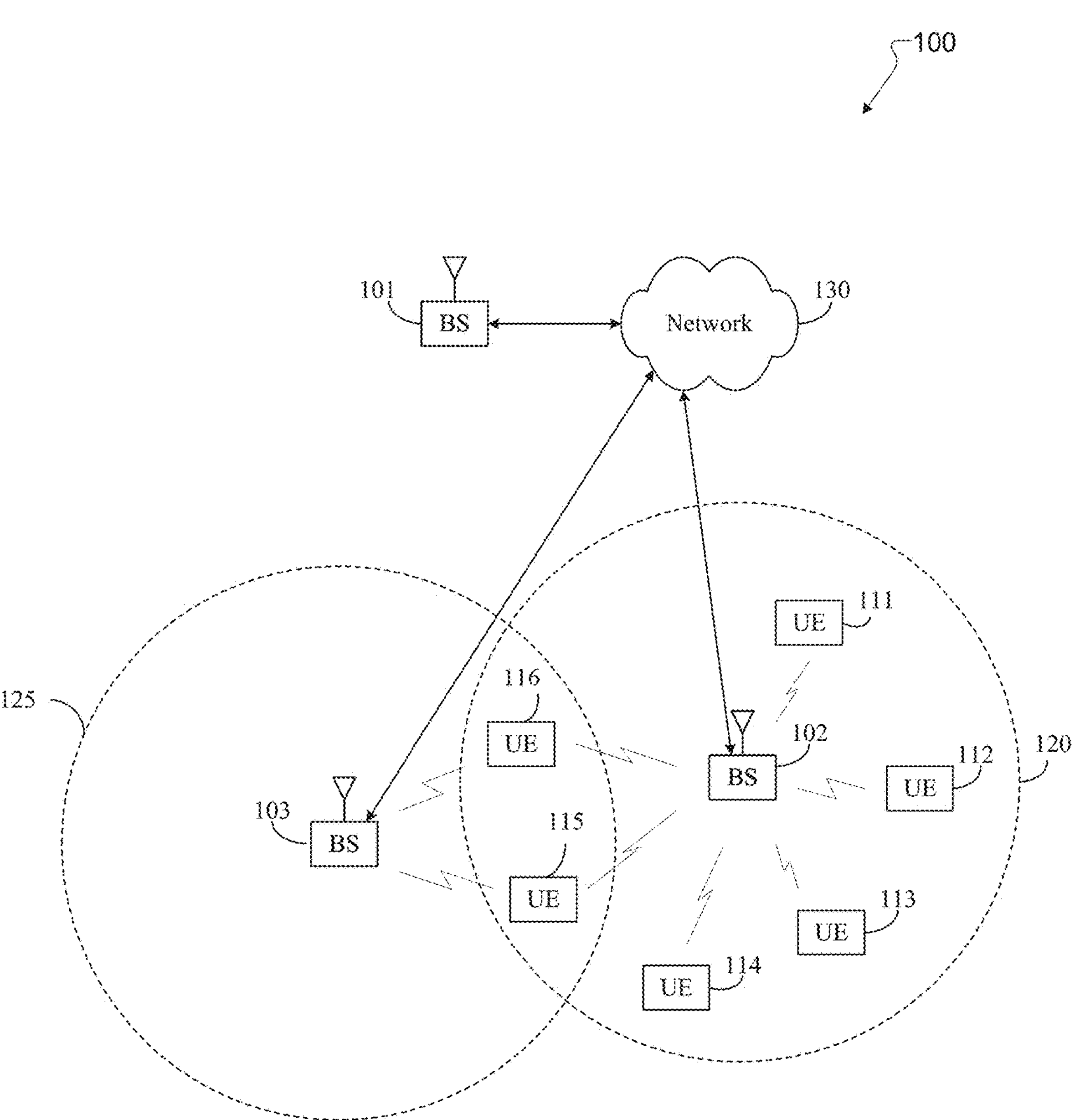
FIG. 1 illustrates an example wireless network according to embodiments of the present disclosure.

FIGS. 1-19, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHZ, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation, radio access technology (RAT)-dependent positioning and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The following documents and standards descriptions are hereby incorporated by reference into the present disclosure as if fully set forth herein: [1] 3GPP TS 38.211 Rel-18 v18.1.0, "NR; Physical channels and modulation;" [2] 3GPP TS 38.212 Rel-18 v18.1.0, "NR; Multiplexing and channel coding;" [3] 3GPP TS 38.213 Rel-18 v18.1.0, "NR; Physical layer procedures for control;" [4] 3GPP TS 38.214 Rel-18 v18.1.0, "NR; Physical layer procedures for data;" [5] 3GPP TS 38.215 Rel-18 v18.1.0, "NR; Physical layer measurements;" [6] 3GPP TS 38.321 Rel-18 v18.0.0, "NR; Medium Access Control (MAC) protocol specification;" [7] 3GPP TS 38.331 Rel-18 v18.0.0, "NR; Radio Resource Control (RRC) protocol specification;" [8] 3GPP TS 38.300 Rel-18 v18.0.0, "NR; NR and NG-RAN Overall Description; Stage 2;" [9] 3GPP TS 38.304 Rel-18 v18.0.0, "NR; User Equipment (UE) procedures in Idle mode and in RRC Inactive state;" 3GPP TR 22.840 Rel-19 v19.0.0, "Study on Ambient power-enabled Internet of Things;" 3GPP TR 38.848 Rel-18 v18.0.0, "Study on Ambient IoT (Internet of Things) in RAN;" and 3GPP TR 38.869 Rel-18 v18.0.0, "Study on low-power Wake-up Signal and Receiver for NR."

Figure 2:
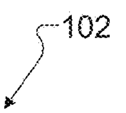
FIG. 2 illustrates an example gNodeB (gNB) according to embodiments of the present disclosure.
Figure 2:
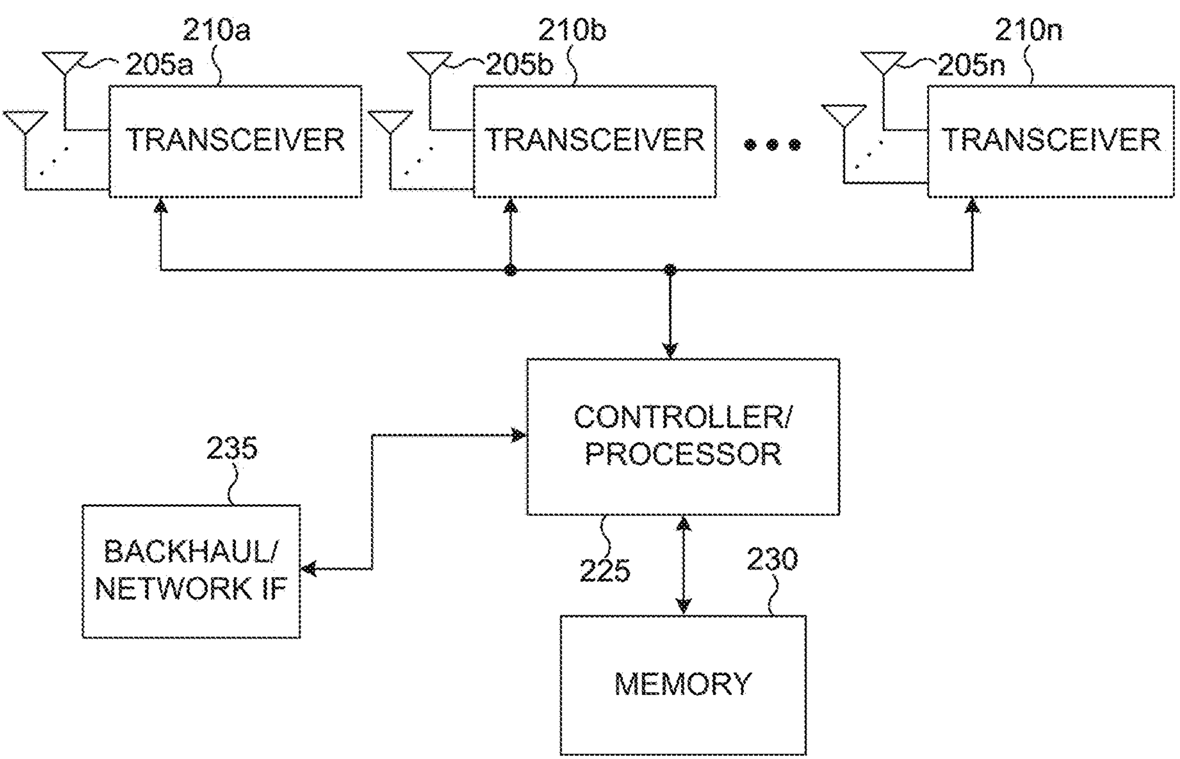
Figure 3:
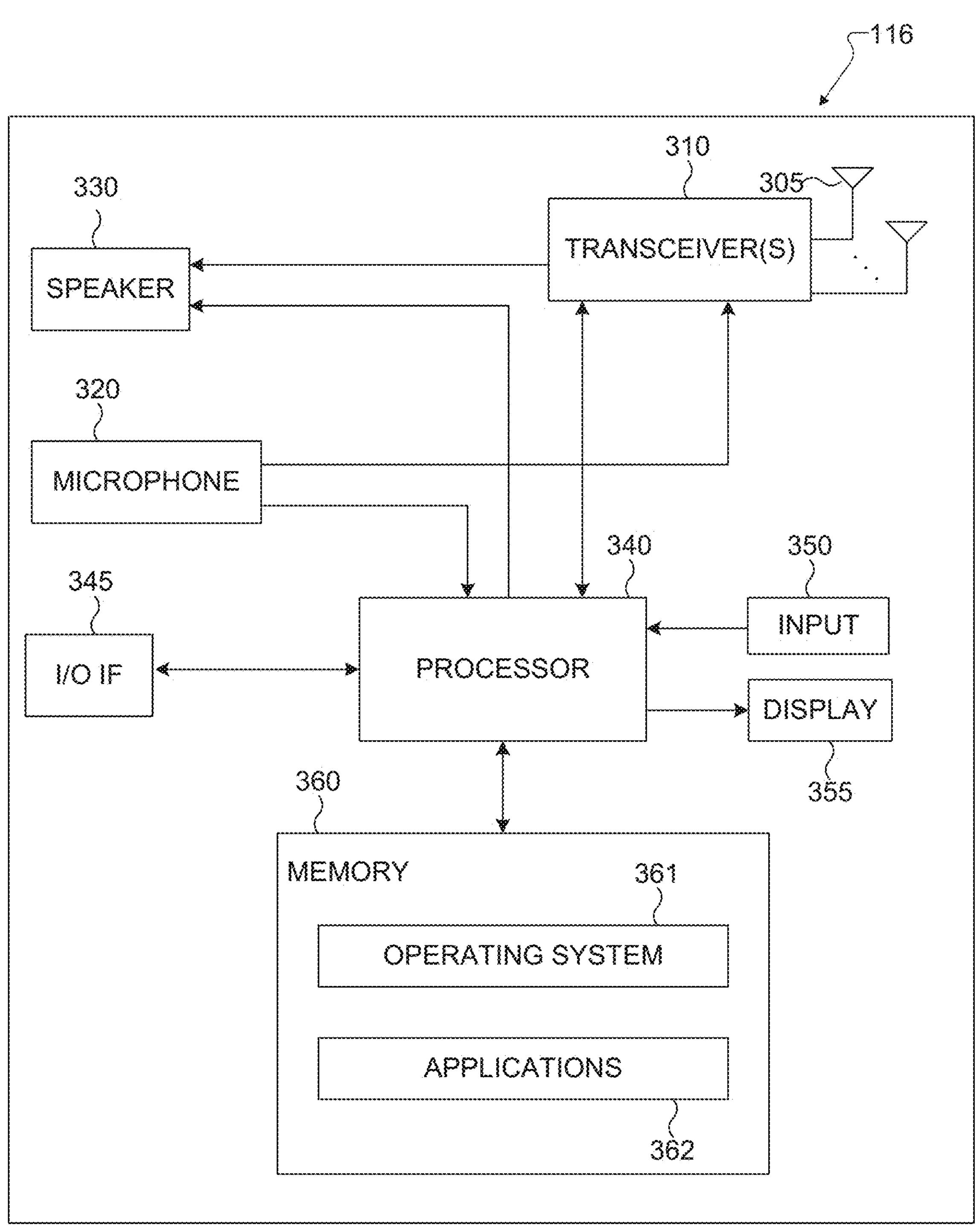
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for on-demand synchronization and communication in a wireless communication system. In certain embodiments, and one or more of the gNBs 101-103 includes circuitry, programing, or a combination thereof, for supporting on-demand synchronization and communication in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas **205*a*-205*n*, multiple transceivers 210*a*-210*n*, a controller/processor 225, a memory 230, and a backhaul or network interface 235**.

The transceivers **210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225** may further process the baseband signals.

Transmit (TX) processing circuitry in the transceivers **210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n***.

The controller/processor 225 can include one or more processors or other processing devices that control the overall operation of the gNB 102. For example, the controller/processor 225 could control the reception of UL channels and/or signals and the transmission of DL channels and/or signals by the transceivers **210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205***a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes for supporting on-demand synchronization and communication in a wireless communication system. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE according to embodiments of the present disclosure. The embodiment of the UE illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE includes antenna(s) 305, a transceiver(s) 310, and a microphone 320. The UE also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100 or by other UEs (e.g., one or more of UEs 111-115) on a SL channel. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE. For example, the processor 340 could control the reception of DL channels and/or signals and SL channels and/or signals and the transmission of UL channels and/or signals and SL channels and/or signals by the transceiver(s) 310 in accordance with well-known principles. In some embodiments, the processor 340 includes at least one microprocessor or microcontroller.

The processor 340 is also capable of executing other processes and programs resident in the memory 360, such as processes for on-demand synchronization and communication in a wireless communication system.

The processor 340 can move data into or out of the memory 360 as required by an executing process. In some embodiments, the processor 340 is configured to execute the applications 362 based on the OS 361 or in response to signals received from gNBs, another UE, or an operator. The processor 340 is also coupled to the I/O interface 345, which provides the UE with the ability to connect to other devices, such as laptop computers and handheld computers. The I/O interface 345 is the communication path between these accessories and the processor 340.

The processor 340 is also coupled to the input 350 and the display 355 which includes for example, a touchscreen, keypad, etc., The operator of the UE can use the input 350 to enter data into the UE. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE configured as a mobile telephone or smartphone, UEs could be configured to operate as other types of mobile or stationary devices.

Figure 4A:
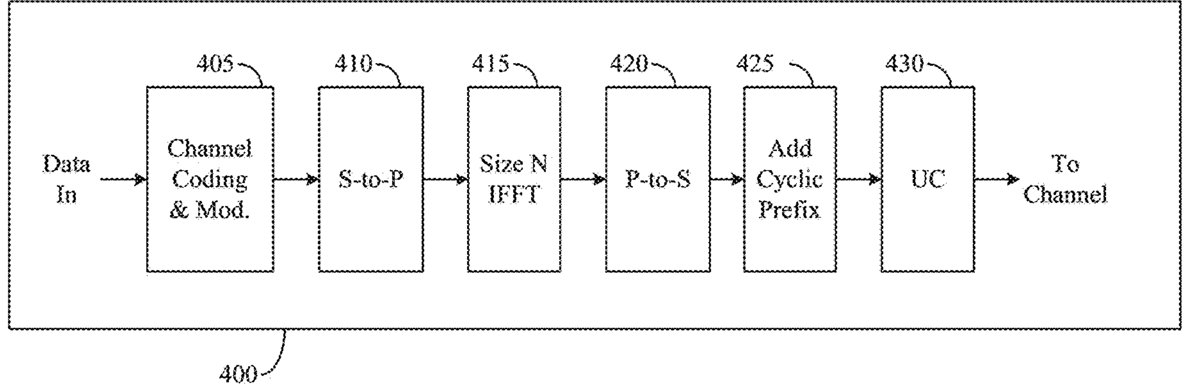
FIGS. 4A and 4B illustrate an example of a wireless transmit and receive paths according to embodiments of the present disclosure.
Figure 4B:
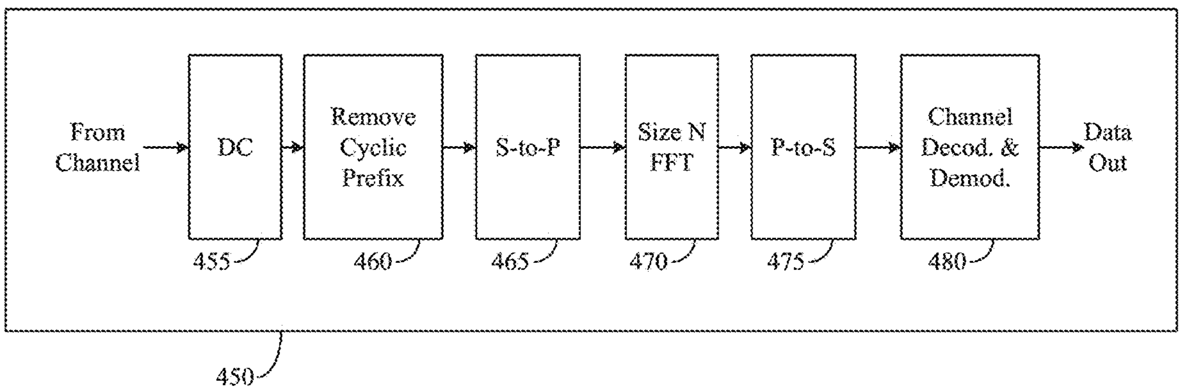

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the transmit path 400 and/or the receive path 450 is configured for on-demand synchronization and communication as described in embodiments of the present disclosure.

As illustrated in FIG. 4A, the transmit path 400 includes a channel coding and modulation block 405, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 250 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

In various embodiments or examples throughout the present disclosure, a UE (e.g., the UE 116) or a device may refer to an A-IoT device or an A-IoT UE based on energy harvesting with ultra-low complexity and power consumption and for low-end IoT applications, as previously described. For example, the UE may have limited (or no) energy storage or battery capability (e.g., a capacitor), such as an energy storage unit for amplification of receptions at the UE or transmission by the UE, or for other UE operations, such as power-on, warm-up, memory, internal processing, and so on, or operating with backscattering communication.

In various embodiments throughout the present disclosure, a UE can refer to a low-power UE (for example, operating with a transmission or reception power less than 0 dBm), such as an Ambient-power-enabled IoT (or Ambient-IoT, "A-IoT", for short) device, such as a UE with energy harvesting or wireless power-transfer capability. The methods herein are generic and can apply to any UE with or without such features or capabilities.

Various embodiments throughout the present disclosure may broadly apply to any UE, such as a UE with an output energy/power level that is variable over time, for example, due to energy harvesting from the environment, while the UE may operate with advanced capabilities or for higher-end applications or with more stringent requirements.

Various embodiments throughout the present disclosure may generally apply to any UEs, such as a UE with a simplified or energy-efficient characteristics or transceiver design, or with components with such features. For example, various methods may apply to a UE with a first main radio with baseline performance design or more advanced capabilities or higher energy/power consumption, referred to as e.g. main radio (MR), and a second radio with simplified design and smaller energy/power consumption, referred to as e.g. low-power radio (LR), for example, as regarded in Rel-19 low power wake up signal (LP-WUS) feature. For example, some methods or examples may apply to such LR or both of LR and MR.

Ambient-power-enabled IoT devices, or for brevity, Ambient IoT (A-IoT) devices are ultra-low-complexity UEs with very small form factor and low-cost design that operate without a common battery that can be manually replaced or recharged. Instead, A-IoT devices can be battery-less or with a small battery (such as a small capacitor) that operate based on energy harvesting from RF waveforms or other ambient energy sources.

To reduce the power consumption for such A-IoT UEs, communication can be on-demand, such as when triggered by the host/management platform or by the network (NW) or the UE Reader that scans, inventories, or communicates with the A-IoT UEs.

Therefore, embodiments of the present disclosure recognizes that there is a need to define communication initiates upon reception of NW trigger, such that the UE can perform basic UE preparations and procedures, such as synchronization or information acquisition or random/initial access, only on-demand.

In addition, such A-IoT UEs can have very simplified capabilities, due to low-cost objective, therefore full functionalities, such as absolute synchronization, may not be feasible or applicable to such UEs. For example, the UE may or may not be able to receive and process synchronization signals, or may be capable of maintaining coarse synchronization.

Therefore, there is a need to design simplified synchronization procedures, such as relative or local synchronization, that the UE can establish on-demand based on NW trigger, and may be maintained for a short time period, such as one or multiple operation rounds.

The present disclosure provides methods and apparatus for on-demand initiation of communication, such as synchronization, system/operation information acquisition, or random access, based on NW trigger.

In exemplary embodiments, the UE is an A-IoT device operating with energy harvesting (EH) or with limited (or no) energy storage/battery capability (such as a capacitor), such as an energy storage unit for amplification of receptions at the UE or transmission by the UE, or for other UE operations, such as power-on, warm-up, memory, internal processing, and so on, or operating with backscattering communication.

The embodiments may apply to any deployments, verticals, or scenarios including in FR1, FR2, FR3, FR4, with enhanced mobile broadband (eMBB), ultra reliable low latency communications (URLLC) and industrial internet of things (IIOT), massive machine-type communications (mMTC) and internet of things (IoT) including LTE NB-IoT or NR IoT or Ambient IoT (A-IoT), with sidelink/vehicle to anything (V2X) communications, in unlicensed/shared spectrum (NR-U), for non-terrestrial networks (NTN), for aerial systems such as unmanned aerial vehicles (UAVs) such as drones, for private or non-public networks (NPN), for operation with reduced capability (RedCap) UEs, multicast broadcast services (MBS), and so on.

Embodiments of the disclosure are summarized in the following and are fully elaborated further herein. Combinations of the embodiments are also applicable but are not described in detail for brevity.

Communication setting for A-IoT UE, including operating frequency is discussed. In one embodiment, a UE operates in a single carrier frequency/band or in a single sub-band/sub-channel/channel associated with one frequency band. The UE can operate in different carrier frequencies/bands or different sub-bands/sub-channels/channels in different time instances, for example, different operation round, or in a time division multiplexing (TDM) or time-interleaved manner.

Carrier wave (CW) for A-IoT UE is discussed. In various embodiments, the UE can receive a carrier wave (CW), also referred to as continuous wave. For example, the UE uses the CW as a source for RF-based energy harvesting, for instance, using rectifier circuits. The UE can additionally or alternatively harvest energy from other non-RF energy resources, such as solar, thermal, pressure, and so on. The UE can receive the CW in same frequency as DL receptions or UL transmissions, or in a different carrier frequency/band. The UE can receive the CW continuously or periodically or based on a time pattern such as a duty cycle, or in a semi-persistent or aperiodic manner.

Cell search for A-IoT UE is discussed. In various embodiments, cell search procedure may not apply to a UE, or the UE may apply a limited or simplified variation of cell search by acquiring limited information about the operating cell, such as based on a carrier frequency/band for CW reception.

NW trigger for paging, synchronization, and/or random access RA is discussed. In one embodiment, the UE supports a network (NW) trigger to "initiate UE operation" for one UE or a group of UEs, such as triggering synchronization or random access (RA). The NW trigger can be jointly for UE preparations and RA procedures, or the UE can receive separate triggers for the UE preparation and for the RA procedure. The NW trigger can be a DL sequence/signal such as an LP-WUS, a DL channel such as a physical downlink control channel (PDCCH), or a combination/variation thereof (as subsequently described). The NW trigger can additionally indicate certain information about subsequent UE procedures, similar to a short-term system information, subsequently referred to as operation information (OI), in a physical broadcast channel (PBCH) or a in a PDSCH. Various signals or channels can be based on simplified or energy-efficient waveforms, such as on-off-keying (OOK), thereby, corresponding signals or channels can be referred to as "o-PDCCH", "o-PBCH", or "o-PDSCH", and so on.

PHY aspects of NW trigger(s) is discussed. In one embodiment, the gNB/Reader transmits the NW trigger or the UE receives the NW trigger in the form of a sequence-based DL signal such as an LP-WUS or a variation thereof, or in the form of a combination of a sequence-based DL signal such as LP-WUS and a DL channel such as o-PBCH, or in the form of only a DL channel such as o-PDCCH. An information content associated with the NW trigger can be provided by using different values for the parameters of the sequence used for the DL signal or can be provided as information in the DL channel. A predetermined or preconfigured preamble or DL signal (such as demodulation reference signal (DMRS)) can be appended to the trigger to simplify and improve the detection performance of the NW trigger.

Monitoring the NW trigger is discussed. In one embodiment, NW trigger monitoring refers to (attempting to) receive and detect a DL signal for NW trigger, such as LP-WUS (as per Options 1/2), and/or (attempting to) receptive and decode a DL channel for the NW trigger, such as an o-PDCCH (as per Option 3), as previously described. Various schemes can be evaluated for monitoring the NW trigger, such as continuous monitoring, or periodic monitoring based on a periodicity, or monitoring based on a time pattern such as a duty cycle.

On-demand/NW-triggered synchronization is discussed. In one embodiment, a UE can (start to) establish synchronization, such as DL synchronization, upon reception of a NW trigger, as described in one or more embodiments herein. For example, the UE does not attempt to perform cell search or DL synchronization before reception of the NW trigger. Such synchronization can be regarded as on-demand synchronization or NW-triggered synchronization. Depending on the UE capability or corresponding procedure, the established synchronization can be absolute or global in an extended time duration such as multiple operation rounds, or can be local within a limited time duration such as one operation round, or can be for a given transmission or reception or in between two or multiple transmissions or receptions. For example, the established synchronization can be based on a common NR synchronization signal such as synchronization signal block (SSB), or based on a simplified synchronization signal such as low power state saving (LP-SS), or may not be based on any synchronization signal, and, for example, use a synchronization preamble sequence appended to a given transmission or reception.

The text and figures are provided solely as examples to aid the reader in understanding the disclosure. They are not intended and are not to be construed as limiting the scope of this disclosure in any manner. Although certain embodiments and examples have been provided, it will be apparent to those skilled in the art based on the disclosures herein that changes in the embodiments and examples shown may be made without departing from the scope of this disclosure.

The flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Throughout this disclosure, all FIGUREs such as FIG. 1, FIG. 2, and so on, illustrate examples according to embodiments of the present disclosure. For each FIGURE, the corresponding embodiment shown in the FIG. 1*s* for illustration only. One or more of the components illustrated in each FIGURE can be implemented in specialized circuitry configured to perform the noted functions or one or more of the components can be implemented by one or more processors executing instructions to perform the noted functions. Other embodiments could be used without departing from the scope of the present disclosure. In addition, the descriptions of the FIGUREs are not meant to imply physical or architectural limitations to the manner in which different embodiments may be implemented. Different embodiments of the present disclosure may be implemented in any suitably-arranged communications system.

In the following, a parameter referenced in italics is provided by higher layers such as by RRC.

A communication system can include a downlink (DL) that refers to transmissions from a base station (such as the BS 102) or one or more transmission points to UEs (such as the UE 116) and an uplink (UL) that refers to transmissions from UEs (such as the UE 116) to a base station (such as the BS 102) or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of subcarriers (SCs). For example, a slot can have duration of 1 millisecond or 0.5 millisecond, include 14 symbols and an RB can include 12 SCs with inter-SC spacing of 15 kHz or 30 kHz, and so on.

DL signals include data signals conveying information content, control signals conveying DL control information (DCI), and reference signals (RS) that are also known as pilot signals. A gNB (e.g., the BS 102) transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB (such as the BS 102) transmits one or more of multiple types of RS including channel state information RS (CSI-RS) and demodulation RS (DM-RS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE (such as the UE 116) can determine CSI-RS transmission parameters through DL control signaling or higher layer signaling, such as radio resource control (RRC) signaling, from a gNB (such as the BS 102). Transmission instances of a CSI-RS can be indicated by DL control signaling or be configured by higher layer signaling. A DM-RS is transmitted only in the BW of a respective PDCCH or PDSCH and a UE can use the DM-RS to demodulate data or control information.

In certain embodiments, UL signals also include data signals conveying information content, control signals conveying UL control information (UCI), DM-RS associated with data or UCI demodulation, sounding RS (SRS) enabling a gNB to perform UL channel measurement, and a RA preamble enabling a UE to perform RA (see also NR specification). A UE transmits data information or UCI through a respective PUSCH or a physical UL control channel (PUCCH). A PUSCH or a PUCCH can be transmitted over a variable number of slot symbols including one slot symbol. The gNB can configure the UE to transmit signals on a cell within an active UL bandwidth part (BWP) of the cell UL BW.

UCI includes hybrid automatic repeat request (HARQ) acknowledgement (ACK) information, indicating correct or incorrect detection of data transport blocks (TBs) in a PDSCH, scheduling request (SR) indicating whether a UE has data in a buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER (see NR specification), of a precoding matrix indicator (PMI) informing a gNB how to combine signals from multiple transmitter antennas in accordance with a MIMO transmission principle, and of a rank indicator (RI) indicating a transmission rank for a PDSCH.

UL RS includes DM-RS and SRS. DM-RS is transmitted only in a BW of a respective PUSCH or PUCCH transmission. A gNB can use a DM-RS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel (PRACH as shown in NR specifications).

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may expect the same precoding being used.

For DM-RS associated with a physical broadcast channel (PBCH), the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE (such as the UE 116) may expect that synchronization signal (SS)/PBCH block (also denoted as SSBs) transmitted with the same block index on the same center frequency location are quasi co-located with respect to Doppler spread, Doppler shift, average gain, average delay, delay spread, and, when applicable, spatial Rx parameters. The UE may not expect quasi co-location for any other synchronization signal SS/PBCH block transmissions.

In absence of CSI-RS configuration, and unless otherwise configured, the UE may expect PDSCH DM-RS and SSB to be quasi co-located with respect to Doppler shift, Doppler spread, average delay, delay spread, and, when applicable, spatial Rx parameters. The UE may expect that the PDSCH DM-RS within the same code division multiplexing (CDM) group is quasi co-located with respect to Doppler shift, Doppler spread, average delay, delay spread, and spatial Rx. The UE may also expect that DM-RS ports associated with a PDSCH are quasi co-location (QCL) with QCL type A, type D (when applicable) and average gain. The UE may further expect that no DM-RS collides with the SS/PBCH block.

The UE can be configured with a list of up to M transmission configuration indication (TCI) State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi-colocation (QCL) relationship between one or two downlink reference signals and the DM-RS ports of the PDSCH, the DM-RS port of PDCCH or the CSI-RS port(s) of a CSI-RS resource.

The quasi co-location relationship is configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi co-location types corresponding to each DL RS are given by the higher layer parameter qcl-Type in QCL-Info and may take one of the following values: QCL-TypeA: {Doppler shift, Doppler spread, average delay, delay spread}; QCL-TypeB: {Doppler shift, Doppler spread; QCL-TypeC: {Doppler shift, average delay}; and QCL-TypeD: {Spatial Rx parameter}.

The UE receives a MAC-CE activation command to map up to [N] (e.g., N=8) TCI states to the codepoints of the DCI field "Transmission Configuration Indication." When the HARQ-ACK corresponding to the PDSCH carrying the activation command is transmitted in slot n, the indicated mapping between TCI states and codepoints of the DCI field "Transmission Configuration Indication" may be applied after a MAC-CE application time, e.g., starting from the first slot that is after slot $$\left(n+3N_{slot}^{subframe,\mu}\right).$$

In some examples, the term 'beam' is used to refer to a spatial filter for transmission or reception of a signal or a channel. For example, a beam (of an antenna) can be a main lobe of the radiation pattern of an antenna array, or a sub-array or an antenna panel, or of multiple antenna arrays, sub-arrays or panels combined, that are used for such transmission or reception. In various examples, a beam such as a Tx beam or an Rx beam is referred to as a spatial filter, such as a spatial transmission filter or a spatial reception filter.

In the following and throughout the disclosure, various embodiments of the disclosure may be also implemented in any type of UE including, for example, UEs with the same, similar, or more capabilities compared to common 5G NR UEs. Although various embodiments of the disclosure discuss 3GPP 5G NR communication systems, the embodiments may apply in general to UEs operating with other RATs and/or standards, such as next releases/generations of 3GPP, IEEE WiFi, and so on.

In the following, unless otherwise explicitly noted, providing a parameter value by higher layers includes providing the parameter value by MIB or a system information block (SIB), such as a SIB1, or by a common RRC signaling, or by UE-specific RRC signaling.

In the following, for brevity of description, the higher layer provided TDD UL-DL frame configuration refers to tdd-UL-DL-ConfigurationCommon as example for RRC common configuration and/or tdd-UL-DL-ConfigurationDedicated as example for UE-specific configuration. The UE determines a common time division duplexing (TDD)

UL-DL frame configuration of a serving cell by receiving a SIB such as a SIB1 when accessing the cell from RRC_IDLE or by RRC signaling when the UE is configured with SCells or additional secondary cell groups (SCGs) by an IE ServingCellConfigCommon in RRC_CONNECTED. The UE determines a dedicated TDD UL-DL frame configuration using the IE ServingCellConfig when the UE is configured with a serving cell, e.g., add or modify, where the serving cell may be the SpCell or an SCell of an master cell group (MCG) or secondary cell group (SCG). A TDD UL-DL frame configuration designates a slot or symbol as one of types 'D', 'U' or 'F' using at least one time-domain pattern with configurable periodicity.

In the following, for brevity of description, slot format indication (SFI) refers to a slot format indicator as example that is indicated using higher layer provided IEs such as slotFormatCombination or slotFormatCombinationsPerCell and which is indicated to the UE by group common DCI format such as DCI F2_0 where slotFormats are defined in [REF3, TS 38.213].

The Synchronization Signal and PBCH block (SSB) includes primary and secondary synchronization signals (PSS, SSS), each occupying 1 symbol and 127 subcarriers, and PBCH spanning across 3 OFDM symbols and 240 subcarriers, but on one symbol leaving an unused part in the middle for SSS. The time locations of SSBs within a half-frame are determined by sub-carrier spacing and the periodicity of the half-frames where SSBs are transmitted is configured by the network (e.g., the network 130). During a half-frame, different SSBs may be transmitted in different spatial directions (i.e. using different beams, spanning the coverage area of a cell).

Within the frequency span of a carrier, multiple SSBs can be transmitted. The physical cell IDs (PCIs) of SSBs transmitted in different frequency locations do not have to be unique, i.e. different SSBs in the frequency domain can have different PCIs. However, when an SSB is associated with an remaining minimum system information (RMSI), the SSB is referred to as a Cell-Defining SSB (CD-SSB). A PCell is associated to a CD-SSB located on the synchronization raster.

Polar coding is used for PBCH. The UE may expect a band-specific sub-carrier spacing for the SSB unless a network has configured the UE to expect a different sub-carrier spacing. PBCH symbols carry its own frequency-multiplexed DMRS. QPSK modulation is used for PBCH.

Measurement time resource(s) for SSB-based reference signal received power (RSRP) measurements may be confined within a SSB Measurement Time Configuration (SMTC). The SMTC configuration provides a measurement window periodicity/duration/offset information for UE radio resource management (RRM) measurement per carrier frequency. For intra-frequency connected mode measurement, up to two measurement window periodicities can be configured. For RRC_IDLE, a single SMTC is configured per carrier frequency for measurements. For inter-frequency mode measurements in RRC_CONNECTED, a single SMTC is configured per carrier frequency. Note that if RSRP is used for L1-RSRP reporting in a CSI report, the measurement time resource(s) restriction provided by the SMTC window size is not applicable. Similarly, measurement time resource(s) for received signal strength indicator (RSSI) are confined within SMTC window duration. If no measurement gap is used, RSSI is measured over OFDM symbols within the SMTC window duration. If a measurement gap is used, RSSI is measured over OFDM symbols corresponding to overlapped time span between SMTC window duration and minimum measurement time within the measurement gap.

Link adaptation (AMC: adaptive modulation and coding) with various modulation schemes and channel coding rates is applied to the PDSCH. The same coding and modulation is applied to groups of resource blocks belonging to the same L2 protocol data unit (PDU) scheduled to one user within one transmission duration and within a MIMO codeword.

For channel state estimation purposes, the UE (e.g., the UE 116) may be configured to measure CSI-RS and estimate the downlink channel state based on the CSI-RS measurements. The UE feeds the estimated channel state back to the gNB to be used in link adaptation.

Measurement reports are required to enable the scheduler to operate in both uplink and downlink. These include transport volume and measurements of a UEs radio environment.

The Synchronization Signal and PBCH block (SSB) includes primary and secondary synchronization signals (PSS, SSS), each occupying 1 symbol and 127 subcarriers, and PBCH spanning across 3 OFDM symbols and 240 subcarriers, but on one symbol leaving an unused part in the middle for SSS. For the 3 MHz channel bandwidth, the PBCH is further equally punctured from both edges to span 144 subcarriers. The time locations of SSBs within a half-frame are determined by sub-carrier spacing and the periodicity of the half-frames where SSBs are transmitted is configured by the network. During a half-frame, different SSBs may be transmitted in different spatial directions (i.e. using different beams, spanning the coverage area of a cell).

Within the frequency span of a carrier, multiple SSBs can be transmitted. The PCIs of SSBs transmitted in different frequency locations do not have to be unique, i.e. different SSBs in the frequency domain can have different PCIs. However, when an SSB is associated with an RMSI, the SSB is referred to as a Cell-Defining SSB (CD-SSB). A PCell is associated to a CD-SSB located on the synchronization raster.

When an SSB is not associated with an RMSI, the SSB is referred to as a non-Cell Defining SSB (NCD-SSB), which can be used to perform RLM, bidirectional forwarding detection (BFD), and RRM measurements and measurements for RA resource selection inside the active DL BWP when the active BWP does not contain the CD-SSB. A UE may be configured with multiple SSBs provided that each BWP is configured with at most one SSB (CD-SSB or NCD-SSB).

Polar coding is used for PBCH.

The UE may expect a band-specific sub-carrier spacing for the SSB unless a network has configured the UE to expect a different sub-carrier spacing.

PBCH symbols carry its own frequency-multiplexed DMRS.

QPSK modulation is used for PBCH.

Cell search is the procedure by which a UE acquires time and frequency synchronization with a cell and detects the Cell ID of that cell. NR cell search is based on the primary and secondary synchronization signals, and PBCH DMRS, located on the synchronization raster.

The Master Information Block (MIB) on PBCH provides the UE with parameters (e.g. CORESET #0 configuration) for monitoring of PDCCH for scheduling PDSCH that carries the System Information Block 1 (SIB1). PBCH may also indicate that there is no associated SIB1, in which case the UE may be pointed to another frequency from where to search for an SSB that is associated with a SIB1 as well as a frequency range where the UE may expect no SSB associated with SIB1 is present. The indicated frequency range is confined within a contiguous spectrum allocation of the same operator in which SSB is detected.

System Information (SI) includes a MIB and a number of SIBs, which are divided into Minimum SI and Other SI:

- Minimum SI comprises basic information required for initial access and information for acquiring any other SI. Minimum SI includes:
  - MIB contains cell barred status information and essential physical layer information of the cell required to receive further system information, e.g. CORESET #0 configuration. MIB is periodically broadcast on BCH.
  - SIB1 defines the scheduling of other system information blocks and contains information required for initial access. SIB1 is also referred to as Remaining Minimum SI (RMSI) and is periodically broadcast on DL-SCH or sent in a dedicated manner on DL-SCH to UEs in RRC_CONNECTED.
- Other SI encompasses SIBs not broadcast in the Minimum SI. Those SIBs can either be periodically broadcast on DL-SCH, broadcast on-demand on DL-SCH (i.e. upon request from UEs in RRC_IDLE, RRC_INACTIVE, or RRC_CONNECTED), or sent in a dedicated manner on DL-SCH to UEs in RRC_CONNECTED (i.e., upon request, if configured by the network, from UEs in RRC_CONNECTED or when the UE has an active BWP with no common search space configured or when the UE configured with inter cell beam management is receiving DL-SCH from a TRP with PCI different from serving cell's PCI).

Paging allows the network to reach UEs in RRC_IDLE and in RRC_INACTIVE state through Paging messages, and to notify UEs in RRC_IDLE, RRC_INACTIVE and RRC_CONNECTED state of system information change and earthquake and tsunami warning system (ETWS)/commercial mobile alert system (CMAS) indications through Short Messages. Both Paging messages and Short Messages are addressed with paging radio network temporary identifier (P-RNTI) on PDCCH, but while the former is sent on paging control channel (PCCH), the latter is sent over PDCCH directly (see clause 6.5 of TS 38.331 [REF7]).

While in RRC_IDLE the UE monitors the paging channels for core network (CN)-initiated paging. While in RRC_INACTIVE with no ongoing small data transmission (SDT) procedure (see clause 18.0) the UE monitors paging channels for RAN-initiated paging and CN-initiated paging. A UE need not monitor paging channels continuously though; Paging discontinuous reception (DRX) is defined where the UE in RRC_IDLE or RRC_INACTIVE is only required to monitor paging channels during one Paging Occasion (PO) per DRX cycle (see TS 38.304 [REF9]). The Paging DRX cycles are configured by the network:

1) For CN-initiated paging, a default cycle is broadcast in system information;
2) For CN-initiated paging, a UE specific cycle can be configured via non access stratum (NAS) signalling;
3) For RAN-initiated paging, a UE-specific cycle is configured via RRC signalling;

The UE uses the shortest of the DRX cycles applicable i.e. a UE in RRC_IDLE uses the shortest of the first two cycles herein, while a UE in RRC_INACTIVE uses the shortest of the three.

The POs of a UE for CN-initiated and RAN-initiated paging are based on the same UE ID, resulting in overlapping POs for both. The number of different POs in a DRX cycle is configurable via system information and a network may distribute UEs to those POs based on their IDs.

While in RRC_CONNECTED and while in RRC_INACTIVE with ongoing SDT procedure, the UE monitors the paging channels in any PO signalled in system information for SI change indication and public warning system (PWS) notification. In case of BA, a UE in RRC_CONNECTED only monitors paging channels on the active BWP with common search space configured.

For operation with shared spectrum channel access, a UE can be configured for an additional number of PDCCH monitoring occasions in its PO to monitor for paging. However, when the UE detects a PDCCH transmission within the UE's PO addressed with P-RNTI, the UE is not required to monitor the subsequent PDCCH monitoring occasions within this PO.

If Paging Cause is included in the Paging message, a UE in RRC_IDLE or RRC_INACTIVE state may use the Paging Cause as per TS 23.501.

Paging optimization for UEs in CM_IDLE: at UE context release, the NG-RAN node may provide the access and mobility management function (AMF) with a list of recommended cells and NG-RAN nodes as assistance info for subsequent paging. The AMF may also provide Paging Attempt Information including a Paging Attempt Count and the Intended Number of Paging Attempts and may include the Next Paging Area Scope. If Paging Attempt Information is included in the Paging message, each paged NG-RAN node receives the same information during a paging attempt. The Paging Attempt Count shall be increased by one at each new paging attempt. The Next Paging Area Scope, when present, indicates whether the AMF intends to modify the paging area currently selected at next paging attempt. If the UE has changed its state to CM CONNECTED the Paging Attempt Count is reset.

Paging optimization for UEs in RRC_INACTIVE: at RAN Paging, the serving NG-RAN node provides RAN Paging area information. The serving NG-RAN node may also provide RAN Paging attempt information. Each paged NG-RAN node receives the same RAN Paging attempt information during a paging attempt with the following content: Paging Attempt Count, the intended number of paging attempts and the Next Paging Area Scope. The Paging Attempt Count shall be increased by one at each new paging attempt. The Next Paging Area Scope, when present, indicates whether the serving NG_RAN node intends to modify the RAN Paging Area currently selected at next paging attempt. If the UE leaves RRC_INACTIVE state the Paging Attempt Count is reset.

UE power saving for paging monitoring: in order to reduce UE power consumption due to false paging alarms, the group of UEs monitoring the same PO can be further divided into multiple subgroups. With subgrouping, a UE shall monitor PDCCH in its PO for paging if the subgroup to which the UE belongs is paged as indicated via associated PEI. If a UE cannot find its subgroup ID with the PEI configurations in a cell or if the UE is unable to monitor the associated PEI occasion corresponding to its PO, it shall monitor the paging in its PO.

These subgroups have the following characteristics:

- They are formed based on either CN controlled subgrouping or UE ID based subgrouping;
- If CN controlled subgroup ID is not provided from AMF, UE ID based subgrouping is used if supported by the UE and network;
- The RRC state (RRC_IDLE or RRC_INACTIVE state) does not impact which subgroup the UE belongs to;

Subgrouping support for a cell is broadcast in the system information as one of the following: Only CN controlled subgrouping supported, only UE ID based subgrouping supported, or both CN controlled subgrouping and UE ID based subgrouping supported;

Total number of subgroups allowed in a cell is up to 8 and represents the sum of CN controlled and UE ID based subgrouping configured by the network;

A UE configured with CN controlled subgroup ID applies CN controlled subgroup ID if the cell supports CN controlled subgrouping; otherwise, it derives UE ID based subgroup ID if the cell supports only UE ID based subgrouping.

PEI associated with subgroups has the following characteristics:

If the PEI is supported by the UE, it shall at least support UE ID based subgrouping method;

PEI monitoring can be limited via system information to the last used cell (i.e., the cell in which the UE most recently received RRCRelease without indicating that the last used cell for PEI shall not be updated);

A PEI-capable UE shall store its last used cell information;

gNBs supporting the PEI monitoring to the last used cell function provide the UE's last used cell information to the AMF in the NG-AP UE Context Release Complete message for PEI capable UEs, as described in TS 38.413 [26];

UE that expects MBS group notification shall ignore the PEI and shall monitor paging in its PO.

CN controlled subgrouping: For CN controlled subgrouping, AMF is responsible for assigning subgroup ID to the UE. The total number of subgroups for CN controlled subgrouping which can be configured, e.g. by OAM is up to 8. It is expected that CN controlled subgrouping support is homogeneous within an RNA.

UE ID based subgrouping: For UE ID based subgrouping, the gNB (e.g., the BS 102) and UE can determine the subgroup ID based on the UE ID and the total number of subgroups for UE ID based subgrouping in the cell. The total number of subgroups for UE ID based subgrouping is decided by the gNB for each cell and can be different in different cells.

The random access procedure is triggered by a number of events:

Initial access from RRC_IDLE;

RRC Connection Re-establishment procedure;

DL or UL data arrival, during RRC_CONNECTED or during RRC_INACTIVE while SDT procedure (see clause 18.0) is ongoing, when UL synchronisation status is "non-synchronised";

UL data arrival, during RRC_CONNECTED or during RRC_INACTIVE while SDT procedure is ongoing, when there are no PUCCH resources for SR available;

Handover;

SR failure;

Explicit request by RRC upon synchronous reconfiguration;

RRC Connection Resume procedure from RRC_INACTIVE;

To establish time alignment for a primary or a secondary TAG;

Request for Other SI (see clause 7.3);

Beam failure recovery;

Consistent UL listen-before-talk (LBT) failure on SpCell;

SDT in RRC_INACTIVE (see clause 18);

Positioning purpose during RRC_CONNECTED requiring random access procedure, e.g., when timing advance is needed for UE positioning;

Early UL synchronization with an L1/L2-triggered mobility (LTM) candidate cell;

random access channel (RACH)-based LTM cell switch.

Two types of random access procedure are supported: 4-step RA type with MSG1 and 2-step RA type with MSGA. Both types of RA procedure support contention-based random access (CBRA) and contention-free random access (CFRA).

The UE selects the type of random access at initiation of the random access procedure based on network configuration:

when CFRA resources are not configured, an RSRP threshold is used by the UE to select between 2-step RA type and 4-step RA type;

when CFRA resources for 4-step RA type are configured, UE performs random access with 4-step RA type;

when CFRA resources for 2-step RA type are configured, UE performs random access with 2-step RA type.

The network does not configure CFRA resources for 4-step and 2-step RA types at the same time for a Bandwidth Part (BWP). CFRA with 2-step RA type is only supported for handover.

The MSG1 of the 4-step RA type including a preamble on PRACH. After MSG1 transmission, the UE monitors for a response from the network within a configured window. For CFRA, dedicated preamble for MSG1 transmission is assigned by the network and upon receiving random access response from the network, the UE ends the random access procedure. For CBRA, upon reception of the random access response, the UE sends MSG3 using the UL grant scheduled in the response and monitors contention resolution. If contention resolution is not successful after MSG3 (re)transmission(s), the UE goes back to MSG1 transmission.

The MSGA of the 2-step RA type includes a preamble on PRACH and a payload on PUSCH. After MSGA transmission, the UE monitors for a response from the network within a configured window. For CFRA, dedicated preamble and PUSCH resource are configured for MSGA transmission and upon receiving the network response, the UE ends the random access procedure. For CBRA, if contention resolution is successful upon receiving the network response, the UE ends the random access procedure; while if fallback indication is received in MSGB, the UE performs MSG3 transmission using the UL grant scheduled in the fallback indication and monitors contention resolution. If contention resolution is not successful after MSG3 (re)transmission(s), the UE goes back to MSGA transmission.

If the random access procedure with 2-step RA type is not completed after a number of MSGA transmissions, the UE can be configured to switch to CBRA with 4-step RA type.

For the random access procedure towards an LTM candidate cell for early UL TA acquisition, CFRA triggered by a PDCCH order is used. The UE sends MSG1 towards the cell without monitoring for a response from it. To support UE power ramping, the UE may perform MSG1 retransmission as indicated by the network.

For random access in a cell configured with supplementary uplink (SUL), the network can explicitly signal which carrier to use (UL or SUL). Otherwise, the UE selects the SUL carrier if and only if the measured quality of the DL is lower than a broadcast threshold. UE performs carrier selection before selecting between 2-step and 4-step RA type. The RSRP threshold for selecting between 2-step and 4-step RA type can be configured separately for UL and SUL. Once started, uplink transmissions of the random access procedure remain on the selected carrier.

The network can associate a set of RACH resources with feature(s) applicable to a Random Access procedure: Network Slicing (see clause 16.3), (e) RedCap (see clause 16.13), SDT (see clause 18), and NR coverage enhancement (see clause 19). A set of RACH resources associated with a feature is only valid for random access procedures applicable to at least that feature; and a set of RACH resources associated with several features is only valid for random access procedures having at least each of these features. The UE selects the set(s) of applicable RACH resources, after uplink carrier (i.e. normal uplink (NUL) or supplementary uplink (SUL)) and BWP selection and before selecting the RA type.

When CA is configured, random access procedure with 2-step RA type is only performed on PCell while contention resolution can be cross-scheduled by the PCell.

When CA is configured, for random access procedure with 4-step RA type, the first three steps of CBRA occur on the PCell while contention resolution (step 4) can be cross-scheduled by the PCell. The three steps of a CFRA started on the PCell remain on the PCell. CFRA on SCell can only be initiated by the gNB to establish timing advance for a secondary TAG: the procedure is initiated by the gNB with a PDCCH order (step 0) that is sent on an activated SCell of the secondary TAG, preamble transmission (step 1) takes place on the SCell, and Random Access Response (step 2) takes place on PCell.

When two TAG IDs are configured for the serving cell, the TAG for which the TA command is applied is indicated in Random Access Response message or in MSGB.

Small Data Transmission (SDT) is a procedure allowing data and/or signalling transmission while remaining in RRC_INACTIVE state (i.e. without transitioning to RRC_CONNECTED state). SDT is enabled on a radio bearer basis and can be initiated either by the UE in case of MO-SDT (Mobile Originated SDT) or by the network in case of MT-SDT (Mobile Terminated SDT). MO-SDT is initiated by the UE only if less than or equal to a configured amount of UL data awaits transmission across radio bearers for which SDT is enabled, the DL RSRP is above a configured threshold, and a valid SDT resource is available as specified in clause 5.27.1 of TS 38.321 [REF6]. MT-SDT is initiated by the network with an indication to the UE in a paging message when DL data awaits transmission for radio bearers configured for SDT; based on the indication, the UE initiates the MT-SDT only if the DL RSRP is above a configured threshold as specified in clause 5.27.1 of TS 38.321 [REF6]. When MT-SDT is initiated by the UE, a resume cause indicating MT-SDT is included in the RRCResumeRequest/RRCResumeRequest1. Maximum duration the SDT procedure can last is dictated by a SDT failure detection timer that is configured by the network (see clause 6.2.2 of TS 38.331 [REF7]). Network can enable MO-SDT, MT-SDT, or both in a cell.

SDT procedure is initiated with either a transmission over RACH (configured via system information) or over Type 1 configure grant (CG) resources (configured via dedicated signalling in RRCRelease). The SDT resources can be configured on initial BWP for both RACH and CG. RACH and CG resources for SDT can be configured on either or both of NUL and SUL carriers. The CG resources for SDT are valid only within the PCell of the UE when the RRCRelease with suspend indication is received. CG resources are associated with one or multiple SSB(s). For RACH, the network (e.g., the network 130) can configure 2-step and/or 4-step RA resources for MO-SDT. When both 2-step and 4-step RA resources for MO-SDT are configured, the UE selects the RA type. If MT-SDT procedure is initiated over RACH, only the RACH resources not configured for SDT can be used by the UE. CFRA is not supported for SDT over RACH.

Once initiated, the SDT procedure is either:

successfully completed after the UE is directed to RRC_IDLE (via RRCRelease) or to continue in RRC_INACTIVE (via RRCRelease or RRCReject) or to RRC_CONNECTED (via RRCResume or RRCSetup); or unsuccessfully completed upon cell re-selection, expiry of the SDT failure detection timer, a MAC entity reaching a configured maximum PRACH preamble transmission threshold, an RLC entity reaching a configured maximum retransmission threshold, or integrity check failure while SDT procedure is ongoing, or expiry of SDT-specific timing alignment timer or configuredGrantTimer while SDT procedure is ongoing over CG and the UE has not received a response from the network after the initial PUSCH transmission.

Upon unsuccessful completion of the SDT procedure, the UE transitions to RRC_IDLE.

For SDT, network should not send RRCReject in response to RRCResumeRequest/RRCResumeRequest1 if DL data over any radio bearer configured for SDT is transmitted.

The initial PUSCH transmission during the SDT procedure includes at least the CCCH message. When using CG resources for initial SDT transmission, the UE can perform autonomous retransmission of the initial transmission if the UE does not receive confirmation from the network (dynamic UL grant or DL assignment) before a configured timer expires as specified in clause 5.4.1 of TS 38.321 [REF6]. After the initial PUSCH transmission, subsequent transmissions are handled differently depending on the type of resource used to initiate the SDT procedure:

When using CG resources, the network can schedule subsequent UL transmissions using dynamic grants or they can take place on the following CG resource occasions. The DL transmissions are scheduled using dynamic assignments. The UE can initiate subsequent UL transmission only after reception of confirmation (dynamic UL grant or DL assignment) for the initial PUSCH transmission from the network. For subsequent UL transmission, the UE cannot initiate re-transmission over a CG resource.

When using RACH resources, the network can schedule subsequent UL and DL transmissions using dynamic UL grants and DL assignments, respectively, after the completion of the RA procedure.

When SDT procedure is initiated, AS security is applied for the radio bearers enabled for SDT as specified in clause 5.3.13.3 of TS 38.331 [REF7].

While the SDT procedure is ongoing, if data appears in a buffer of any radio bearer not enabled for SDT, the UE (e.g., the UE 116) initiates a transmission of a non-SDT data arrival indication using UEAssistanceInformation message to the network and, if available, includes the resume cause.

SDT procedure over CG resources can only be initiated with valid UL timing alignment. The UL timing alignment is maintained by the UE based on a SDT-specific timing alignment timer configured by the network via dedicated signalling and, for initial CG-SDT transmission, also by DL RSRP of configured number of highest ranked SSBs which are above a configured RSRP threshold. Upon expiry of the SDT-specific timing alignment timer, the CG resources are released while maintaining the CG resource configuration.

Logical channel restrictions configured by the network while in RRC_CONNECTED state and/or in RRCRelease message for radio bearers enabled for SDT, if any, are applied by the UE during SDT procedure.

The network may configure UE to apply robust header compression (ROHC) continuity for SDT either when the UE initiates SDT in the PCell of the UE when the RRCRelease with suspend indication was received or when the UE initiates SDT in a cell of its RNA.

For SDT procedure over CG resources, the network may configure maximum time duration until the next valid CG occasion for initial CG-SDT transmission based on which the UE decides whether SDT procedure over CG resources can be initiated. The maximum time duration is configured per logical channel for MO-SDT and per UE for MT-SDT.

In recent years, Internet of Things (IoT) has attracted attention in wireless communications. More 'things' are expected to be interconnected for improving productivity efficiency and increasing comforts of life. Further reduction of size, complexity, and power consumption of IoT devices can enable the deployment of tens or even hundreds of billion IoT devices for various applications and provide added value across the entire value chain. It is not feasible to power the IoT devices by battery that needs to be replaced or recharged manually, which leads to high maintenance cost, serious environmental issues, and even safety hazards for some use cases (e.g., wireless sensor in electric power and petroleum industry).

Most of the existing wireless communication devices are powered by battery that needs to be replaced or recharged manually. The automation and digitalization of various industries open numbers of new markets requiring new IoT technologies of supporting battery-less devices with no energy storage capability or devices with energy storage that do not need to be replaced or recharged manually. The form factor of such devices must be reasonably small to convey the validity of target use cases.

Figure 5:
FIG. 5 illustrates a diagram of example ambient-power enabled internet of things (A-IoT) device functionalities according to embodiments of the present disclosure.
Figure 5:
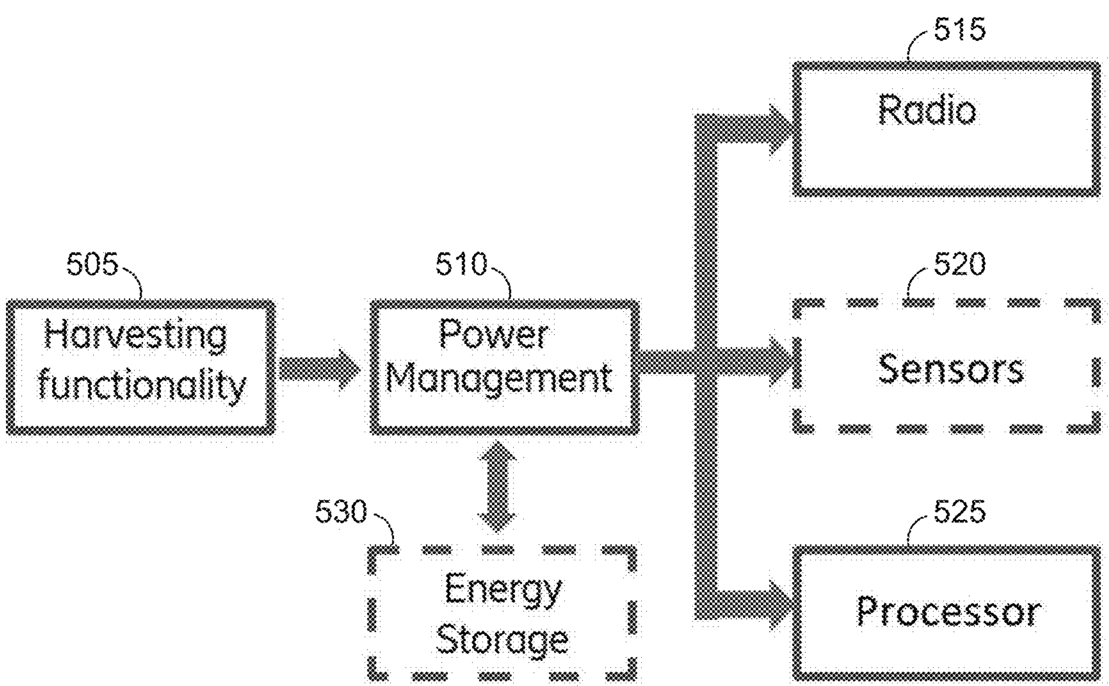

FIG. 5 illustrates a diagram of example A-IoT device 500 according to embodiments of the present disclosure. For example, A-IoT device 500 can be implemented by any of the UEs 111-116 of FIG. 1. In other examples, the A-IoT device 500 may only include the components shown in FIG. 5. This example is for illustration only and other embodiments can be used without departing from the scope of the present disclosure.

TR 22.840 [REF10] includes use cases, traffic scenarios, and device constraints of ambient power-enabled Internet of Things (A-IoT) and identifies new potential service requirements as well as new key performance indicators (KPIs). For brevity, ambient-power-enabled IoT is also referred to as ambient IoT (A-IoT).

An A-IoT device can be an IoT device that satisfies one or more of the following (or variations thereof):

- powered by energy harvesting, being either battery-less or with limited energy storage capability (e.g., using a capacitor) and the energy is provided through the harvesting of radio waves (including RF waveforms), light (including solar light or indoor light), motion, pressure, heat, or any other power source that could be seen suitable;
- with low complexity, small size and lower capabilities and lower power consumption than previously defined 3GPP IoT devices (e.g., NB-IoT/enhanced machine type communication (eMTC) devices);
- maintenance free and can have long life span (e.g., more than 10 years).

An example type of application for A-IoT in [REF10, TR 22.840] is asset identification, which presently has to resort mainly to barcode and RFID in most industries. The main advantage of these two technologies is the ultra-low complexity and small form factor of the tags. However, the limited reading range of a few meters usually requires handheld scanning which leads to labor intensive and time-consuming operations, or RFID portals/gates which leads to costly deployments. Moreover, the lack of interference management scheme results in severe interference between RFID readers and capacity problems, especially in case of dense deployment. It is hard to support large-scale network with seamless coverage for RFID.

A group of use-cases evaluated in [REF10, TR 22.840] include asset inventory or tracking (such as automated warehousing, smart factory/market, logistics, lost items, and so on), wherein communication for an A-IoT UE is typically triggered by a discovery or trigger signal from the network or a management platform, and the A-IoT UE usually responds by transmitting its identity (ID), together with some location-related information. Some use-cases in this group include A-IoT UEs with low to moderate mobility.

Such use-cases presently may resort mainly to barcode and RFID in most industries. The main advantage of these two technologies is the ultra-low complexity and small form factor of the tags. However, the limited reading range of a few meters usually requires handheld scanning which leads to labor intensive and time-consuming operations, or RFID portals/gates which leads to costly deployments. Moreover, the lack of interference management scheme results in severe interference between RFID readers and capacity problems, especially in case of dense deployment. It is hard to support large-scale network with seamless coverage for RFID.

Another group of use-cases evaluated in [REF10, TR 22.840] include use-cases for remote environmental monitoring (such as, electric grid, smart home/farm/city, base station machine room, and so on) wherein communication for an A-IoT UE is typically triggered by the A-IoT device and may include periodic or on-demand communication, such as the device ID usually along with some sensor measurement reports. Devices in this group of use-cases have typically no/low mobility.

Yet another group of use-cases include command, where the network or the management platform indicates to the A-IoT UE to perform certain tasks or operations or commands (such as read from device memory, write to the device memory, lock the device, kill the device, and so on).

Regarding the limited size and complexity required by practical applications for battery-less devices with no energy storage capability or devices with limited energy storage that do not need to be replaced or recharged manually, the output power of energy harvester is typically from 1 μW to a few hundreds of μW. Existing cellular devices may not work well with energy harvesting due to their peak power consumption of higher than 10 mW.

Since existing technologies cannot meet the requirements of target use cases, A-IoT technology is evaluated and an associated number of connections and/or device density can be orders of magnitude higher than existing 3GPP IoT technologies. The A-IoT technology is intended to provide complexity and power consumption orders of magnitude lower than the existing 3GPP low power wide area (LPWA) technologies (such as RedCap, eMTC, IIOT, NR IoT, and LTE NB-IoT including with reduced peak Tx power), and can address use cases and scenarios that cannot otherwise be fulfilled based on existing 3GPP LPWA IoT technologies, therefore, ultra-low complexity devices with ultra-low power consumption for the very-low-end IoT applications.

With reference to FIG. 5, example functionalities of the A-IoT device 500 are shown, where boxes/functionalities with solid edges are typically present (e.g., mandatory), while boxes/functionalities with dashed edges may be optionally present depending on the use-case, deployment, or implementation.

The A-IoT device 500 includes harvesting functionality 505, which harvests energy from an external source as discussed in greater detail below, and power management 510, which utilizes the harvested energy to power other components of the A-IoT device 500, such as the radio 515, the sensors 520, and processor 525, and/or stores in energy storage 530, such as a battery or capacitor, for example. The radio 515 can be a transceiver, such as transceiver 310, and/or a low power radio, using a protocol such as Bluetooth low energy or another IoT communication protocol such as thread Zigbee, Matter, Thread, etc. The sensors 520 may include one or more temperature sensors, motion detection sensors, proximity sensors, camera sensors, and/or any other type of sensor for the operation of the A-IoT device 500. The processor 525 can be a processor, such as processor 340, and/or a microcontroller to control the overall operation of the A-IoT device 500 at low power levels using power from energy storage 530 and power management 510. For example, the processor 525 may control operations for on-demand synchronization and communication.

A-IoT devices/UEs can be categorized at least in the following three device/UE types:

- Type-A devices: Pure battery-less devices with no energy storage capability at all, so completely dependent on the availability of an external source of energy (mainly RF waveform), and without any active hardware elements, therefore operating based on passive hardware elements, e.g., via backscattering;
- Type-B devices: Devices with limited energy storage capability that do not need to be replaced or recharged manually (for example, small capacitors that are charged with energy harvesting from RF waveform or other energy sources such as light, heat, pressure, and so on), and without any active hardware elements, therefore operating based on passive hardware elements, e.g., via backscattering;
- Type-C devices: Devices with limited energy storage capability that do not need to be replaced or recharged manually (for example, small capacitors that are charged with energy harvesting from RF waveform or other energy sources such as light, heat, pressure, and so on), and with active hardware elements.

An active hardware element may refer to an electronic component that supplies energy to a circuit or relies on an external power source to control or modify electrical signals. Examples include a voltage sources, current sources, transistors, silicon-controlled rectifiers, tunnel diodes, and so on. For example, transistors are able to amplify the power of a signal.

A passive hardware element may refer to an electronic component that (only) receives energy, and does not provide any gain or amplification for an electrical signal, nor it can amplify, oscillate, or generate an electrical signal. Passive elements can dissipate the energy, or absorb/store the energy, for example, in an electric field or a magnetic field. Passive elements do not need any form of electrical power to operate. Examples of passive elements include resistors, inductors, and capacitors.

Alternatively, an A-IoT device may be categorized into the following types:

- Type-1 UE: ~1 μW peak power consumption, has energy storage, initial sampling frequency offset (SFO) up to $10^X$ ppm (e.g., X=1 or 2), neither DL nor UL amplification in the device. The device's UL transmission is backscattered on a carrier wave provided externally.
- Type-2 UE: not exceeding a few hundred μW peak power consumption, has energy storage, initial sampling frequency offset (SFO) up to $10^X$ ppm (e.g., X=1 or 2), both DL and/or UL amplification in the device. The device's UL transmission may be generated internally by the device, or be backscattered on a carrier wave provided externally. For example, a Type-2 UE may only provide internal generation of the UL transmissions (referred to as, e.g., Type-2a UE), or only backscatter the UL transmission on a carrier wave provided externally (referred to as, e.g., Type-2b UE), or may support both functionalities and switch between the two functionalities based on UE implementation decision, higher layer indication, the network indication such as an LP-WUS or a downlink control information (DCI)/PDCCH or a MAC-control element (CE), or based on predetermined events (such as the available energy/power level exceeding or not a certain threshold).

FIGS. 6A, 6B, 6C, and 6D illustrate example systems 610, 620, 630, and 640, respectively, for A-IoT according to embodiments of the present disclosure. For example, systems 610, 620, 630, and 640, respectively, for A-IoT can be implemented in the wireless network 100 of FIG. 1. This example is for illustration only and other embodiments can be used without departing from the scope of the present disclosure.

An A-IoT UE may directly communicate with a base station/gNB, or may indirectly communicate with a base station/gNB through an intermediate/assisting node, such as a handheld device/UE (for example, a "Reader" UE that scans the A-IoT devices), a relay, integrated access and backhaul (IAB) node, a repeater for example a network-controlled repeater (NCR), and so on. The communication can be mono-static wherein the transmitter node to the A-IoT UE is same as the receiving node from the A-IoT UE, or can be bi-static (or multi-static) wherein the transmitter nodes to the A-IoT UE can be different from the receiving nodes from the A-IoT UE.

With reference to FIG. 6 example topologies for A-IoT is shown. FIG. 6A shows an example topology for direct communication of a gNB with an A-IoT UE/device. FIG. 6B shows an example topology for indirect communication of a gNB with an A-IoT UE/device through an intermediate node, such as a relay, repeater, and so on. FIG. 6C shows an example topology for UL-assisted mixed communication of a gNB with an A-IoT UE/device, wherein the gNB is directly communicating with the A-IoT device on the DL, while the gNB is communicating with the A-IoT device on the UL indirectly through an intermediate node, such as a Reader UE, relay, repeater, and so on. Alternatively, a DL-assisted mixed/bi-static communication of gNB with the A-IoT UE/device may be evaluated wherein the gNB is directly communicating with the A-IoT device on the UL, while the gNB is communicating with the A-IoT device on the DL indirectly through an intermediate node, such as a Reader UE, relay, repeater, and so on. FIG. 6D shows an example topology for the communication of the A-IoT device with a "reader" UE for both device-terminated and device-originated communication. In some example, a gNB transmitting DL signals or channels to the A-IoT can be different from a gNB receiving UL signals or channels from the A-IoT.

An A-IoT UE may receive energy from the same nodes to/from the A-IoT UE is communicating with, or the A-IoT UE may have a separate entity/source for providing the energy (including radio/RF waveform energy or non-radio energy sources).

An A-IoT UE may operate in frequency division duplexing (FDD) or time division duplexing (TDD) modes, in FR1 or FR2 frequency bands, and on licensed or unlicensed spectrum. For example, the A-IoT UE operates in FR1 FDD spectrum. An A-IoT UE may co-exist in 5G NR frequency band used by other nodes/UEs in the network, or may operate in frequency bands dedicates to A-IoT UE. An A-IoT UE may also operate in guard-bands of existing 5G NR frequency bands.

The gNB (e.g., the BS 102) can be a micro-cell or a macro-cell, and the A-IoT UE can be indoor or outdoor. For example, for an indoor UE, the gNB can be a micro-cell or a macro-cell, wherein an indoor intermediate node such as a Reader UE can be used to accommodate the DL or UL communications. For example, the gNB can be same as or co-site with common gNB(s) used for communication with common 5G NR UEs.

Since an A-IoT UE can harvest small amounts of energy and an energy storage unit may not be present (for Type-A A-IoT UEs) or may have very small capacity (for Type-B/C A-IoT UEs), the A-IoT UE may need to operate with ultra-low power consumption, for example, smaller than 1 mW peak power level, such as (−10) dBm or down to (−30) dBm. For several use-cases, when setting up communication to an A-IoT UE, the 5G system needs to be able to handle the unavailability of A-IoT UEs either due to lack of power or due to power saving mechanisms of the A-IoT UE.

Various embodiments of the present disclosure may be implemented by one or more electronic devices. As used herein, an electronic device is a hardware device that contains electronic components. For example, the electronic device(s) may be an A-IoT device (e.g., A-IoT device 500), an A-IoT UE, a UE (e.g., UE 116), a reader device, a reader UE, a relay, a repeater, etc.

Various embodiments or examples throughout the present disclosure refer to a "UE". Such reference to "UE" can apply to aforementioned electronic devices, such as A-IoT devices, as described herein, or variations thereof with lower or higher requirements or capabilities. Various methods or examples can also apply to other IoT devices, such as 5G NR IoT devices, NTN IoT devices, 6G IoT devices, 5G RedCap/eRedCap devices, 6G RedCap devices, and so on, or can apply to typical 5G NR UEs, e.g. Rel-18 NR UEs with baseline capabilities. Various method or examples may also apply to intermediate UEs that operate as a hop in between a gNB/Reader and an electronic device, such as A-IoT device, or other variations thereof, as previously described.

Various embodiments or examples throughout the present disclosure refer to a "Reader" or a "gNB". Such reference to "Reader" or "gNB" can be used interchangeably, or a Reader can be a node in the communication topology separate from the gNB, such as a dedicated "network-like" entity that manages the communications or transmissions or receptions among the electronic devices/"UEs" such as A-IoT devices. For example, the "Reader" can be an intermediate UE.

Various embodiments or examples throughout the present disclosure refer to "DL" channels, using various terms such as "o-PDCCH", "o-PDSCH", "o-PBCH" and so on. Such reference can apply to a communication from a "gNB" to a "UE" as previously described, such as a channel from a Reader to an electronic device such as A-IoT device. For example, the link can be referred to as Reader-to-Device (R2D), and a corresponding channel can be referred to as physical reader to device channel (PRDCH). Such PRDCH can be directly originated at the Reader, or by another network entity such as a gNB or an IAB node or via a network-controlled repeater (NCR) or a reconfigurable intelligent surface (RIS) or a hybrid reflection channel (HRC), or can be originated by a Core Network, or by an external management entity that governs the A-IoT devices.

Various embodiments or examples throughout the present disclosure refer to "DL signals" such as "LP-WUS". A reference to "DL" can be as previously described. A reference to the term "signal" may be used to imply a sequence-based structure (as opposed to channel-coding-based structure) of a corresponding transmission or reception, although such transmission or reception, such as LP-WUS may be typically information bearing and can be more formally considered as a channel. In various examples or methods, "LP-WUS" can be same as an NR Rel-18/19 sequence-based wake-up channel that can be received and processed by a low-power receiver (LP-WUR) or a low-power radio (LR) for short, and can trigger a paging reception by a main radio (MR). In various examples or methods, such "LP-WUS" can be used to generally refer to a sequence-based reception from gNB/Reader to a UE/device/A-IoT device to provide a paging message or to trigger a reception of a paging message, that can be received by a same radio of the electronic device/A-IoT devices. For example, such "LP-WUS" can be realized as a PRDCH with a content that provides such paging cause and/or other associated information for paging, such as UE/device ID or UE-/device-group ID, and so on, as described in the present disclosure.

Various embodiments or examples throughout the present disclosure refer to "LP-SS" as a low-power (e.g., OOK-based) sequence-based synchronization signal. Such LP-SS can be realized with same design as in NR Rel-18/19 LP-WUS, or can be realized by any other sequence, such as bit sequence, or sequence of OOK-modulated symbols, that can be used for one or more of: establishing global or local synchronization, relative timing or symbol timing, global or local frequency synchronization, channel estimation, coherent reception (e.g., for subsequent receptions), and so on.

Various embodiments or examples throughout the present disclosure refer to "UL" channels, using various terms such as "o-PRACH", "o-PUCCH", "o-PUSCH" and so on. Such reference can apply to a communication from a "UE" to a "gNB" as previously described, such as a channel from an electronic device such as A-IoT device to a Reader. For example, the link can be referred to as Device-to-Reader (D2R), and a corresponding channel can be referred to as physical device to reader channel (PDRCH). Such PDRCH can be directly received at the Reader, or can be passed (with or without processing) to another network entity such as a gNB or an IAB node or via an NCR or a RIS or an HRC, or to a Core Network, or to an external management entity that governs the A-IoT devices.

For example, [REF10, TR 22.840] evaluates the following three potential modes of operation for an A-IoT UE:

Normal operation: power continuously or mostly available, due to continuous power harvesting or with limited energy storage (e.g. in a capacitor)

Processor and communications module in the A-IoT UE can be continuously active.

The communications module can listen to network at certain occasions such as regular intervals to determine if there is mobile terminated traffic (e.g. trigger messages) and can transmit data when relevant.

Device triggered operation: power available only intermittently & activation per device decision A-IoT UE can only be active for the short periods of time.

A-IoT UE decides when to communicate with the network.

It is feasible that the A-IoT UE is not able to listen to the network for mobile terminated traffic for very long periods of time.

On demand (or network-triggered) operation: wake up/trigger the A-IoT UE per 5G network indication/signal The A-IoT UE cannot determine when to communicate.

Waking up of the A-IoT UE can be combined with a trigger to perform a specific action (e.g. do measurement) or to communicate (e.g. send an identifier).

Waking up can also imply that the A-IoT UE starts listening to the network (e.g., the network 130) for further instructions.

Several A-IoT use-cases rely on a network (NW) trigger, such as a discovery or trigger or wake-up signal, to initiate the connection/communication, while for other A-IoT use-cases, the communication can be initiated by a device internal trigger, such as an event-based trigger. The communication can follow in a periodic manner or in an on-demand or aperiodic or event-based manner. In several use-cases, the communication/data "transfer interval" can be short, so the UE may be active for a short period of time. The A-IoT UE may not need a radio connection before or after the "transfer interval" or the activity period.

For various A-IoT use-cases, a communication payload can be very small, such as tens or hundreds of bits in occasional and infrequent intervals (for example, every 15 minutes, or every hour or more). In addition, several use-cases have a relaxed latency requirement, such as an end-to-end latency of 100 ms to 10 sec or more, thereby implying a data rate of several kilo-bits per second (kbps) or less. A majority of A-IoT use-cases require device-originated/UL traffic, including a predetermined ID of the A-IoT UE and, in several use-cases, also some sensor measurement reports. Some use-cases may also involve device-terminated/DL traffic such as control commands for the A-IoT UE, for example, to enable/modify a status or operation of the A-IoT UE.

Several A-IoT use-cases rely on group communication to/from a group of A-IoT UEs, such as a number of A-IoT UEs of a same type/functionality or a number of A-IoT UEs in proximity such as in a same container or geographic location.

Some A-IoT use-cases evaluate the network or a management platform collecting information about the energy harvesting status of A-IoT UEs, such as charging per data volume/message, charging information for a large group of closely located A-IoT UEs, and so on, in an efficient way.

An A-IoT UE may operate in indoor or outdoor environments, including with macro/micro/pico cell-based deployments. Several A-IoT use-cases (for example, for indoor deployment) may require a communication range of ~10-30 m (with some up to 50 m). Several other A-IoT use-cases (for example, for outdoor deployments) may require a larger communication range such as ~50-200 m.

Throughout the present disclosure, the term "pre-configuration" or "configuration" or "higher layer configuration" and variations thereof (such as "configured" and so on) are used to refer to one or more of: pre-configuration such by an external management entity, such as, operation and management (OAM), as a system information signaling such as by a MIB or a SIB (such as SIB1), a common or cell-specific information provided by dedicated higher layer/RRC signaling, or a dedicated or UE-specific or BWP-specific information provided by dedicated higher layer/RRC signaling.

In various embodiments or examples throughout the present disclosure, a UE or a device may refer to an A-IoT device or an A-IoT UE based on energy harvesting with ultra-low complexity and power consumption and for low-end IoT applications, as previously described. For example, the UE may have limited (or no) energy storage or battery capability (e.g., a capacitor), such as an energy storage unit for amplification of receptions at the UE or transmission by the UE, or for other UE operations, such as power-on, warm-up, memory, internal processing, and so on, or operating with backscattering communication.

In various embodiments throughout the present disclosure, a UE can refer to a low-power UE (for example, operating with a transmission or reception power less than 0 dBm), such as an Ambient-power-enabled IoT (or Ambient-IoT, "A-IoT", for short) device, such as a UE with energy harvesting or wireless power-transfer capability. The methods herein are generic and can apply to any UE with or without such features or capabilities.

Various embodiments throughout the present disclosure may broadly apply to any UE, such as a UE with an output energy/power level that is variable over time, for example, due to energy harvesting from the environment, while the UE may operate with advanced capabilities or for higher-end applications or with more stringent requirements.

Various embodiments throughout the present disclosure may generally apply to any UEs, such as a UE with a simplified or energy-efficient characteristics or transceiver design, or with components with such features. For example, various methods may apply to a UE with a first main radio with baseline performance design or more advanced capabilities or higher energy/power consumption, referred to as e.g. main radio (MR), and a second radio with simplified design and smaller energy/power consumption, referred to as e.g. low-power radio (LR), for example, as evaluated in Rel-19 LP-WUS feature. For example, some methods or examples may apply to such LR or both of LR and MR.

Communication setting for A-IoT UE is discussed, including operating frequency. In one embodiment, a UE operates in a single carrier frequency/band or in a single sub-band/sub-channel/channel associated with one frequency band. The UE can operate in different carrier frequencies/bands or different sub-bands/sub-channels/channels in different time instances, for example, different operation round, or in a TDM or time-interleaved manner.

In various embodiments, the UE can operate with an RRC protocol having a single RRC state, such as RRC INACTIVE state. Alternatively, no RRC state may be applicable to the UE.

In various embodiments, the UE operates in a single carrier frequency. For example, the UE supports only one carrier frequency or one frequency band. For example, the UE operates in the one carrier frequency or the one frequency band.

In one example, the UE operates in a sub-band/sub-channel/channel associated with one frequency band (such as, a sub-band/sub-channel/channel from 50 "channels", each of 500 kHz bandwidth, in the ultra high frequency (UHF) band 902 MHz to 928 MHz). For example, the UE operates in the sub-band/sub-channel/channel across different time-domain resources. For example, the sub-band/sub-channel/channel can be predetermined or preconfigured, such as based on manufacturer's declaration or based on OAM.

In another example, the UE supports more than one "sub-bands/channels" within one frequency band, and the UE can operate in different sub-bands/channels at different times or different time periods, such as in TDM manner, or time-interleaved manner, or a time pattern, or based on gNB/Reader indication. For example, the UE operates in one sub-band/channel at each point in time, or in each operation round. For example, the UE can operate in different sub-bands/channels for different transmissions or receptions, in different time instances or different time resources, during one operation round. For example, the UE can be provided information of an applicable frequency sub-band/channel corresponding to a time domain resource based on explicit or implicit gNB indication, or the UE can determine such information based on predetermined rules in the specifications of system operation. For example, such sub-band or sub-channel can be associated with a frequency domain offset/shift, such as a small frequency-domain offset/shift, or a number or a factor of one or more such small frequency-domain offsets/shifts. The term 'small' in small frequency-domain offset/shift can refer to shifting a reflected or back-scattered signal from a first sub-channel to a second sub-channel that is, for example, a few MHz apart in frequency domain (as opposed to a large frequency-domain shift by a few tens of MHz from FDD DL spectrum to FDD UL spectrum or vice versa). For example, such frequency-domain offset can apply to a channel from the UE (such as ambient IoT device) to the gNB or reader, also referred to as a D2R channel, or a PDRCH. In another example, such a frequency-domain offset can apply to a channel from the gNB or reader to the UE (such as ambient IoT device), also referred to as a R2D channel, or a PRDCH. In another example, such frequency-domain offset/shift may only apply to PDRCH, and may not apply to PRDCH.

For example, the UE can support more than one carrier frequency or frequency band, and the UE can operate in (only) one carrier frequency or one frequency band at each point in time, or in a given time period, such as one operation round. For example, the UE can operate in different carrier frequencies or frequency bands at different times or different time periods, such as in TDM manner, or time-interleaved manner, or based on a time pattern.

Carrier wave (CW) for A-IoT UE is discussed. In various embodiments, the UE can receive a carrier wave (CW), also referred to as continuous wave. For example, the UE uses the CW as a source for RF-based energy harvesting, for instance, using rectifier circuits. The UE can additionally or alternatively harvest energy from other non-RF energy resources, such as solar, thermal, pressure, and so on. The UE (e.g., the UE 116) can receive the CW in same frequency as DL receptions or UL transmissions, or in a different carrier frequency/band. The UE can receive the CW continuously or periodically or based on a time pattern such as a duty cycle, or in a semi-persistent or aperiodic manner.

For example, the CW can be transmitted by the gNB, or by a Reader such as a Reader UE, or by an intermediate node between UE and the gNB, such as IAB or NCR or relay node, or by an external node that is separate from the UE and the gNB or separate from the communication topology. For example, a source of the CW may be transparent to the UE, or may be known to the UE, or the UE may be able to determine the source of the CW based on UE implementation, e.g., based on CW characteristic, or based on pre-configuration such as OAM.

For example, a UE capability for such determination of the CW source can be declared by the manufacturer or can be indicated by UE capability signaling such as RRC signaling. For example, a default expectation can be that a source of the CW is transparent to the UE.

For example, the CW is an unmodulated (i.e., non-information-bearing) waveform. For example, the CW can be regarded as a waveform providing/modulating an all-1 s bit sequence.

For example, a CW waveform can be a sine wave, square wave, ramp or triangular wave, sawtooth wave, pulse wave, cardiac pattern wave, or a gaussian pulse wave. For example, the CW waveform can be OFDM.

For example, the UE supports only one waveform for the CW. For example, the UE can support more than one waveform for the CW, and declares the supported waveforms as part of the manufacture declarations, or indicates the supported waveforms as UE capability via over-the-air signaling such as RRC signaling.

For example, the waveform for the CW, such as sine wave, is predetermined in the specifications of the system operation or is provided by pre-configuration such as OAM, or is indicated to the UE (via over-the-air signaling such as RRC signaling) as part of the prior coordination before/during an operation round. For example, the UE is expected to support multiple waveforms and the UE determines the operating waveform (in a given operation round) such as by blind detection among the supported waveforms.

For example, the UE receives a CW continuously, or based on a time pattern or based on a duty cycle, and so on, as subsequently described.

For example, the specifications of the system operation predetermine an applicable CW reception mode, such as which one of continuous, or time pattern based, or duty cycle CW reception applies. In another example, an applicable CW reception mode can be preconfigured such as by OAM or by other system-information-like signaling for pre-coordination, as subsequently described, or by RRC signaling.

For example, the UE receives the CW (at least) during operation. Herein, "operation" refers, for example, to any time period involving transmission or reception by the UE, also including any associated procedures, such as any prior coordination between the UE and the gNB, Reader UE, or an intermediate node. For example, the operation can be in multiple rounds, wherein each operation round can include a set of transmissions or receptions, such as a set of transmissions or receptions corresponding to a certain task or a certain group of tasks, for example for identification or inventory of the UE or for accessing the UE such as for reading from the UE memory or writing to the UE memory or for locking the UE and so on. For example, the UE receives the CW within or during the operation rounds. For example, the UE can (also) receive the CW for a first time period before an operation round starts, or for a second time period after an operation round is completed. For example, the first and second time periods can be predetermined in the specifications or can be preconfigured such as by OAM or by other signaling for pre-coordination, as subsequently described, or by RRC signaling or L1/L2 signaling.

For example, when the UE does not receive the CW (or a modulated variant thereof) in a given time instant, or for a time duration exceeding a predetermined/preconfigured threshold, the UE expects that the "operation" is ended (at least in the corresponding carrier frequency). In such case, the UE may switch to another operating carrier frequency or may remain the same carrier frequency while going to a sleep/hibernate mode or may switch off (for a certain time duration). For example, the UE may determine an end of operation (or operation round) when the instantaneous received energy/power of the CW or the accumulated received energy/power level during a certain time period does not exceed a given UE activation threshold. For example, the UE may switch off when an available energy level of the UE, such as an energy level harvested/stored in a corresponding energy storage unit, is below a first threshold. For example, the UE can switch back on when an available energy level of the UE, such as an energy level harvested/stored in a corresponding energy storage unit, exceeds a second threshold. For example, the first and second thresholds can be same or different.

For example, the UE can attempt to continuously receive CW, while a source of the CW may not continuously transmit the CW. For example, the source of the CW may transmit the CW up to implementation. For example, the gNB/Reader or the source of the CW can provide information to the UE based on the parameters of the CW transmission, such as timing of the CW transmission, inter-arrival timing among different CW transmissions, or power level of CW transmissions.

For example, a time pattern for CW can indicate time domain resources, such as symbols, slots, subframes, or frames, in which the UE can receive a CW. For example, the time pattern can indicate time resources in absolute or relative timing. For example, at least for a UE supporting full or partial/local synchronous operation, as subsequently described in one or more embodiments herein, the time resources can be in terms of indexes of symbols/slots/subframes/frames, or other predefined time units that the UE acquires upon synchronization. For example, at least for a UE not supporting full synchronization, such as with asynchronous operation or partial/local synchronous operation, as subsequently described in one or more embodiments herein, the time resources can be in terms of a (continuous) time duration (such as milli-seconds or micro-second, and so on) or in terms of a number of (discrete) symbols or other predefined time units, relative to a reference time, such as a time occasion or a reception time corresponding to a predetermined or preconfigured DL reception such as a NW trigger or a reference signal, or a synchronization signal such as LP-SS or SSB and so on.

For example, the time pattern can be periodic or semi-persistent or aperiodic. For example, a periodic time pattern can be based on a periodicity and an offset, wherein the offset can be in absolute timing such as a certain index for a symbol/slot/subframe/frame or in relative timing such as a certain time duration or a certain number of symbol or other predefined time units relative to a reference time, as previously described.

For example, a semi-persistent time pattern can be based on a periodicity and an offset, as previously described, along with an activation/deactivation, such as L1/L2 activation or deactivation, from higher layers of UE, or from the gNB or from the Reader UE, or from an intermediate node, or for an external node that provides the CW.

For example, an aperiodic time pattern can be an irregular or arbitrary indication of time resources in which the UE receives the CW, such as a bitmap of length N bits, where a value 1 in the bitmap indicates CW reception in the corresponding time resource (or group of time resources), and a value 0 indicates no CW reception in the corresponding time resource (or group of time resources). In another example, the UE can receive an indication such as an as L1/L2 indication for an upcoming CW reception or a set of upcoming CW receptions. For example, the indication can include one or more of: an offset for the (earliest) upcoming CW reception relative to a time resource in which the UE receives the L1/L2 indication; a number of CW receptions, a number of time units for each upcoming CW reception; and inter-arrival times between different CW transmissions. For example, the UE receives the L1/L2 indication from the gNB (e.g., the BS 102) or from the Reader UE, or from an intermediate node, or for an external node that provides the CW. For example, the UE can receive an indication by/within a first/previous CW in a first/previous CW occasion that indicates a second CW occasion for a second/next CW.

For example, the time pattern (for any of periodic or semi-persistent, or aperiodic time pattern) can indicate, separately or jointly, a position or number of time resources, or a duration or number of time resources in which the UE can receive the CW. For example, a parameter such as 'start and length indicator' value (SLIV) can be provided that jointly encodes and indicates the starting position and the number of time resources for the CW.

For example, the UE can receive the CW based on a duty cycle pattern, wherein the UE receives the CW during an ON-time or Active-time, and does not receive the CW during an OFF-time or Inactive-time. For example, the UE can receive the CW during the ON/Active-time in a continuous manner or based on a time pattern, such as a periodic or semi-persistent or aperiodic time pattern, as previously described. For example, a duration of ON/Active-time and a duration of OFF/Inactive-time can be predetermined in the specifications or can be preconfigured by OAM or by higher layer signaling such as by RRC signaling or via other pre-coordination signaling, as subsequently described. For example, a duration of ON/Active-time can be independent of UE operations or can be dependent on the UE operations, such as, same as a time duration for an operation round for the UE, or a time duration before or after the UE operation, or can be predetermined/preconfigured/indicated independently of the UE operation, while the ON/Active-time duration can be extended based on the UE operation, such when new DL/UL traffic is arrived, or when additional receptions or transmissions or retransmissions or repetitions are indicated to complete the UE operation.

For example, a UE can receive, at the same time, both the CW and other DL receptions that are in different carrier frequencies or frequency "sub-bands/channels". For example, when the UE receives the CW and other DL receptions in a same carrier frequency or a same frequency "sub-band/channel", the UE can operate in a TDM manner, such as either receiving the CW or receiving other DL receptions, such as DL signals or channels. The UE can continue to harvest energy from other DL receptions as well.

For example, a DL reception such as a DL signal or control/data channel can be a (channel coded and) modulated variation of the CW. In another example, the DL receptions such as DL signals or channels are generated independently from the CW.

For example, a UE is not expected to receive CW and transmit UL transmissions at the same time, in same or different carrier frequencies or frequency "sub-bands/channels", such as when the UE operates in a half-duplex mode, for example, due to UE capability or due to specifications design. For example, the UE operates in a TDM manner, wherein, at any given time (or time unit), the UE either only receives the CW (and/or other DL receptions) or only transmits an UL transmission. In another example, the UE can both receive the CW and transmit UL transmissions at the same time, at least in different carrier frequencies or frequency "sub-bands/channels", as a mandatory feature or up to UE capability.

For example, an UL transmission such as an UL signal or control/data channel can be a (channel coded and) modulated variation of the CW, along with other adjustments such as carrier frequency adjustment when applicable. The latter applies, for example, when the UE does not support active signal generation such as no active RF components, and the UE generates the UL transmissions based on backscattering of the incident CW receptions.

In another example, UL transmissions such as UL signals or UL control/data channels are generated independently from the CW. The latter holds, for example, when the UE is based on active signal generation such as active RF components and can generates the UL transmissions without backscattering the incident CW receptions.

For example, the CW can be transmitted in-band or out-of-band compared to the operating frequency of the UE.

For example, the UE can receive a CW that is at the operating carrier frequency of the UE, or at the "sub-band/channel" associated with the operating carrier frequency. For example, the UE can receive a CW that is in a different "sub-band/channel" of a frequency band in which the UE operates. For example, the UE can receive a CW that is in a different carrier frequency or in a different frequency band than an operating carrier frequency or frequency band for the UE.

For example, the UE can receive the CW in the UL spectrum, such as the UL part of an FDD frequency band. In another example, the UE can receive the CW in DL spectrum, such as the DL part of an FDD frequency band.

For example, support for one or more of the herein can be a UE capability. For example, in-band CW reception can be a default UE capability, and out-of-band CW reception can be separate UE capability indicated by UE manufacturer declaration or per UE capability signaling such as RRC signaling, or vice versa. For example, CW reception in UL spectrum can be a default UE capability, and CW reception in DL spectrum can be separate UE capability indicated by UE manufacturer declaration or per UE capability signaling such as RRC signaling, or vice versa.

For example, a UE can support single-carrier CW or multi-carrier CW. For example, a UE receives the CW in only one carrier frequency. For example, a UE can support multiple CWs in multiple carrier frequencies or multiple frequency bands. For example, the UE can receive a first CW at a first carrier frequency for a first operation round and can receive a second CW at a second carrier frequency for a second operation round. For example, the first and second operation rounds can be in different time resources such as in TDM or time-interleaved manner, or can be in same or overlapping time resources.

For example, a source of the CW, as previously described, can transmit the CW in only one carrier frequency or in different carrier frequencies. For example, a source of the CW can transmit a first CW in a first carrier frequency or frequency band and a second CW in a second carrier frequency or frequency band. For example, a source of the CW can transmit the first and second CWs in same or overlapping time resources, or in different time resources such as TDM. In one example, the multi-carrier CW is only for energy delivery/harvesting purposes, and does not apply to signaling or data transmission/reception. For example, the UE performs energy harvesting based on a CW with multiple carriers, while the UE transmits or receives associated with only one carrier from the multiple carriers. In another example, the multi-carrier CW applies to both energy delivery/harvesting and signaling or data transmission/reception. For example, the UE performs energy harvesting based on a CW with multiple carriers, and also transmits or receives associated with the multiple carriers.

In various embodiments, a UE can use an energy harvesting unit that is independent of the communication settings, e.g. independent of the operating frequency of CW/DL/UL, or can use an energy harvesting unit that can adapt to such communication settings.

For example, the UE can use a fixed energy harvesting unit, such as a fixed impedance matching network (IMN), tuned to one carrier frequency that is supported by the UE. For example, the UE uses the same IMN regardless of the operating sub-band/channel associated with the carrier frequency for DL/UL/CW. For example, the UE may harvest less energy in frequency sub-band/channels further away from the center of the carrier frequency or further away from the operating frequency sub-band/"channels".

In another example, the UE can use a variable/adjustable energy harvesting unit, such as a variable/adjustable IMN with initial values tuned to the one carrier frequency, that can be adjusted in a given range, so that the UE can harvest (almost) the same energy/power level regardless of the frequency position of the operating sub-band/channel associated with the carrier frequency.

For example, for a UE supporting more than one carrier frequency for CW or UL or DL, the UE may use multiple fixed or adjustable/variable IMN, such as one IMN for each supported carrier frequency, or one for each group of supported carrier frequencies. For example, the UE operates only one IMN at each point in time or in each period of time. For example, the UE may use one IMN with multiple states or settings, with each state/setting corresponding to one supported carrier frequency band/sub-band/channel, or one group of supported carrier frequencies/bands/sub-bands/channels.

For example, for a UE with active components, such as having one or more of local oscillator (LO), mixer, amplifier, and so on, the UE can determine an operating frequency channel/carrier/band based on detection (such as energy detection) of CW in the corresponding frequency channel/carrier/band.

For example, an Rx antenna/RF chain of the UE can be continuously open to detect a CW. For example, the UE opens up the Rx antenna/RF chain (at least) in certain times or based on certain periodicity, per UE implementation or per predetermined rules in the specifications (such as a specified time duty cycle or time pattern) or per preconfigured information such as OAM or per gNB/Reader indication such as prior coordination.

For example, the UE can perform energy detection to determine received energy/power above a certain threshold, such as a UE activation threshold, or an energy/power level associated with the CW transmission.

For example, when the UE does not detect an energy/power level exceeding the threshold (for a certain period of time), the UE switches to a different frequency band/sub-band/channel associated with the carrier frequency or a different carrier frequency/band to perform energy/CW detection.

Cell search for A-IoT UE is discussed. In various embodiments, cell search procedure may not apply to a UE, or the UE may apply a limited or simplified variation of cell search by acquiring limited information about the operating cell, such as based on a carrier frequency/band for CW reception.

In one embodiment, no cell search procedure is defined or supported for the UE. The UE need not determine the operating frequency nor the operating sub-band/channel associated with the operating frequency. For example, the UE need not determine the carrier frequency of the DL receptions, or the UL transmissions, or the associated CW.

For example, the UE may be capable of adjusting its energy harvesting component (such as an impedance matching network) to an operating frequency band or an operating carrier frequency or an operating frequency sub-band/channel.

For example, the UE operation is based on backscattering, and UL transmissions by the UE are in the same frequency band/sub-band/channel as that used for UE receptions or for CW reception, without UE knowledge on the (precise or actual) frequency band/carrier/channel used by the gNB/Reader or by an external source of the CW.

For example, a UE may operate in only carrier frequency for DL/UL/CW, and may operate for a single carrier frequency for each of DL or UL or CW. For example, the UE supports operation in only one carrier frequency.

For example, for UEs supporting only one carrier frequency (or only one sub-band/channel associated with the carrier frequency), the UE a priori knows the operating frequency band/channel.

For example, for UEs supporting more than one sub-band/channel associated with a carrier frequency (or supporting more than one carrier frequency), the UE can determine the operating carrier frequency/channel. In one example, a procedure for determining the operating carrier frequency/channel is up to UE implementation and not specified. In another alternative, such procedure is specified. For example, a procedure for determining an operating frequency/channel detection can be based on CW detection, as previously described in one or more embodiments herein. For example, when the UE detects a CW associated with a certain carrier frequency/channel, the UE determines that the UE operates in the corresponding carrier frequency/channel for UL transmissions or DL receptions (or both).

For example, (regardless of whether the UE can or cannot determine an operating frequency band/carrier/sub-band/channel), the UE may not know a serving cell for the operation, such a serving cell for the Reader UE, or a local or global identity of a serving gNB.

For example, an operating carrier frequency for the UE can be in a dedicate frequency band, such as a dedicated frequency band allocated to IoT UEs, for example, A-IoT UEs, or can be in a frequency band that is used by other UEs, such as common UEs, or non-IoT UEs, or non-A-IoT UEs, or can be a guard-band of a frequency band used for such other UEs.

NW trigger for paging, synchronization, and/or random access RA is discussed.

Figure 7:
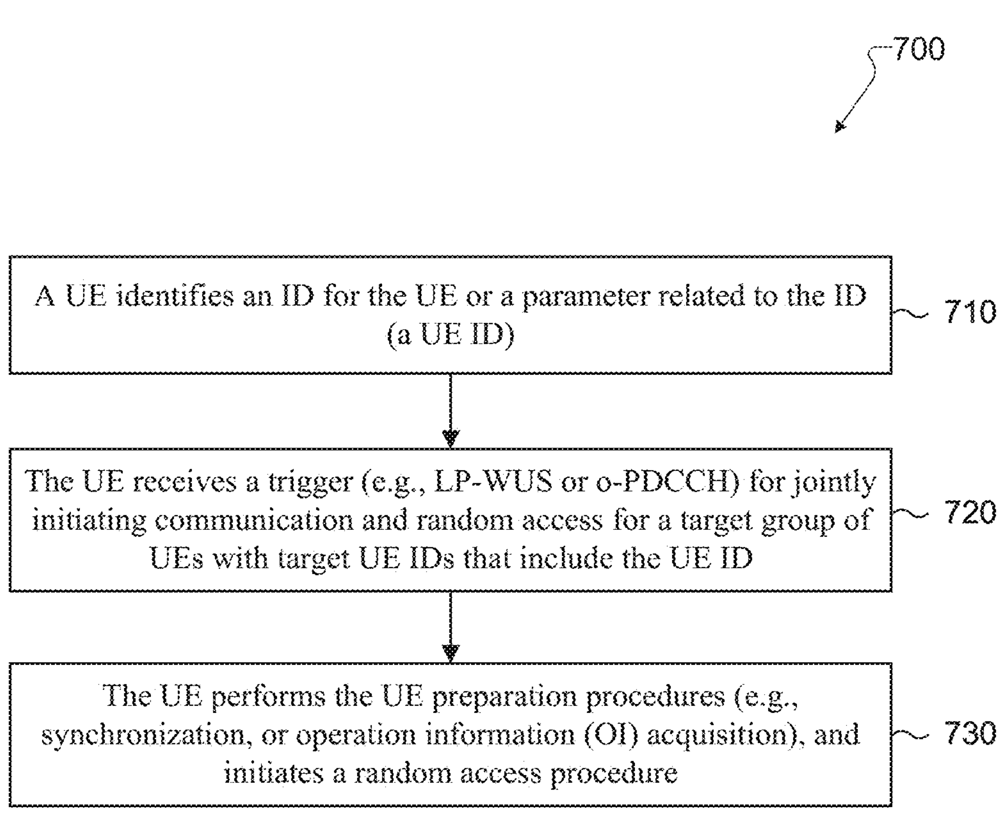
FIG. 7 illustrates a flowchart of an example UE procedure for network (NW)-triggered communication according to embodiments of the present disclosure.

FIG. 7 illustrates a flowchart of an example UE procedure 700 for NW-triggered communication according to embodiments of the present disclosure. For example, UE procedure 700 for NW-triggered communication can be performed by the UE 111 of FIG. 1. This example is for illustration only and other embodiments can be used without departing from the scope of the present disclosure.

The procedure begins in 710, a UE identifies an ID for the UE or a parameter related to the ID (referred to as, a UE ID). In 720, the UE receives a trigger (e.g., LP-WUS or o-PDCCH) for jointly initiating communication and random access for a target group of UEs with target UE IDs that include the UE ID. In 730, the UE performs the UE preparation procedures (e.g., synchronization, or operation information (OI) acquisition), and initiates a random access procedure.

Figure 8:
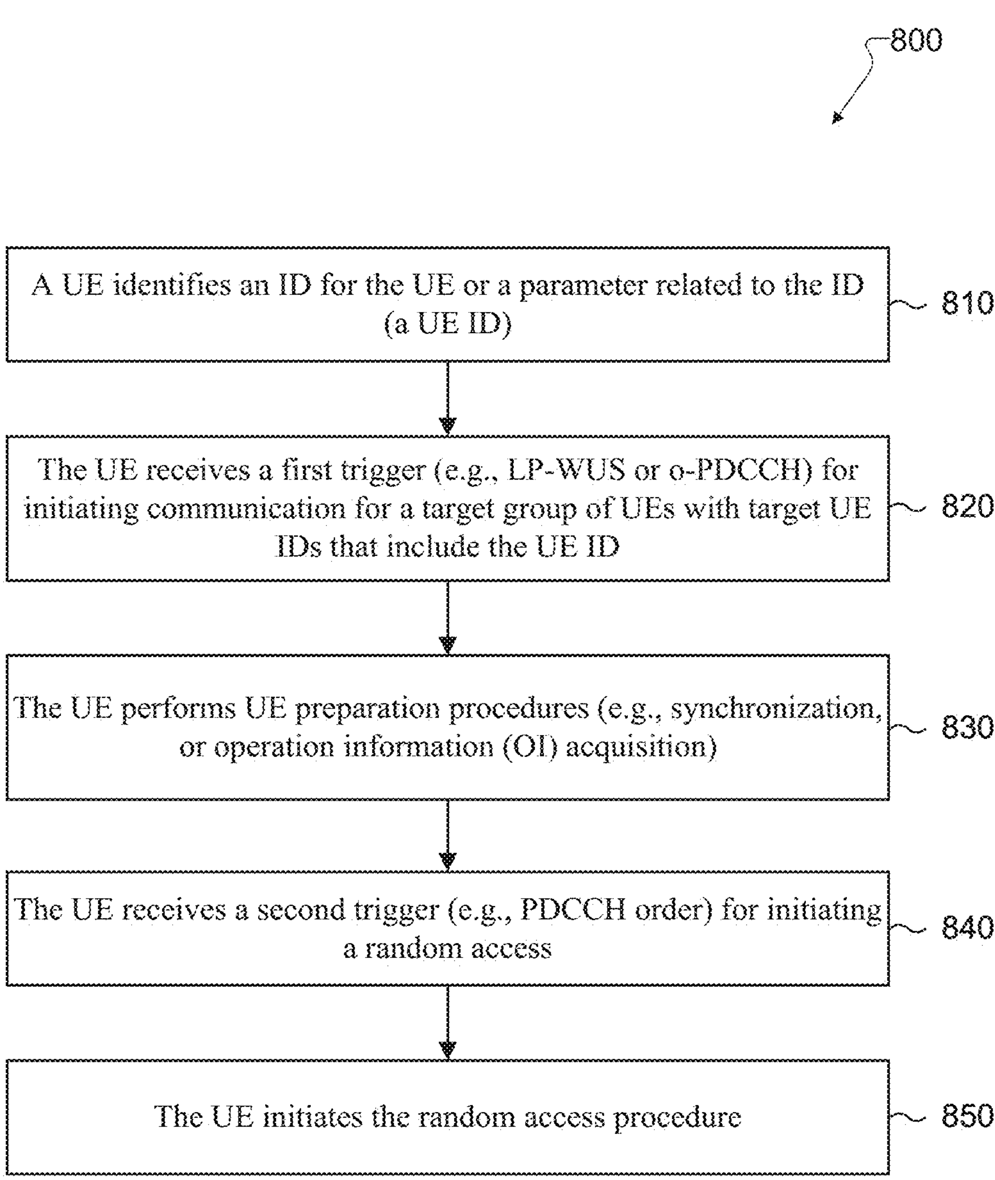
FIG. 8 illustrates a flowchart of an example UE procedure for network-triggered communication according to embodiments of the present disclosure.

FIG. 8 illustrates a flowchart of an example UE procedure 800 for network-triggered communication according to embodiments of the present disclosure. For example, UE procedure 800 for network-triggered communication can be performed by the UE 112 of FIG. 1. This example is for illustration only and other embodiments can be used without departing from the scope of the present disclosure.

The procedure begins in 810, a UE identifies an ID for the UE or a parameter related to the ID (referred to as, a UE ID). In 820, the UE receives a first trigger (e.g., LP-WUS or o-PDCCH) for initiating communication for a target group of UEs with target UE IDs that include the UE ID. In 830, the UE performs UE preparation procedures (e.g., synchronization, or operation information (OI) acquisition). In 840, the UE receives a second trigger (e.g., a PDCCH order) for initiating a random access procedure. In 850, the UE initiates the random access procedure.

Figure 9:
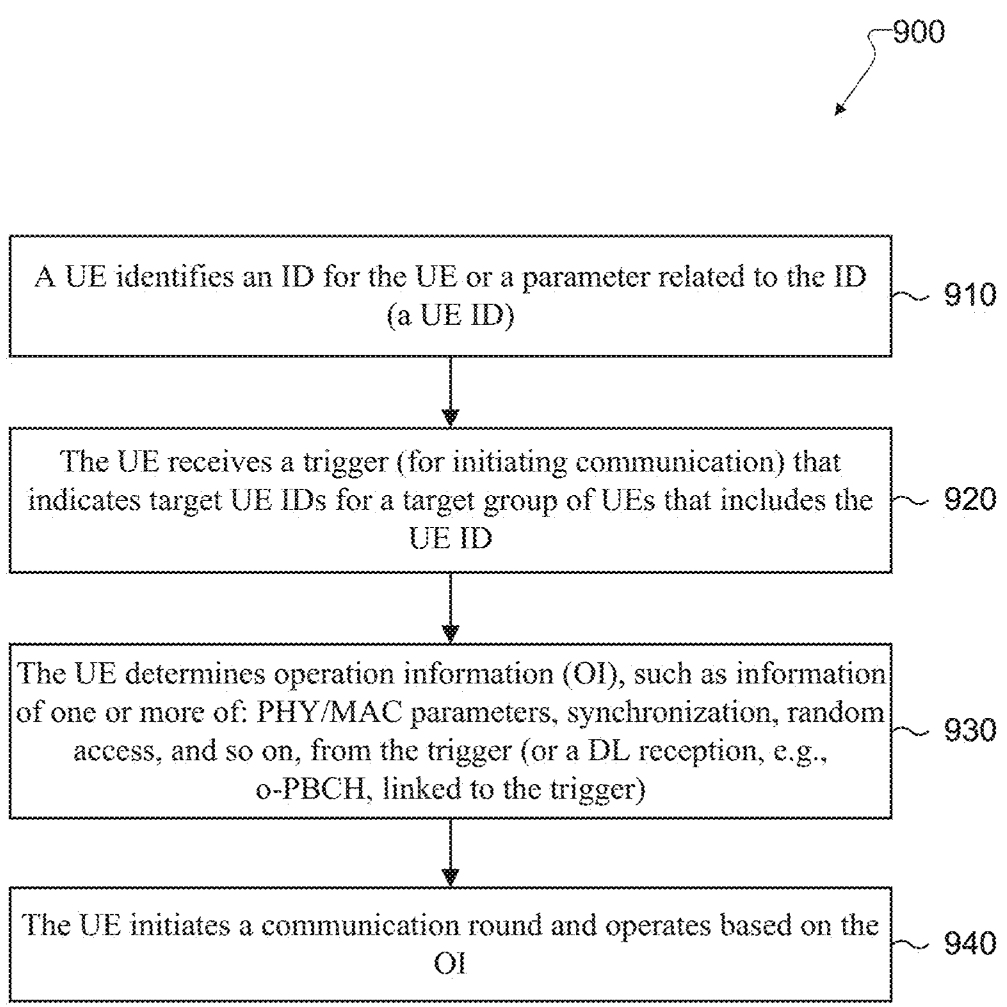
FIG. 9 illustrates a flowchart of an example UE procedure for acquisition of operation information (OI) according to embodiments of the present disclosure.

FIG. 9 illustrates a flowchart of an example UE procedure 900 for acquisition of OI according to embodiments of the present disclosure. For example, UE procedure 900 for acquisition of OI can be performed by any of the UEs 111-116 of FIG. 1, such as the UE 115. This example is for illustration only and other embodiments can be used without departing from the scope of the present disclosure.

The procedure begins in 910, a UE identifies an ID for the UE or a parameter related to the ID (referred to as, a UE ID). In 920, the UE receives a trigger (for initiating communication) that indicating target UE IDs for a target group of UEs that includes the UE ID. In 930, the UE determines operation information (OI), such as information of one or more of: PHY/MAC parameters, synchronization, random access, and so on, from the trigger (or a DL reception, e.g., o-PBCH, linked to the trigger). In 940, the UE initiates a communication round and operates based on the OI.

In one embodiment, the UE supports a network (NW) trigger to "initiate UE operation" for one UE or a group of UEs, such as triggering synchronization or random access (RA). The NW trigger can be jointly for UE preparations and RA procedures, or the UE can receive separate triggers for the UE preparation and for the RA procedure. The NW trigger can be a DL sequence/signal such as an LP-WUS, a DL channel such as a PDCCH, or a combination/variation thereof (as subsequently described). The NW trigger can additionally indicate certain information about subsequent UE procedures, similar to a short-term system information, subsequently referred to as operation information (OI), in a PBCH or a in a PDSCH. Various signals or channels can be based on simplified or energy-efficient waveforms, such as OOK, thereby, corresponding signals or channels can be referred to as "o-PDCCH", "o-PBCH", or "o-PDSCH", and so on. For example, various channels from a gNB/Reader to a UE/Device/Ambient IoT device can be referred to as physical device-to-reader channel (PDRCH). For example, a single design for PDRCH applies regardless of a content of the channel, such as control signaling, or data payload, that can be originated from L1 or from higher layers such as L2/L3. For example, any such distinction can be based on headers in the payload of the PDRCH or can be based on the information fields of the PDRCH. Accordingly, a link direction may be referred to by a general term such as Device-to-Reader (D-to-R or D2R), instead of DL.

For example, the NW trigger can be regarded as a trigger for "NW-triggered initial access". For example, the NW trigger can also be regarded as a "paging" message as if triggering an RRC_INACTIVE UE to "establish connection"—i.e., perform synchronization and random access.

For example, the purpose of the NW trigger can be to:

- indicate a target UE or a target UE group, and, for the target UE/UE group, to:
  - trigger UE preparation procedures, such as triggering DL synchronization, or indicating values for PHY/MAC parameters associated with synchronization, random access, or other subsequent UE procedures, and/or
  - trigger random access procedure.

In one example, UEs "monitor" the NW trigger (as subsequently described), and upon reception of the NW trigger, check the information bits provided by the NW trigger, and if a UE determines that the UE is the target UE or among the target UE group as indicated by the NW trigger, the UE performs the corresponding procedures, such as one or both of UE preparations and RA procedure.

Two methods can be evaluated for the functionality of the NW trigger.

In a first method, referred to as e.g., Method 1 (Joint trigger for both UE preparations & RA), the NW trigger indicates the target UE/UE group, and is a joint trigger for both: (i) initiating UE preparations, such as triggering the DL synchronization procedures, if applicable, and/or providing the information bits for PHY/MAC parameters associated with one or more of UE procedures (such as synchronization, random access, or subsequent transmissions or receptions), if applicable, and (ii) triggering a RA procedure.

In a second method, referred to as e.g., Method 2 (Separate triggers for UE preparations vs. RA), the NW trigger indicates the target UE/UE group, and triggers (only) the UE preparation procedures, such as triggering the DL synchronization procedure, if applicable, and/or providing the information bits for PHY/MAC parameters associated with one or more of UE procedures (such as synchronization, random access, or subsequent transmissions or receptions). The NW trigger may (or may not) imply that a random access procedure can be underway, but does not trigger or initiate the RA procedure. For example, the UE (e.g., the UE 116) can receive a separate NW trigger, such as an (enhanced) PDCCH order, to initiate the RA procedure. Similar can hold for UL transmissions other than PRACH transmission.

For example, only one of Method 1 or Method 2 is specified for UE operation.

In another example, both Method 1 and Method 2 may be specified, while only one of them applies for a certain UE operation or an operation round. For example, the NW trigger can include a one-bit flag to indicate Method 1 or Method 2, for example, that whether the NW trigger is also a trigger for the RA procedure.

With reference to FIG. 7, an example of a NW-triggered communication with joint trigger for both UE preparations & RA procedures is shown.

With reference to FIG. 8, an example of a NW-triggered communication with separate triggers for UE preparations and for random access procedure is shown.

A NW trigger can include at least information of the target UE or the target group of UEs. The NW trigger can additionally include other information for UE operation such as for synchronization, random access, or subsequent transmissions or receptions, which can be optional or mandatory.

For example, the NW trigger can include system-information-like (SI-like) information parameters that are applicable throughout one operation round or across different operation rounds, or for a certain number of operation rounds, or for a certain time period. Such short-term SI-like information may be referred to as, operation information (OI). For example, the UE can acquire the OI when communication, such as an operation round, is initiated by the NW trigger, and the UE can release the OI after completion of the communication, such as after the completion of the operation round (or multiple operation rounds).

For example, the NW trigger can include "global" information (such as "procedure-common" information) corresponding to the overall UE operation, for example, applicable to different UL transmissions or DL receptions. For example, the global information can include information for modulation or coding scheme or parameters thereof that is applicable to UL transmissions or DL receptions.

For example, the NW trigger can (or may not) include "local" information ("procedure-specific" information) applicable to certain UE procedures, such as information for synchronization, information for RA procedure, and so on.

For example, the NW trigger can include information for one or more of the following:

- An ID for a target UE or a target group of UEs, such as one or more of the following, or a partial segment or a combination or variation thereof:
  - a core-network (CN) assigned UE ID, or
  - a RAN-assigned UE ID, or
  - a UE ID related to IDLE/INACTIVE state operation, such as inactive RNTI (I-RNTI), international mobile subscriber identity (IMSI), temporary mobile subscriber identity (TMSI), 5G-S-TMSI, and so on, or
  - a CN-based UE sub-group index or a RAN-based UE-ID-based sub-group index (as used for PEI monitoring), or
  - a third-party assigned ID, such as a UE ID or a UE group index assigned by an external asset management/host party, or
  - an Electronic Product Code (EPC) or a truncated EPC, or
  - a UE internal flag/state value, such as one in UE memory, to indicate target UE(s) to be (among) UEs that have certain values for one or more such internal flags/states, such as states/flags related to UE inventory (for example, UE inventoried or not inventoried), UE sensors (for example, sensor ON/Activated or OFF/Deactivated), UE events, UE procedures, and so on; or
- PHY/MAC parameters for subsequent DL receptions or UL transmissions, such as:
  - modulation scheme or modulation order; or
  - coding scheme or coding rate; or
  - frequency-domain parameters, such as an operating frequency band/carrier/sub-band/channel, or switching thereof; or other frequency-domain resource allocation parameters, or
  - time-domain parameter, such as a length of a time unit, or values of time gaps or time offsets to determine timing relationships, such as minimum/maximum time gap between subsequent DL receptions and UL transmissions, or other timing or time-domain resource allocation parameters;
  - Note: parameters herein can be same or separate for DL and UL, and same or separate for different UE procedures.
- Internal UE information, such as UE memory information, for example indication of values for UE internal "states" or UE flags, such as states/flags related to UE inventory (for example, UE inventoried or not inventoried), UE sensors (for example, sensor ON/Activated or OFF/Deactivated), UE events, UE procedures, and so on;

CW-related information, such as parameters for CW reception, for example,
- CW reception mode (continuous, time pattern, duty-cycle, and so on) and corresponding parameters,
- CW reception status such as CW being started/resumed/activated or CW being stopped/paused/disabled/deactivated,
- time occasions for CW reception,
- maximum/average energy or power level of CW,
- operating frequency band/carrier/sub-band/channel for CW reception, or
- changes to CW reception parameter;

NW trigger monitoring information, such as
- monitoring mode (continuous, time pattern, duty cycle, and so on) and corresponding parameters,
- time occasions for NW trigger monitoring, such as periodicity, offset, and so on, or
- a time gap between the NW trigger and the "linked" o-PBCH/o-PDSCH reception that provides the second part of the NW trigger or provides additional information for UE procedures;

Synchronization-related information, such as
- parameters of a synchronization preamble that is appended to DL receptions or UL transmissions, for example, preamble length or cyclic shift, or parameters of an underlying sequence used for the preamble generation; or
- parameters of a synchronization signal, such as LP-SS or SSB, that the UE can use for synchronization, for example, sequence properties, or periodicity or offset for LP-SS reception, or time-domain positions/occasions in which the UE can receive the LP-SS, such as a time gap between the NW trigger and subsequent LP-SS receptions, or a global or local index (such as SFN) of a time occasion for LP-SS reception, or information of a collection of synchronization signals such as an SSB burst set or an LP-SS burst set, including SSB indexes or LP-SS indexes, as associated e.g. with gNB-side beams/spatial filter; or
- a global index (such as SFN or half-frame bit) or a local index (such as a relative/local time unit counter or index) for a time occasion in which the UE has received the current NW trigger or may receive the subsequent NW triggers;

Paging-related/paging-like information, such as paging cause, paging record, and so on, for example, information of an intended objective of an operation round or a number of operation rounds (such as inventory, command, measurement reporting, positioning or proximity determination, and so on)

Random access related parameter, such as:
- PRACH preamble information, for example, a number or indexes of available/applicable PRACH preambles, an applicable sequence and corresponding parameters such as root sequence index or cyclic shift and so on;
- RACH occasion (RO) information, for example, a number of subsequent/allocated ROs, time-domain position of ROs, such as absolute/global or local time unit index of ROs, such as SFN or subframe or slot/symbol applicable for the ROs, or relative time gap between the NW trigger and the available ROs, for example, a minimum/maximum time gap between the NW trigger and a first/earliest available RO for imitating the RA procedure (e.g., NW-trigger-to-RO gap), or a time gap between consecutive ROs (e.g., inter-RO gap); or
- Restrictions applicable to RA resources, such as a PRACH mask index to indicate allowed or permissible ROs, or SSB index(es) or LP-SS index(es) whose associated ROs can be used for PRACH transmission, for example, to facilitate gNB Rx beam selection for reception of PRACH at the gNB;
- UE-subset/UE restriction/UE prioritization information, for example, information of a subset of UEs from the target UEs or from target group of UEs based on certain values for certain UE internal flags/states, as previously described; or to indicate a subgrouping or prioritization among UEs, such as to indicate only a first subgroup to initiate RA procedure first, while remaining UEs from the target group of UEs (or a second subgroup of UEs from the target group of UEs) will initiate RA procedure later, such as upon completion of RA procedure for the first subgroup or upon reception of a subsequent NW indication or trigger such as an (enhanced) paging or and (enhanced) PDCCH order; or Other system information (SI)-like or RRC configuration-like parameters, such as parameters for monitoring or reception of DL control/data channel (e.g., o-PDCCH/o-PDSCH), or UL control/data channels (o-PUSCH/o-PUCCH), if supported, for example, similar to information elements applicable for small data transmission (SDT) for a UE in INACTIVE state.
- For example, if the NW trigger does not include a trigger for RA procedure (and an initiation of the RA procedure is based on a separate PDCCH order), the NW trigger can include an indication for monitoring occasions of the PDCCH order, such as an indication of a relative time gap/offset with a time occasion of the NW trigger (e.g., 1 out of 4 time-domain offset values).

Various approaches can be used to convey (one or more of) the information herein to the UE.

In a first approach, referred to as single-stage approach, the NW trigger can include corresponding information elements (such as one or more elements from the list herein) in a single DL reception, such as a single DL signal (such as LP-WUS) or a single DL channel (such as o-PDCCH).

In a second approach, referred to as two-stage approach, the NW trigger includes part of the information elements (for example, only the target UE ID or the target UE group ID) in the first stage in a first DL signal or channel (such as LP-WUS), while the remaining information elements can be provided in the second stage in a second DL signal or channel (such as o-PBCH or o-PDSCH) or multiple second DL receptions in multiple second DL signals or channels.

In a third approach, NW trigger (regardless of single-stage or two-stage) can include some of the information herein, while other information elements are provided separately.

For example, the UE can receive a separate NW trigger such as a PDCCH order (or an enhanced variation thereof) to initiate an RA procedure for the target UE or target group of UE. For example, the (enhanced) PDCCH order provide the RA-related information, as previously described. For example, the UE can receive an (enhanced) LP-SS for synchronization, and the (enhanced) LP-SS can provide the synchronization-related information as previously described.

For example, the NW trigger can include a 1-bit flag or a jointly-coded multi-bit flag or a bitmap whether it does or does not include certain information elements, such as those for RA procedure, or those for synchronization, and so on.

For example, the specifications provide a predetermined list of (mandatory) information elements in the NW trigger. For example, the NW trigger can include a field that indicates whether the NW trigger also provides certain optional information elements within the trigger or in a linked DL reception such as an o-PBCH or o-PDSCH. For example, when the NW trigger does not provide the optional information, such information can be provided separately using subsequent DL receptions and can be provided separately for each associated procedure. In another example, the NW trigger only includes the mandatory information and does not include any optional information.

With reference to FIG. 9, an example of a procedure for acquisition of operation information (OI) via a NW trigger that initiates the communication or a DL channel (e.g., o-PBCH) that follows the NW trigger is shown.

PHY aspects of NW trigger is discussed.

Figure 10:
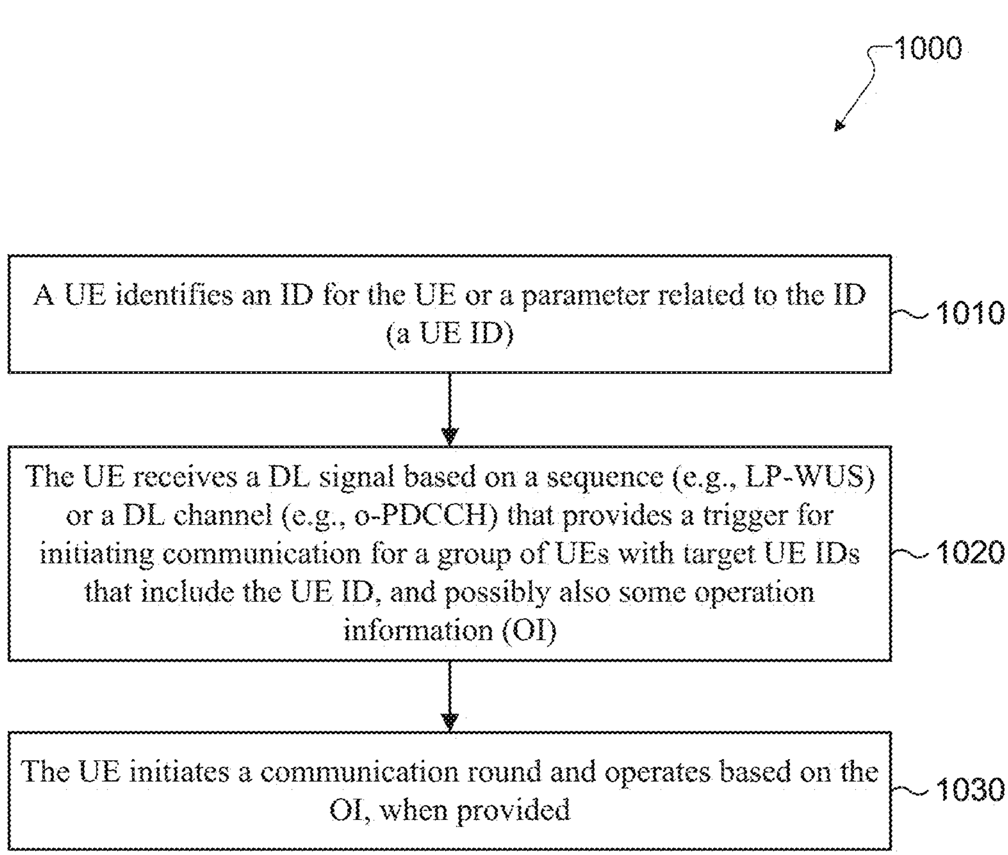
FIG. 10 illustrates a flowchart of an example UE procedure for a single stage NW trigger according to embodiments of the present disclosure.

FIG. 10 illustrates a flowchart of an example UE procedure 1000 for a single stage NW trigger according to embodiments of the present disclosure. For example, UE procedure 1000 for a single stage NW trigger can be performed by the UE 116 of FIG. 3. This example is for illustration only and other embodiments can be used without departing from the scope of the present disclosure.

The procedure begins in 1010, a UE identifies an ID for the UE or a parameter related to the ID (referred to as, a UE ID). In 1020, the UE receives a DL signal based on a sequence (e.g., LP-WUS) or a DL channel (e.g., o-PDCCH) that provides a trigger for initiating communication for a target group of UEs with target UE IDs that include the UE ID, and also some operation information (OI) (that is applicable to the group of UEs). In 1030, the UE initiates a communication round and operates based on the OI, when provided. In one example, the UE releases the OI after completion of the communication round.

Figure 11:
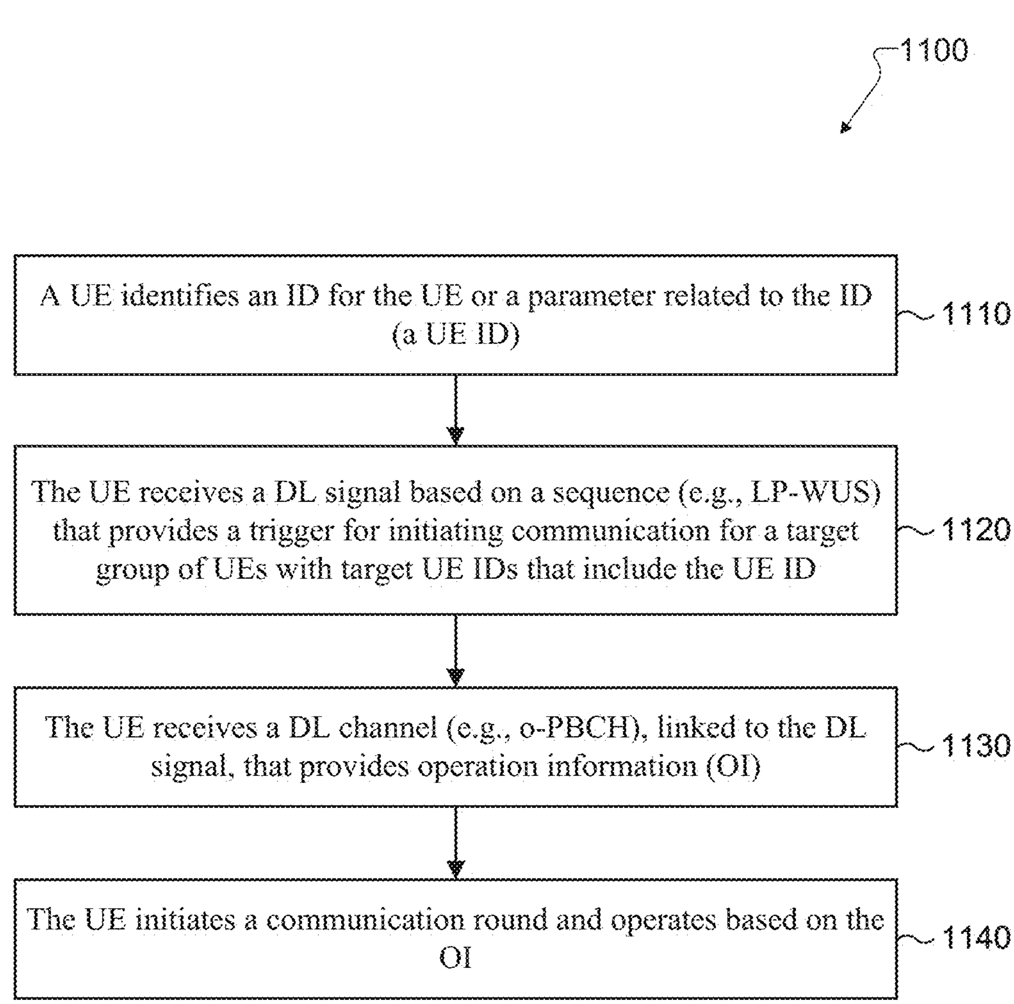
FIG. 11 illustrates a flowchart of an example UE procedure for a two-stage (two-part) NW trigger according to embodiments of the present disclosure.

FIG. 11 illustrates a flowchart of an example UE procedure 1100 for a two-stage (two-part) NW trigger according to embodiments of the present disclosure. For example, example UE procedure 1100 for a two-stage (two-part) NW trigger can be performed by any of the UEs 111-116 of FIG. 1, such as the UE 115. This example is for illustration only and other embodiments can be used without departing from the scope of the present disclosure.

The procedure begins in 1110, a UE identifies an ID for the UE or a parameter related to the ID (referred to as, a UE ID). In 1120, the UE receives a DL signal based on a sequence (e.g., LP-WUS) that provides a trigger for initiating communication for a target group of UEs with target UE IDs that include the UE ID. In 1130, the UE receives a DL channel (e.g., o-PBCH), linked to the DL signal, that provides operation information (OI). In 1140, the UE initiates a communication round and operates based on the OI.

Figure 12:
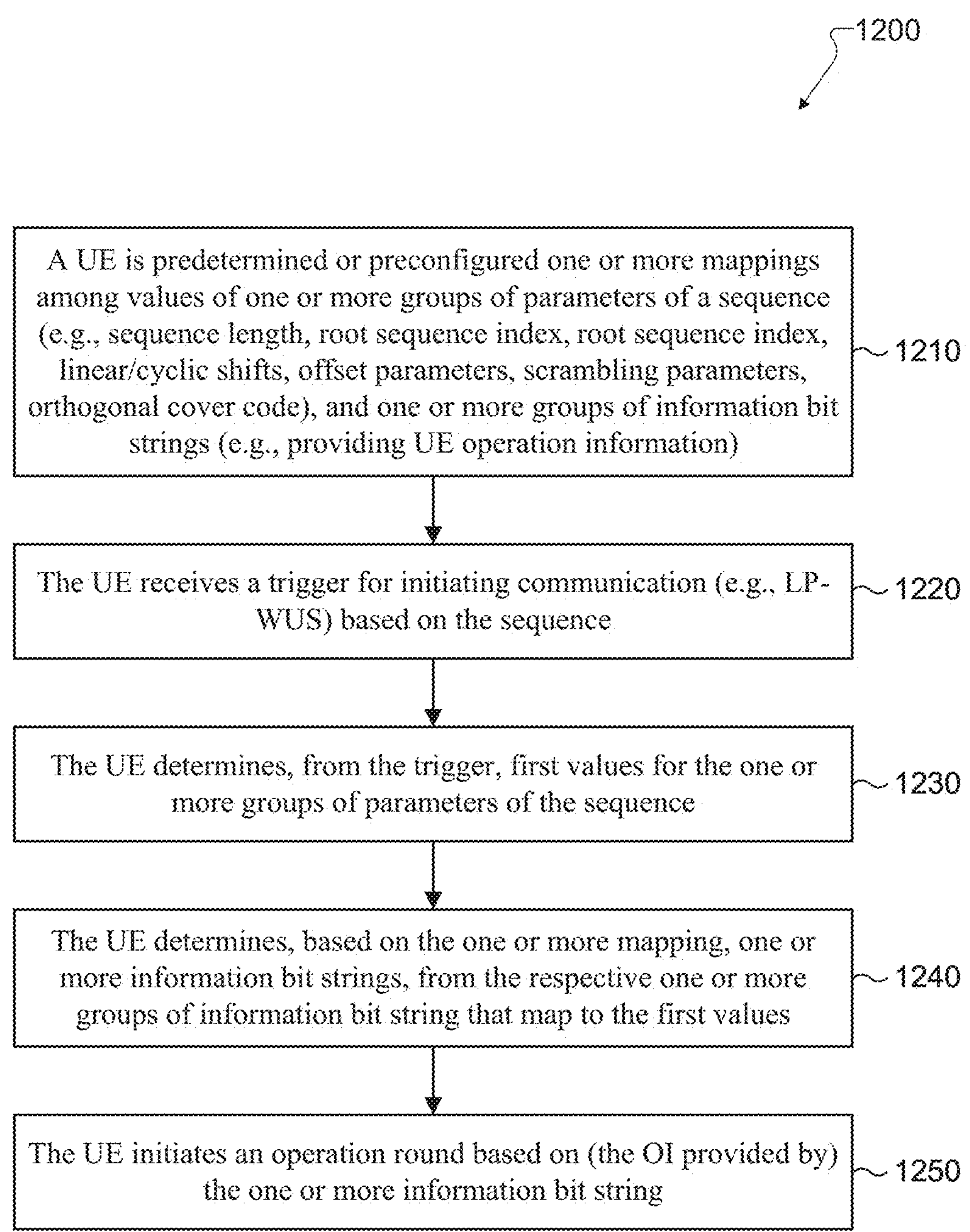
FIG. 12 illustrates a flowchart of an example UE procedure for acquisition of OI according to embodiments of the present disclosure.

FIG. 12 illustrates a flowchart of an example UE procedure 1200 for acquisition of OI according to embodiments of the present disclosure. For example, UE procedure 1200 for acquisition of OI can be performed by the UE 116 of FIG. 3. This example is for illustration only and other embodiments can be used without departing from the scope of the present disclosure.

The procedure begins in 1210, a UE is predetermined or preconfigured one or more mappings among values of one or more groups of parameters of a sequence (e.g., sequence length, root sequence index, root sequence index, linear/cyclic shifts, offset parameters, scrambling parameters, orthogonal cover code), and one or more groups of information bit strings e.g., providing UE operation information (OI). In 1220, the UE receives a trigger for initiating communication (e.g., LP-WUS) based on the sequence. In 1230, the UE determines, from the trigger, first values for the one or more groups of parameters of the sequence. In 1240, the UE determines, based on the one or more mapping, one or more information bit strings, from the respective one or more groups of information bit string that map to the first values. In 1250, the UE initiates an operation round based on (the OI provided by) the one or more information bit string.

Figure 13:
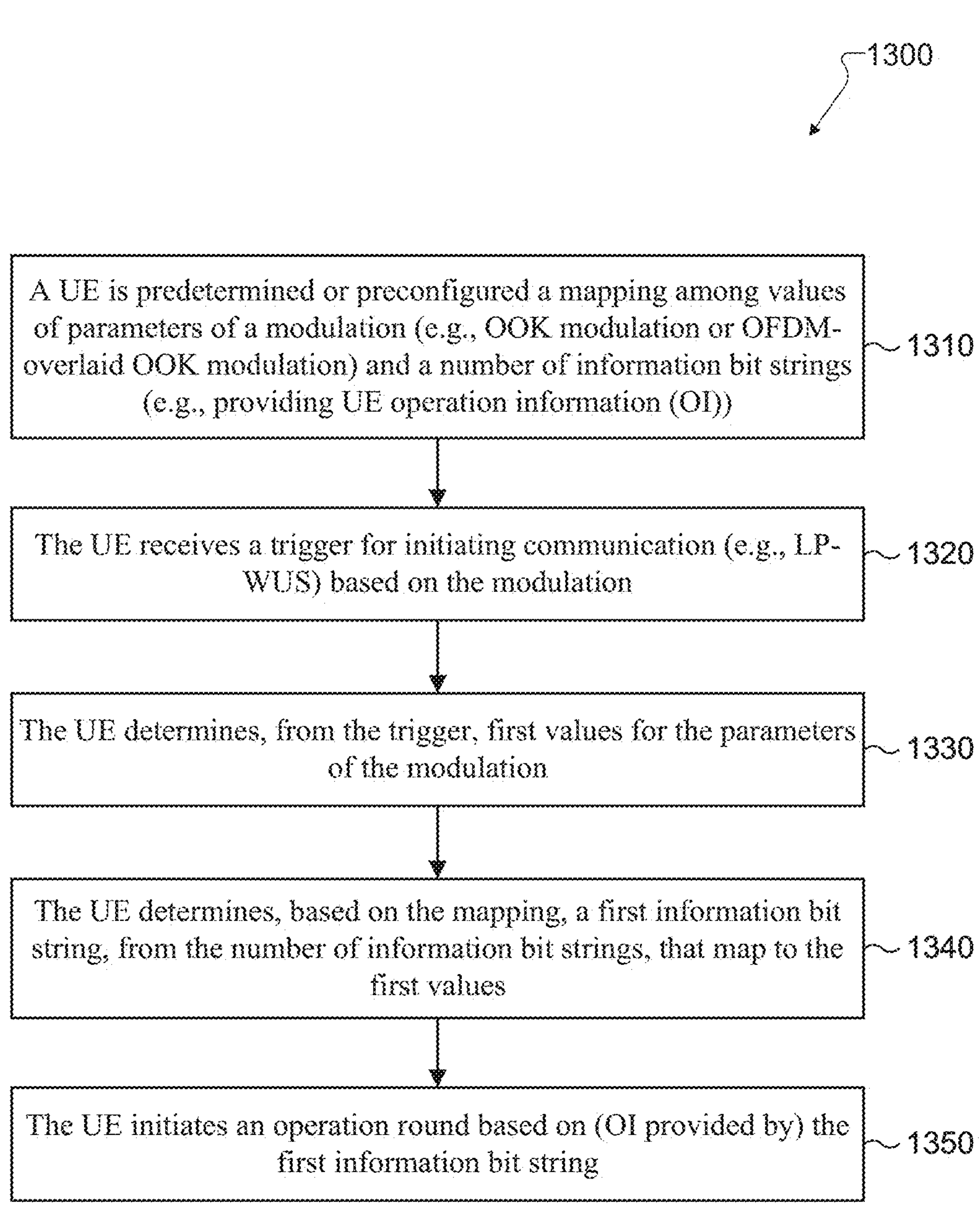
FIG. 13 illustrates a flowchart of an example UE procedure for acquisition of OI according to embodiments of the present disclosure.

FIG. 13 illustrates a flowchart of an example UE procedure 1300 for acquisition of OI according to embodiments of the present disclosure. For example, UE procedure 1300 for acquisition of OI can be performed by the UE 111 of FIG. 1. This example is for illustration only and other embodiments can be used without departing from the scope of the present disclosure.

The procedure begins in 1310, a UE is predetermined or preconfigured a mapping among values of parameters of a modulation (e.g., OOK modulation or OFDM-overlaid OOK modulation) and a number of information bit strings (e.g., providing UE operation information (OI)). In 1320, the UE receives a trigger for initiating communication (e.g., LP-WUS) based on the modulation. In 1330, the UE determines, from the trigger, first values for the parameters of the modulation. In 1340, the UE determines, based on the mapping, first information bit strings, from the number of information bit string that map to the first values. In 1350, the UE initiates an operation round based on (the OI provided by) the first information bit string.

Figure 14:
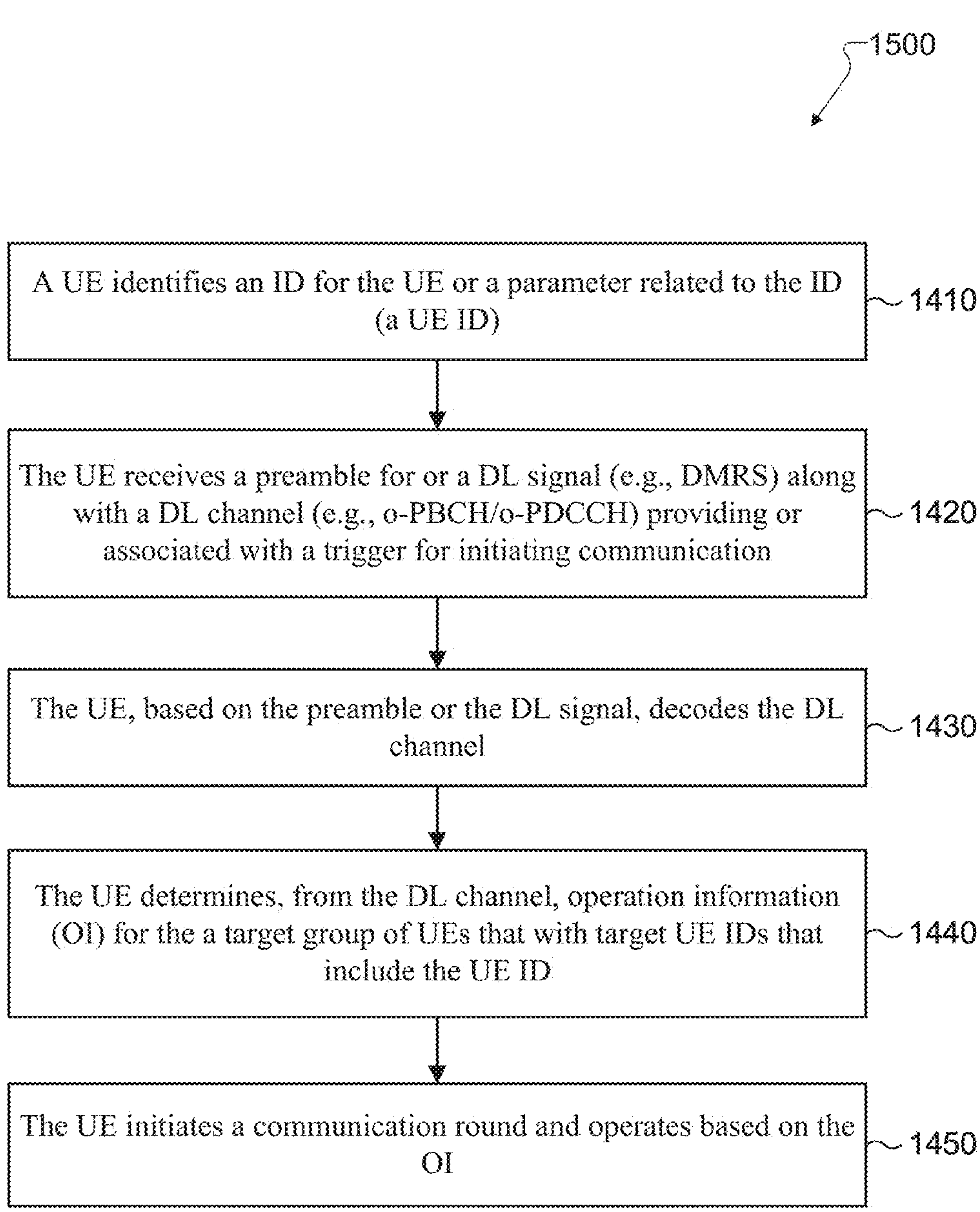
FIG. 14 illustrates a flowchart of an example UE procedure for a two-stage (two-part) NW trigger according to embodiments of the present disclosure.

FIG. 14 illustrates a flowchart of an example UE procedure 1400 for a two-stage (two-part) NW trigger according to embodiments of the present disclosure. For example, UE procedure 1400 for a two-stage (two-part) NW trigger can be performed by any of the UEs 111-116 of FIG. 1, such as the UE 112. This example is for illustration only and other embodiments can be used without departing from the scope of the present disclosure.

The procedure begins in 1410, a UE identifies an ID for the UE or a parameter related to the ID (referred to as, a UE ID). In 1420, the UE receives a preamble for or a DL signal (e.g., DMRS) along with a DL channel (e.g., o-PBCH/o-PDCCH) providing or associated with a trigger for initiating communication. In 1430, the UE, based on the preamble or the DL signal, decodes the DL channel. In 1440, the UE determines, from the DL channel, operation information (OI) for a target group of UEs with target UE IDs that include the UE ID. In 1450, the UE initiates a communication round and operates based on the OI.

In one embodiment, the gNB/Reader transmits the NW trigger or the UE receives the NW trigger in the form of a sequence-based DL signal such as an LP-WUS or a variation thereof, or in the form of a combination of a sequence-based DL signal such as LP-WUS and a DL channel such as o-PBCH, or in the form of only a DL channel such as o-PDCCH. An information content associated with the NW trigger can be provided by using different values for the parameters of the sequence used for the DL signal or can be provided as information in the DL channel. A predetermined or preconfigured preamble or DL signal (such as DMRS) can be appended to the trigger to simplify and improve the detection performance of the NW trigger.

In a first example, referred to as e.g., Option 1 (sequence-based only), the NW trigger is in the form of a DL signal based on a sequence or a DL channel based on a sequence, such as an LP-WUS or a variation thereof, with information bits conveyed via sequence parameters or signal parameters, e.g., root sequence index, cyclic shift, orthogonal cover codes (OCC), time/frequency/phase offset, or as overlaid OFDM information.

In a second example, referred to as e.g., Option 2 (joint sequence-based and channel-coding-based), the NW trigger includes two parts, such as a first part with a DL signal based on a sequence or a DL channel based on a sequence, such as an LP-WUS or a variation thereof, with few/no information bits followed by a second part that is a "linked" DL channel such as o-PBCH or o-PDSCH (e.g., without a scheduling PDCCH), separate from the LP-WUS, that provides additional/all information bits corresponding to the NW trigger for example by using channel coding applied to a corresponding payload. In another variation of Option 2, only the first part (such as LP-WUS) is regarded as the NW trigger, while the second part (such as o-PBCH or o-PDSCH) is regarded as an independent DL reception that is not part of the NW trigger.

In a third example, referred to as e.g., Option 3 (channel-coding-based only), the NW trigger is not based on a sequence-based DL signal or DL channel such as LP-WUS, and only uses a DL channel such as o-PDCCH (without or with a corresponding PDSCH such as o-PDSCH) that provides the information bits and triggers the corresponding UE procedures for example, by using channel coding applied to a corresponding payload.

Herein, "o-PBCH" or "o-PDSCH" and "o-PDCCH" refer to OOK-based PBCH and OOK-based PDCCH and OOK-based PDSCH receptions, respectively, as subsequently described. The prefix 'o-' is used to indicate the OOK-based waveform (or any other simplified waveform used for the UE, such as ASK, phase shift keying (PSK), and so on, if applicable) and to distinguish from common OFDM-based PBCH/PDCCH/PDSCH. In various embodiments and example, the same prefix 'o-' is used also for UL signals or channels such as "o-PRACH" and "o-PUSCH", and so on, while a (simplified) waveform for UL transmissions, if applicable, can be same as or different than a (simplified) waveform for DL receptions. For example, various channels from a UE/Device/Ambient IoT device to a gNB/Reader can be referred to as a physical reader-to-device channel (PRDCH). For example, a single design for PRDCH applies regardless of a content of the channel, such as control signaling, or data payload, that can be originated from L1 or from higher layers such as L2/L3. For example, any such distinction can be based on headers in the payload of the PRDCH or can be based on the information fields of the PRDCH. Accordingly, a link direction may be referred to by a general term such as Reader-to-Device (R-to-D or R2D), instead of UL.

It is noted that, Methods 1/2 are in principle independent of PHY design in Options 1/2/3, so either Method 1 or Method 2 can be realized by any of PHY Options 1/2/3.

In one example, the specifications for system operation may specify only one option among Options 1/2/3. In another example, the specifications may specify multiple options, and the UE/NW uses one option among the multiple options, based on e.g. UE capability or based on pre-configuration via OAM. In another example, a NW trigger based on DL signal of Option 1 (such as LP-WUS) can be baseline, and the DL signal can indicate whether or not a subsequent DL channel such as o-PBCH, as evaluated in Option 2, is present.

Various method described in the present disclosure for PHY generation or reception of DL signals or DL channels can generally apply to any DL signal or DL channel, regardless of whether or not the DL signal or the DL channel are intended for providing a NW trigger.

With reference to FIG. 10, an example procedure for a single-stage NW trigger via a DL signal based on a sequence of a DL channel.

With reference to FIG. 11, an example procedure for a two-stage (two-part) NW trigger via a sequence-based DL signal followed by a DL channel.

For a sequence-based NW trigger such as an LP-WUS, as evaluated in Options 1/2, various aspects can be evaluated for PHY generation/transmission/reception, such as sequence design, information bit indication and time/frequency resource allocation.

It is noted that, in various embodiments and examples of the present disclosure, the term "LP-WUS" is used for brevity to refer to a sequence-based NW trigger, regardless of whether such sequence-based NW trigger is the same LP-WUS that is to be defined in 3GPP Rel-19 LP-WUS/wake up receiver (WUR) work item, or whether such sequence-based NW trigger is a modified or simplified or enhanced variation of a corresponding signal design evaluated in Rel-19 LP-WUS work item, or fully different and independent thereof.

For example, a sequence-based NW trigger such as an LP-WUS, can be based on predetermined base sequence type, such as a maximum length (M)-sequence or a zadoff chu (ZC)-sequence or a pseudo noise (PN)-sequence, and so on.

For example, a length of the base sequence is predetermined in the specifications. In another example, the sequence length can be based on pre-configuration such as OAM or based on UE capability or UE manufacture's declaration. For example, multiple sequence lengths (such as 2 or 4 different sequence length values) can be specified, and the UE can use blind detection or other assistance information to determine an actual sequence length. In another example, a sequence length is used for indication of information. For example, the UE can identify a mapping, such as a predetermined mapping in the specifications of system operation or a preconfigured mapping, that maps a length of the sequence to some information bits (such as the 2 or 4 different sequence length values mapped to 1 or 2 information bits).

For example, other sequence parameters, such as a root sequence index or linear/cyclic shifts or offset parameters or sequence scrambling pattern/parameters or cover codes such as orthogonal cover code (OCC), if any applicable, can be predetermined in the specifications. For example, such sequence parameters can be provided via pre-configuration such as OAM.

In another example, such sequence parameters can be used to convey information bits (as evaluated e.g. in Option 1). For example, the UE can identify a mapping, such as a predetermined mapping in the specifications of system operation or a preconfigured mapping, that maps values of sequence parameters to a number of information bits. For example, the UE can identify a separate mapping for each sequence parameter and a corresponding number of bits.

For example, the UE (e.g., the UE 116) can identify a single joint mapping for each group/combination of sequence parameters or for sequence parameters that jointly encodes values for one or more group/combination of sequence parameters into an information bit string with a corresponding number of bits. For example, the UE can identify a first mapping for a first group/combination of sequence parameters and a second mapping for a second group/combination of sequence parameters.

With reference to FIG. 12, an example of a procedure for acquisition of operation information (OI) via a NW trigger that initiates the communication or a DL channel (e.g., o-PBCH) that follows the NW trigger is shown.

For example, a (simplified) modulation can be applied to the sequence for NW trigger. For example, the modulation can be an OOK or ASK or FSK modulation, or an OFDM-overlaid variation thereof, such as OFDM-overlaid OOK, and so on.

In one example, a length of the LP-WUS, in terms of the number of modulated symbols, such as OOK symbols, can be based on (e.g., same as) the length of the base sequence.

In one example, the base sequence (or the modified sequence providing some information bits) are directly modulated with predetermined or preconfigured waveform/modulation parameters, so that the modulation/waveform does not provide any (additional) information bits.

In another example, when a DL signal for NW trigger is intended to provide information (as evaluated e.g. in Option 1), the modulation/waveform parameters can provide some (additional) information bits.

For example, a base sequence or an underlying sequence for generation of a DL signal for NW trigger, such as LP-WUS, may provide few or no information bits, while a number of information bits can be provided using the modulation or waveform parameters, such as one or more of amplitude or phase (or phase change pattern or phase shift) or frequency (or frequency offset), or time offset applies to the waveform/modulation, and so on. For example, the UE can identify a mapping, such as a predetermined mapping in the specifications of system operation or a preconfigured mapping, that maps values of such waveform parameters with bit strings providing a number of information bits. The mapping can be per waveform parameter or per group/combination/all of waveform parameters, as previously described for sequence parameters.

For example, a number of information bits can be modulated using OFDM and a result can be overlaid on a (simplified) waveform such as OOK. Alternatively, a number of information bits can be modulated using a (simplified) waveform such as OOK, and a result can be overlaid on an OFDM waveform.

With reference to FIG. 13, an example of a procedure for acquisition of operation information (OI) via a NW trigger that initiates the communication or a DL channel (e.g., o-PBCH) that follows the NW trigger.

For example, a coding scheme can be applied to the information bits provided by the DL signal for NW trigger such as LP-WUS, including for example, information bits provided by sequence parameters or by modulation/waveform parameters, and so on. Such channel coding is subsequently described for o-PBCH/o-PDSCH/o-PDCCH. In another example, no cyclic redundancy check (CRC) or coding scheme is applied to the information bits provided by a DL signal for NW trigger, such as LP-WUS. In another example, CRC is applied, but an error control coding is not applied to LP-WUS.

In one example, a DL signal for NW trigger can include two parts, wherein a first part is a predetermined non-information-bearing preamble or header, followed by a second part that includes the information-bearing DL signal for NW trigger. For example, such fix preamble or header is added to simplify the UE detection procedure and/or to improve the UE detection performance for the NW trigger.

For example, a base sequence with N symbols/bits, such as N=N1+N2, is split into a first N1 symbols/bits with predetermined sequence properties and/or predetermined modulation waveform, and a second N2 symbols/bits that can provide information using e.g. sequence parameters or waveform/modulation parameters, as previously described.

In another example, the base sequence with the entire N symbols/bits is used for providing information, as previously described, while a predetermined sequence with M symbols/bits is prepended to base sequence. In such example, a length of the LP-WUS, in terms of the number of OOK symbols, is based on (e.g., equal to sum of) the length of the base sequence, and the length of the preamble/header, such as a total length of M+N symbols/bits.

For example, the header can be prepended or appended to the sequence symbols/bits before modulation. For example, the header can be prepended or appended to the modulated symbols of the DL signal.

For example, such a header can be a DMRS for the o-PBCH/o-PDSCH that is based on a certain sequence with certain length and properties/parameters, as described for LP-WUS, or as evaluated in [REF1, TS 38.211 v18.1.0].

In one example, the (coded) modulated sequence is applied to the CW (such as when the CW is received in the DL spectrum of an FDD band). For example, the UE receives a DL signal for NW trigger in a same operating sub-band/channel as that used for reception of the CW. In another example, the modulated sequence is applied to a carrier frequency different than that of the CW. For example, a carrier frequency for the DL signal can be a frequency-shifted variation of the CW (for example, when the CW is received in the UL spectrum of an FDD band).

In one example, a mapping of a based sequence (or a modified sequence such as with embedded information or with a fixed header/DMRS) to OOK or ASK symbols is in time-domain only. For example, the DL signal for NW trigger may not use any frequency domain mapping (such as RB/RE-level mapping) of the modulated symbols (at least from the UE perspective).

For example, the mapping can be in ascending order of time-domain, or can be based on a predetermined or preconfigured time-domain offset or interleaving pattern.

In another example, mapping of modulation symbols to OOK symbols may involve frequency domain mapping as well, such as when using OFDM-overlaid OOK, or OOK-overlaid OFDM, and so on. For example, modulation bits can be mapped in ascending order of frequency domain first, time domain second. For example, certain time-domain offset or frequency-domain offset may be applied to the mapping. For example, interleaving pattern can be applied to the mapping, wherein the interleaving can be only for time-domain or only for frequency domain or for both, with separate or join interleaving patterns. For example, information of frequency domain resources used for the DL signal for NW trigger, such as the mentioned herein offset or interleaving can be predetermined or preconfigured.

Details of time-domain resource allocation wherein the UE can receive a DL signal for NW trigger such as an LP-WUS is subsequently described in one or more embodiments herein, on NW trigger monitoring.

For a channel-based NW trigger such as an o-PBCH or o-PDCCH, as evaluated in Options 2/3, various aspects can be evaluated for PHY generation/transmission/reception, such as the information content, payload size, channel coding and modulation, time/frequency resource allocation, and so on.

For example, an o-PBCH or o-PDCCH or o-PDSCH is a DL channel with a payload that is an encoded version of an information packet or a transport block (TB) by a channel coding scheme. The UE can recover the information packet or TB upon reception of the corresponding DL channel and decoding the payload. The TB can include CRC such as 5 bits or 16 bits or 24 bits of CRC for improved reliability. For large TB sizes, such as a few hundred bits, the TB can be split into multiple segments, and each of the segments can be individually encoded. For example, each segment can include a corresponding CRC, and/or the multiple segments can have a corresponding CRC.

In one example, the DL channels can be multiplexed in one or both of time-domain and frequency domain among other DL or UL signals or channels (including those for common NR operation) transmitted or received by the gNB/Reader or the UE or other UEs or other network nodes such as IAB, relay repeater and so on.

In one example, different DL channels such as o-PBCH, o-PDCCH, o-PDSCH, may refer to a same DL channel, without distinction on corresponding information content or corresponding reception procedure. For example, the channel providing the information can be defined as any of o-PBCH or o-PDCCH or o-PDSCH. In various examples, for brevity, the term o-PDSCH may be used interchangeably to refer to different DL channels.

In another example, the UE may distinguish among different DL channel based on, for example, corresponding information content or corresponding reception procedure.

For example, an o-PBCH may refer to a channel that provides certain system-information (SI)-like or RRC configuration-like content, that is applicable to various/multiple UEs. For example, o-PBCH can provide L1/L2/L3-related information related to CW reception, NW trigger monitoring, internal UE flags/states, synchronization, paging, random access, and other PHY/MAC/RRC-like parameters, as previously described. For example, various UEs may monitor for reception of the o-PBCH, and apply the corresponding information. For example, any/all UEs operating in a certain frequency band/carrier/sub-band/channel may monitor and attempt to receive and decode the o-PBCH. In another example, certain groups of UEs, such as a target group of UEs indicated in a preceding NW trigger monitor and attempt to receive and decode the o-PBCH.

For example, an o-PDSCH may refer to a channel that provides unicast DL information that is applicable to a single UE. For example, the information content of an o-PDSCH can be a TB from higher layers such as L2 or L3 or above layers such as from application layer, for example, corresponding to a host/management entity for asset tracking or sensor monitoring or DL command. For example, the information can additionally or alternatively include L1 control information. For example, the o-PDSCH can be applicable to a UE that is already identified, such as in a preceding RA procedure and has an associated UE ID, such as an inventoried EPC or an I-RNTI, or temporary cell RNTI (TC-RNTI) or C-RNTI, and so on.

For example, o-PBCH and o-PDSCH may be used interchangeably.

For example, an o-PDCCH may refer to a channel that provides Layer 1 (L1) DL control information that is applicable to a single UE or to multiple UEs. For example, the information content of an o-PDCCH can be from a number of predetermined DCI formats with corresponding (predetermined/configurable) information elements and payload size.

For example, o-PBCH/o-PDSCH/o-PDCCH can indicate, implicitly or explicitly, information of one or more UEs for which the o-PBCH/o-PDSCH is applicable. For example, the UE ID related information is provided as an explicit field in the o-PBCH/o-PDSCH or the corresponding information elements or TB that is provided by the o-PBCH/o-PDSCH. In another example, the UE ID related information is provided using implicit methods, such as scrambling a CRC that is appended to the information content or TB that is provided by the o-PBCH/o-PDSCH. In another example, the o-PBCH/o-PDSCH may not provide any UE ID related information, and the UE determines whether the o-PBCH/o-PDSCH is applicable to the UE based on preceding signaling exchange, such as whether the UE was a target UE or among the target group of UEs that was indicated in the NW trigger, such as by a preceding DL signal for NW trigger for example LP-WUS.

For example, at least for an o-PBCH/o-PDSCH/o-PDCCH that is used as part of or following or associated with a NW trigger, a corresponding information content can be predetermined (or configured) in the specifications, such as one or more of the information elements previously described in one or more embodiments herein for NW trigger.

For example, o-PBCH/o-PDCCH/o-PDSCH can provide a channel-coded variation of the NW trigger information bits. For example, the UE receives the o-PBCH/o-PDSCH/o-PDCCH in corresponding time/frequency resources, demodulates and decodes the corresponding DL channel, and determines the (remaining) information bits corresponding to the NW trigger.

For example, the TB or other information elements/payload provided by o-PBCH/o-PDCCH/o-PDSCH can be protected by various channel coding schemes, such as cyclic redundancy check (CRC) or forward error control coding.

For example, a CRC with a predetermined length such as a 5/16/24 bit-CRC can be applied to the information bits.

For example, forward error control coding can be applied, such as one (or a combination or variation) of: line codes, non-return-to-zero (NRZ) codes, return-to-zero (RZ) codes, biphase codes, bipolar codes, Manchester codes, differential Manchester codes, FMO codes, Miller codes, Pulse internal encoding (PIE), pulse position encoding (PPE), pulse position modulation (PPM), and so on.

For example, the channel coding scheme can be with or without memory. Herein, a coding scheme with memory refers to a coding scheme wherein encoded bits corresponding to a second bit or a second group of bits depends on a first bit or a first group of bits, wherein the first bit or the group of first bits are (immediately) before the second bit or the group of second bits.

For example, an applicable coding scheme for o-PBCH/o-PDSCH/o-PDCCH and corresponding parameters such as coding rate can be predetermined in the specifications or can be preconfigured or such information can be provided by a DL signal for NW trigger such as an LP-WUS that precedes the o-PBCH/o-PDSCH/o-PDCCH. In another example, such information can be provided explicitly, or can be provided via intermediate parameters, such as an applicable number of time/frequency resources, for example, a number of control channel elements (CCEs) that are applicable for reception of an o-PDCCH.

For example, the channel coded bits for o-PBCH/o-PDSCH/o-PDCCH can be modulated using a (simplified) modulation scheme such as OOK or ASK and so on, or an OFDM-overlaid OOK, and so on, as previously described for LP-WUS.

In one example, the coded information bits of o-PBCH/o-PDSCH/o-PDCCH are modulated on the CW (such as when the CW is received in the DL spectrum of an FDD band). For example, the UE receives a DL signal for NW trigger in a same operating sub-band/channel as that used for reception of the CW. In another example, the coded information bits of o-PBCH/o-PDSCH/o-PDCCH are modulated on a carrier frequency different than that of the CW. For example, the carrier frequency for o-PBCH/o-PDSCH/o-PDCCH can be a frequency-shifted variation of the CW (for example, when the CW is received in the UL spectrum of an FDD band).

In one example, a mapping of a coded information bits of o-PBCH/o-PDSCH/o-PDCCH (or that with a prepended/appended fixed header or DMRS) to modulation symbols such as OOK or ASK symbols is in time-domain only. For example, o-PBCH/o-PDSCH/o-PDCCH may not use any frequency domain mapping (such as RB/RE-level mapping) of the modulated symbols (at least from the UE perspective).

For example, the mapping can be in ascending order of time-domain, or can be based on a predetermined or pre-configured time-domain offset or interleaving pattern.

In another example, mapping of modulation symbols to OOK symbols may involve frequency domain mapping as well, such as when using OFDM-overlaid OOK, or OOK-overlaid OFDM, and so on, as previously described for LP-WUS.

For example, the length of o-PBCH/o-PDSCH/o-PDCCH, in terms of the number of OOK symbols, is based on (e.g., equal to) the number of channel coded information bits provided by the corresponding channel. In another example, the number of OOK symbols can be additionally based on an available number of frequency resources, such as when OFDM-overlaid OOK is used, or when the UE supports frequency-domain resource allocation for o-PBCH/o-PDSCH/o-PDCCH.

In one example, a DL channel such as o-PBCH/o-PDSCH/o-PDCCH can include an additional predetermined non-information-bearing preamble or header, that is appended to the o-PBCH/o-PDSCH/o-PDCCH, for example, to simplify the UE detection procedure and/or to improve the UE detection performance for the NW trigger, as previously described for LP-WUS. For example, the fixed header can be prepended or appended to the information payload before channel coding. For example, the fixed header can be prepended or appended to the coded information bits before modulation. For example, the fixed header can be prepended or appended to the modulated symbols.

For example, such a header can be a DMRS for the o-PBCH/o-PDSCH/o-PDCCH that is based on a certain sequence with certain length and properties/parameters, as described for LP-WUS, or as regarded in [REF1, TS 38.211 v18.1.0].

With reference to FIG. 14, an example procedure for a two-stage (two-part) NW trigger via a sequence-based DL signal followed by a DL channel is shown.

Various methods can be used for time-domain resource allocation of o-PBCH/o-PDSCH/o-PDCCH.

Some methods include absolute/independent time-domain resource allocations that are independent of other DL signals or channels that the UE receives, such as methods subsequently described in one or more embodiments herein, on NW trigger monitoring. Such methods apply at least when a NW trigger is (fully) provided by a DL channel, such as an o-PDCCH, for example, an o-PDCCH that is not preceded by a DL signal for NW trigger such as an LP-WUS, as evaluated in Option 3. In another example, time-domain allocation for o-PDCCH can be similar to that for a separate (enhanced) PDCCH order, that is used for triggering a RA procedure for some UEs, such as the target UE or the target group of UEs, or a subset thereof. In another example, a time-domain allocation can be any time-domain resource (or can start at any time) that is after a time-domain resource associated with the NW trigger.

Other methods include a relative time-domain resource allocation, for example relative to a DL signal for NW trigger such as an LP-WUS that the UE received as NW trigger. In such cases, the DL channel can be regarded as o-PBCH/o-PDSCH that is linked to the LP-WUS, for example as evaluated in Option 2 as previously described.

For example, o-PBCH/o-PDSCH are adjacent to the LP-WUS, i.e., starts in the first OOK symbol after the last OOK symbol of LP-WUS.

For example, o-PBCH/o-PDSCH are interleaved with the LP-WUS, similar to a location of NR PBCH and NR SSS/PSS in 5G NR [REF1, TS 38.211 v18.1.0]. For example, one or more of the o-PBCH/o-PDSCH are placed in between or among one or more symbols of the LP-WUS, for example based on a predetermined interleaving pattern.

For example, o-PBCH/o-PDSCH are provided with a certain time-offset relative to LP-WUS, e.g., o-PBCH/o-PDSCH starts X micro-seconds/milliseconds, or NOOK symbols, after the last OOK symbol of the LP-WUS, wherein values of X or N are predetermined in the spec, or preconfigured via OAM. Such method is similar to a time-domain resource configuration for a MsgA PUSCH in 2-step RACH (also known as Type-2 RA) that is relative to a time-domain resource configuration of an associated RO for MsgA PRACH preamble transmission.

In another example, the LP-WUS can include a few embedded information bits, and some of the embedded information bits, for example, 1 or 2 bits can indicate a time-offset value from 2 or 4 predetermined or preconfigured offset values for the time-domain location of the linked o-PBCH/o-PDSCH relative to the LP-WUS.

For example, a time-domain accuracy or tolerance may be defined for the o-PBCH/o-PDSCH reception, so that a coarse synchronization (for example, certain level of timing error at the UE) can be accommodated without impact on the o-PBCH/o-PDSCH reception and decoding performance.

Monitoring the NW trigger is discussed.

Figure 15:
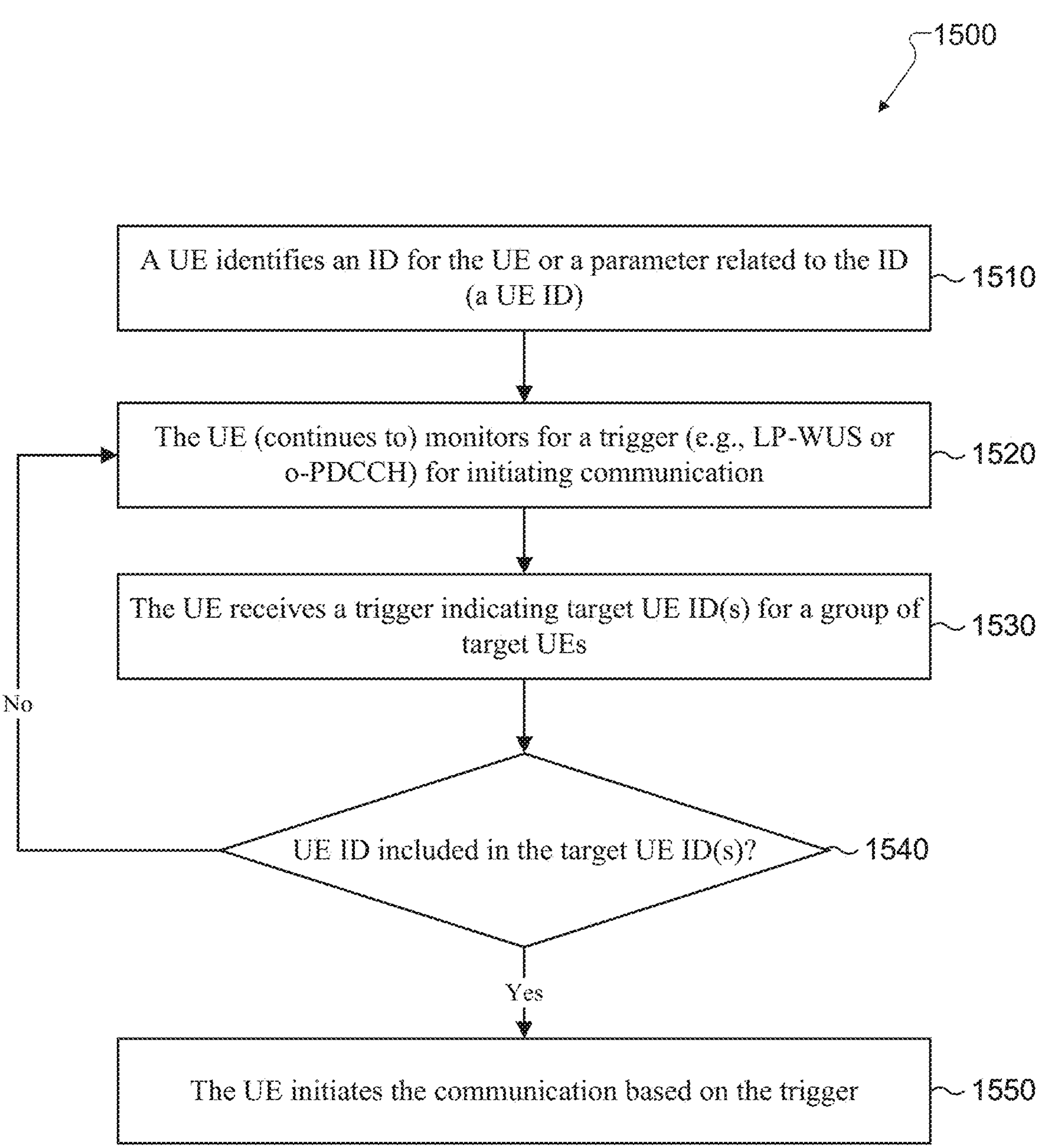
FIG. 15 illustrates a flowchart of an example UE procedure for continuous monitoring according to embodiments of the present disclosure.

FIG. 15 illustrates a flowchart of an example UE procedure 1500 for continuous monitoring according to embodiments of the present disclosure. For example, UE procedure 1500 for continuous monitoring can be performed by the UE 113 of FIG. 1. This example is for illustration only and other embodiments can be used without departing from the scope of the present disclosure.

The procedure begins in 1510, a UE identifies an ID for the UE or a parameter related to the ID (referred to as, a UE ID). In 1520, the UE (continues to) monitors for a trigger (e.g., LP-WUS or o-PDCCH) for initiating communication. In 1530, the UE receives a trigger indicating target UE ID(s) for a target group of UEs. In 1540, the UE determines if the UE ID is included in the target UE ID(s). If the UE determines the UE ID is included in the target UE ID(s), in 1550, the UE initiates the communication based on the trigger. If the UE determines the UE ID is not included in the target UE ID(s), the UE continues to monitor for the trigger, as per 1520.

Figure 16:
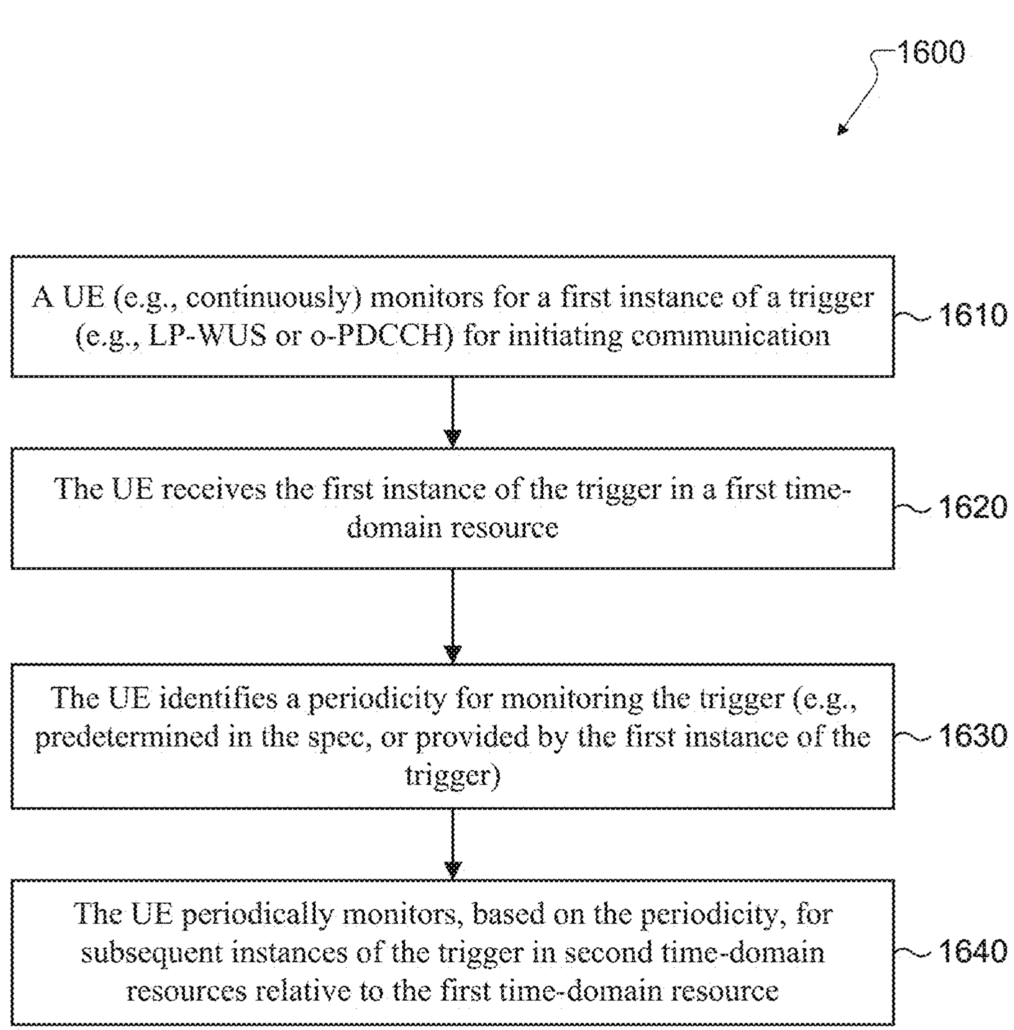
FIG. 16 illustrates a flowchart of an example UE procedure for periodic monitoring according to embodiments of the present disclosure.

FIG. 16 illustrates a flowchart of an example UE procedure 1600 for periodic monitoring according to embodiments of the present disclosure. For example, UE procedure 1600 for periodic monitoring can be performed by the UE 114 of FIG. 1. This example is for illustration only and other embodiments can be used without departing from the scope of the present disclosure.

The procedure begins in 1610, a UE (e.g., continuously) monitors for a first instance of a trigger (e.g., LP-WUS or o-PDCCH) for initiating communication. In 1620, the UE receives the first instance of the trigger in a first time-domain resource. In 1630, the UE identifies a periodicity for monitoring the trigger (e.g., predetermined in the spec, or provide by the first instance of the trigger). In 1640, the UE periodically monitors, based on the periodicity, for subsequent instances of the trigger in second time-domain resources relative to the first time-domain resource.

Figure 17:
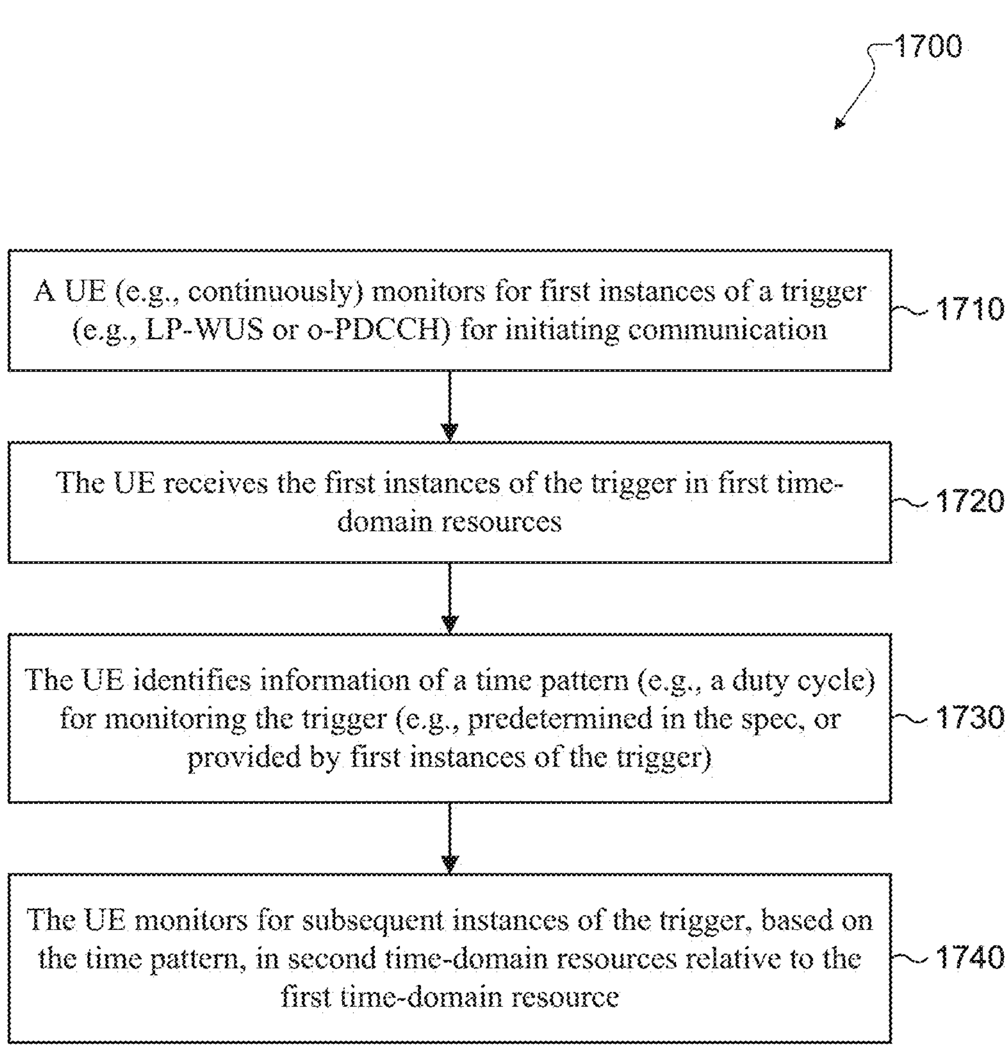
FIG. 17 illustrates a flowchart of an example UE procedure for periodic monitoring according to embodiments of the present disclosure.

FIG. 17 illustrates a flowchart of an example UE procedure 1700 for periodic monitoring according to embodiments of the present disclosure. For example, UE procedure 1700 for periodic monitoring can be performed by any of the UEs 111-116 of FIG. 1, such as the UE 115. This example is for illustration only and other embodiments can be used without departing from the scope of the present disclosure.

The procedure begins in 1710, the UE (e.g., continuously) monitors for first instances of a trigger (e.g., LP-WUS or o-PDCCH) for initiating communication. In 1720, the UE receives the first instances of the trigger in first time-domain resources. In 1730, the UE identifies information of a time pattern (e.g., a duty cycle) for monitoring the trigger (e.g., predetermined in the spec, or provide by the first instances of the trigger). In 1740, the UE monitors for subsequent instances of the trigger, based on the time pattern, in second time-domain resources relative to the first time-domain resource.

In one embodiment, NW trigger monitoring refers to (attempting to) receive and detect a DL signal for NW trigger, such as LP-WUS (as per Options 1/2), and/or (attempting to) receptive and decode a DL channel for the NW trigger, such as an o-PDCCH (as per Option 3), as previously described. Various schemes can be evaluated for monitoring the NW trigger, such as continuous monitoring, or periodic monitoring based on a periodicity, or monitoring based on a time pattern such as a duty cycle.

In a first method, referred to e.g. as continuous monitoring (without periodicity/pattern), the gNB/Reader can transmit the NW trigger at any point in time, up to NW/Reader decision or implementation, without any periodicity or pattern (known to the UE). For example, the UE can receive the NW trigger at any point in time. For example, the UE needs to continuously monitor the NW trigger such as LP-WUS or o-PDCCH.

For example, a UE monitoring for the NW trigger can be based on energy detection. For example, the UE keeps receiving on the DL carrier frequency (e.g., same as or different from CW carrier frequency). For example, in absence of a NW trigger, an energy/power level of incoming receptions are almost constant or within a certain threshold (such as noise power level, and so on) from a constant energy/power level. For example, when the UE detects a change (greater than a certain threshold) in the energy/power level of the DL reception, the UE starts to process/check for a potential NW-trigger reception (e.g., LP-WUS detection or o-PDCCH decoding).

For example, a UE (e.g., the UE 116) monitoring for the NW trigger can be based on continuous processing, such as baseband processing (for example, shift registers) of incoming receptions at the operating frequency (such as CW frequency). For example, the UE determines a NW trigger when the UE determines a DL signal or DL channel with PHY properties (and information content) as previously described.

The first method may not require DL synchronization at the UE.

With reference to FIG. 15, an example procedure for continuous monitoring for a NW trigger for initiating communication.

In a second method, referred to e.g. as periodic monitoring, the gNB/Reader transmits the NW trigger in one or some of periodically spaced time-domain occasions, such as every Y micro-seconds/milli-seconds (e.g., Y=320 ms), or every M OOK symbol.

For example, the UE can monitor every monitoring occasion, while it is feasible that the UE does not receive a NW trigger in a certain monitoring occasion (for example, the NW/Reader may not transmit a trigger in a certain time occasion). For example, after reception of a first instance of the NW trigger, the UE can monitor for the NW trigger only once every period.

For example, reception of the first instance of NW trigger can be up to UE implementation. For example, the UE determines the first instance of the NW trigger using the first method (continuous monitoring). For example, the specifications can provide a predetermined value for a reference (e.g., a maximum feasible) periodicity, such as Y_ref or N_ref, and finding the first instance of NW trigger may involve a continuous monitoring in a time period no larger than Y_refor N_ref. In another example, the may not be provided such reference periodicity, and the UE continues to monitor until the UE receives the first instance of NW trigger.

For example, a value of the periodicity, such as a value of Y or M can be predetermined or preconfigured. In another example, the NW trigger can provide the value of the periodicity. For example, once the UE receives the first instance of NW trigger, the UE can determine the periodicity from the first NW trigger. For example, a value of the periodicity can be implicitly provided by a sequence or modulation or scrambling parameter, or can be an information element among the information contents of the NW trigger.

For example, a time-domain accuracy or tolerance can be defined for determination of the NW trigger periodicity, so that coarse synchronization (for example, certain level of timing error at the UE less than a threshold) can be accommodated without impact on the UE detection/decoding performance.

The second method can be applicable, for example, for a UE with some level of DL synchronization, such as a UE that can maintain (at least coarse) synchronization up to the periodicity of the NW trigger (or a multiple thereof). For example, the second method can apply to a UE without DL synchronization (for example, when a time-domain accuracy or tolerance is sufficiently large based on the UE internal clock timing error, the UE memory size for corresponding counters, the OOK symbol length, and so on).

With reference to FIG. 16, an example procedure for periodic monitoring for a NW trigger for initiating communication is shown.

In a third method, referred to e.g. as monitoring based on a time pattern such as duty-cycled pattern, the gNB/Reader can transmit the NW trigger based on a certain time pattern, that indicates a first sequence of time resources or time durations during which the gNB/Reader may transmit the NW trigger and a second sequence of time resources or time durations during which the gNB/Reader does not transmit the NW trigger. For example, the UE monitors the NW trigger within the first time resources or time durations, and does not monitor the NW trigger within the second time resources or time durations.

For example, a timer pattern can be a duty-cycle pattern with an OFF/Inactive-time (e.g., Z1 μs/ms or K1 OOK symbols) and an ON/Active-time (e.g., Z2 μs/ms or K2 OOK symbols). For example, the UE does not monitor the NW trigger during the Off/Inactive-time, and monitors the NW trigger during the On-Active-time, such as with a periodicity (as in the second method) or continuously (as in the first method). For example, the ON/Active-time may (or may not) be extended upon reception/determination of a NW trigger for an additional duration (e.g., Z3 μs/ms or K3 OOK symbols).

For example, similar method can apply where the NW trigger is based on semi-persistent pattern time pattern based on a periodicity and offset, along with an activation and deactivation indication, instead of a time pattern. For example, a NW trigger can indicate whether the NW monitoring is to be continued, or to be paused/deactivated, or to be resumed/activated.

In one example, parameters of the time pattern (such as values of Z1/Z2/Z3 or K1/K2/K3) can be predetermined in the specifications or can be preconfigured.

In another example, parameters of the time pattern can be indicated within the NW trigger. For example, values of time pattern parameters can be implicitly provided by parameters of a sequence or modulation or scrambling of the NW trigger, or can be provided by an information element among the information contents of the NW trigger. For example, after reception of a first instance of the NW trigger, the UE can determine the parameters of the time pattern from the first instance of the NW trigger. For example, reception of the first instance of the NW trigger is up to UE implementation. For example, the UE receives the first instance of the NW trigger using continuous monitoring (i.e., the first method). In one example, the UE may receive multiple instances of the NW trigger, such as those within one ON/Active-time duration, until the UE can determine the time pattern. In another example, each instance of the NW trigger can include some timing or synchronization information to assist the UE in determining the time pattern.

For example, a time-domain accuracy or tolerance can be defined for determination of the NW trigger pattern, so that coarse synchronization (e.g., certain level of timing error at the UE less than a threshold) can be accommodated without impact on the UE detection/decoding performance.

The third method is applicable, for example, for a UE with some level of DL synchronization, such as a UE that can maintain (at least coarse) synchronization up to the ON/Active-time or up to a total/sum of the ON/Active-time and OFF/Inactive-time of the NW trigger (or a multiple thereof). For example, the third method can apply to a UE without DL synchronization (e.g., when a time-domain accuracy or tolerance is sufficiently large based on the UE internal clock timing error, the UE memory size for corresponding counters, the OOK symbol length, and so on).

With reference to FIG. 17, an example procedure for periodic monitoring for a NW trigger for initiating communication is shown.

On-demand/NW-triggered synchronization is discussed.

Figure 18:
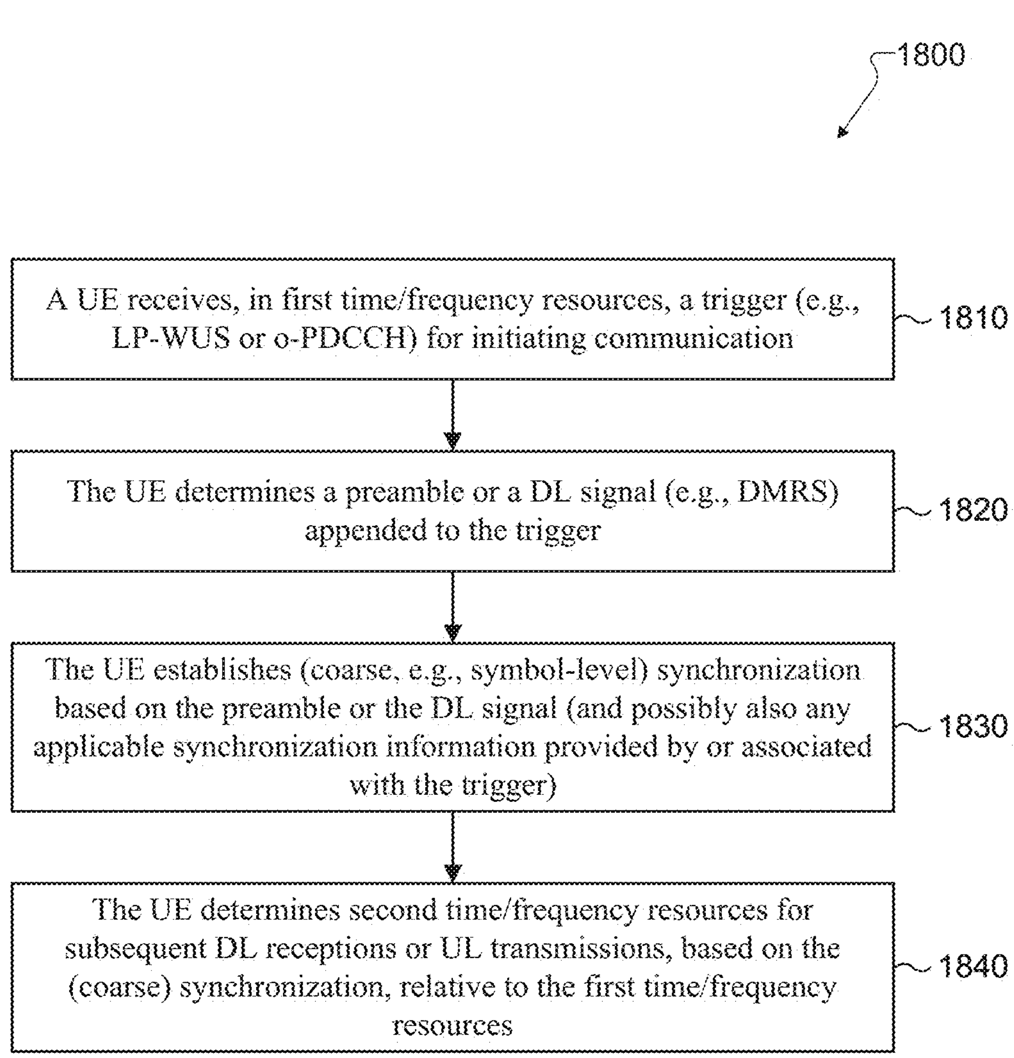
FIG. 18 illustrates a flowchart of an example UE procedure for relative synchronization according to embodiments of the present disclosure.

FIG. 18 illustrates a flowchart of an example UE procedure 1800 for relative synchronization according to embodiments of the present disclosure. For example, UE procedure 1800 for relative synchronization can be performed by the UE 116 of FIG. 3. This example is for illustration only and other embodiments can be used without departing from the scope of the present disclosure.

The procedure begins in 1810, a UE receives, in first time/frequency resources, a trigger (e.g., LP-WUS or o-PDCCH) for initiating communication. In 1820, the UE determines a (synchronization) preamble or a DL signal (e.g., DMRS) appended to the trigger. In 1830, the UE establishes (coarse, e.g., symbol-level) synchronization based on the preamble or the DL signal (and also any applicable information provided by or associated with the trigger). In 1840, the UE determines second time/frequency resources for subsequent DL receptions or UL transmissions, based on the (coarse) synchronization, relative to the first time/frequency resources.

Figure 19:
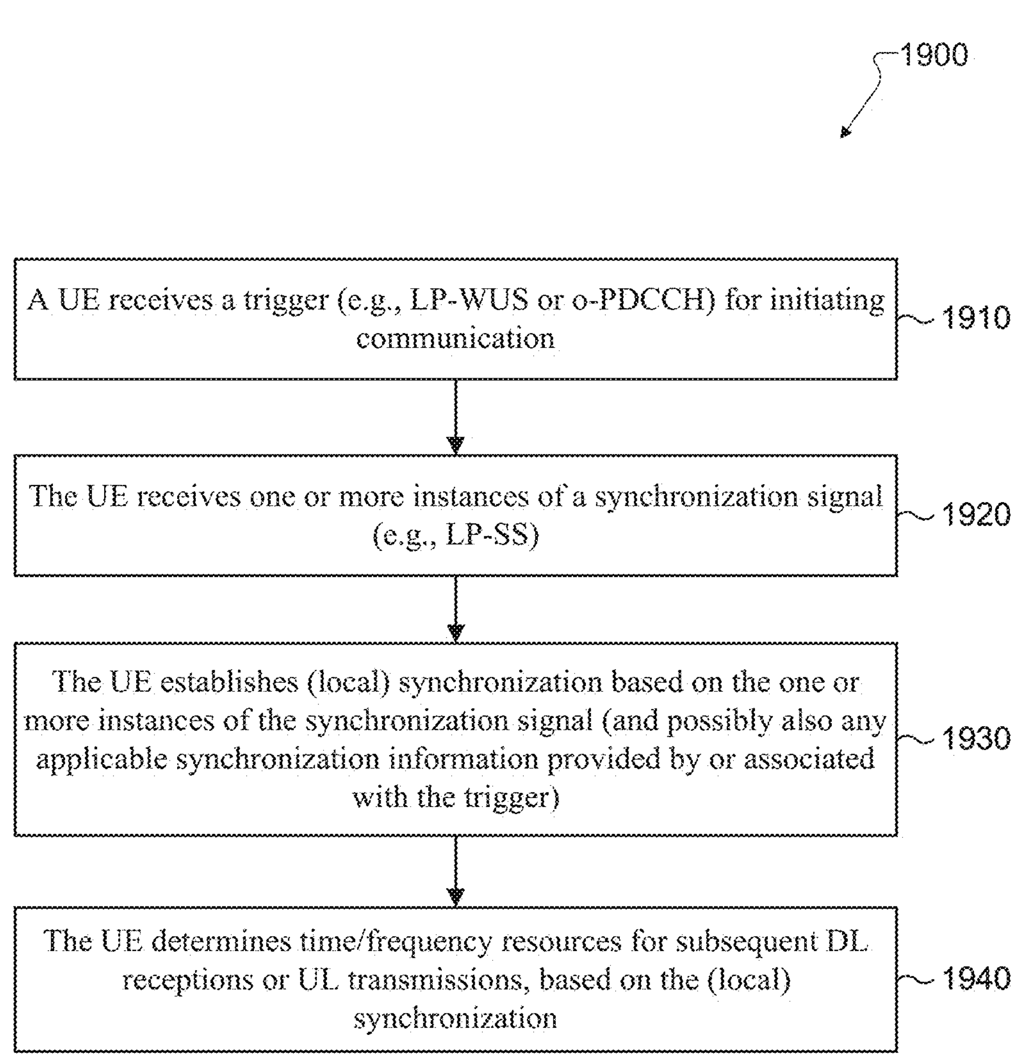
FIG. 19 illustrates a flowchart of an example UE procedure for relative synchronization according to embodiments of the present disclosure.

FIG. 19 illustrates a flowchart of an example UE procedure 1900 for relative synchronization according to embodiments of the present disclosure. For example, UE procedure 1900 for relative synchronization can be performed by the UE 111 of FIG. 1. This example is for illustration only and other embodiments can be used without departing from the scope of the present disclosure.

The procedure begins in 1910, a UE receives a trigger (e.g., LP-WUS or o-PDCCH) for initiating communication. In 1920, the UE receives one or more instances of a synchronization signal (e.g., LP-SS). In 1930, the UE establishes (local) synchronization based on the one or more instances of the synchronization signal (and also any applicable synchronization information provided by or associated with the trigger). In 1940, the UE determines time/frequency resources for subsequent DL receptions or UL transmissions based on the (local) synchronization.

In one embodiment, a UE can (start to) establish synchronization, such as DL synchronization, upon reception of a NW trigger, as described in one or more embodiments herein. For example, the UE does not attempt to perform cell search or DL synchronization before reception of the NW trigger. Such synchronization can be regarded as on-demand synchronization or NW-triggered synchronization. Depending on the UE capability or corresponding procedure, the established synchronization can be absolute or global in an extended time duration such as multiple operation rounds, or can be local within a limited time duration such as one operation round, or can be for a given transmission or reception or in between two or multiple transmissions or receptions. For example, the established synchronization can be based on a common NR synchronization signal such as SSB, or based on a simplified synchronization signal such as LP-SS, or may not be based on any synchronization signal, and, for example, use a synchronization preamble sequence appended to a given transmission or reception.

Various types of UEs or various procedures can be defined in terms of synchronization, based on whether or not a UE can maintain some level of (coarse/fine, or symbol/frame) synchronization. The specifications may support only one of the several UE types or one of the corresponding procedures (or a combination thereof), or may support multiple UE types or multiple procedures.

A first type of UEs, referred to as e.g. Type-S1 UEs, may not support (coarse or fine) synchronization, such as frame-level nor symbol-level synchronization. For example, the UE may not rely on a synchronization signal, such as LP-SS or PSS/SSS. For example, synchronization can be for a DL reception or UL transmission e.g. based on a preamble sequence appended to the corresponding DL reception or UL transmission, or can be relative to such DL reception or UL transmission (up to a certain limit, e.g., based on UE capability), such as a previous transmission or reception, for example, an immediately preceding transmission or reception.

For example, the UE can determine a start of (e.g., a starting symbol of) a DL reception. For example, the UE can determine a symbol boundary for a DL reception. For example, the UE can determine a relative time with respect to a previous DL reception. For example, a DL reception can be a reference time, and the UE can determine a certain time gap/duration (such as Tus/ms or Y symbols) from a first/last symbol of the DL reception (for example, for monitoring/receiving another DL reception, or for making an UL transmission).

For example, the UE can indicate a start of (e.g., a starting symbol of) an UL transmission. For example, the UE can determine a symbol boundary for an UL transmission.

Herein, "symbol" can refer to e.g. a modulation symbol, such as OOK symbol or ASK modulation. In another example, "symbol" can refer to a 5G NR OFDM symbol.

For example, a synchronization preamble can be a predetermined sequence of 0 s and 1 s or based on a predetermined sequence structure, such as with a predetermined number of 0 s and 1 s, and with a predetermined (different) symbol lengths for a 0 and a 1. For example, the synchronization preamble sequence can be based on M-sequence or PN-sequence, or ZC-sequence, and so on. Various methods or examples, as previously described for a sequence-based LP-WUS, can apply for such synchronization preamble.

In one example, a UE can, in principle, receive a DL reception at any point in time without any previous coordination information. Further conditions on timing of DL receptions may apply e.g. in terms of coexistence with signals or other UEs, such as 5G NR signals, such as reference signals or other signals or channels.

In one example, a NW trigger includes such a synchronization preamble sequence. In another example, the UE can determine a NW trigger based on its structure, and a separate synchronization preamble may not be needed for the NW trigger. For example, once the UE receives a NW trigger and initiates the communication, the UE can establish intra-reception timing or relative inter-reception timing based on synchronization preamble sequences, as previously described.

A time-domain tolerance or timing error (such as ±Y_tol μs/ms/symbols) can be defined for the UE, such as for DL reception, for example, when the UE uses synchronization based on a synchronization preamble sequence.

For example, a time-domain accuracy or tolerance may be defined for the o-PBCH/o-PDSCH reception, so that a coarse synchronization (for example, certain level of timing error at the UE) can be accommodated without impact on the o-PBCH/o-PDSCH reception and decoding performance.

With reference to FIG. 18, an example procedure for relative synchronization based on a preamble in the NW trigger is shown.

A second type of UEs, referred to as e.g. Type-S2 UEs, can support on-demand coarse synchronization, such as on-demand symbol-level synchronization with some residual time (or frequency) error, via sequence detection based on certain (simplified) synchronization signal such as LP-SS, which can be upon reception of NW trigger such as LP-WUS or o-PDCCH, as previously described in one or more embodiments herein. In another example, a sequence detection for the synchronization can be based on NR PSS/SSS without PBCH decoding.

For example, such an on-demand synchronization can be a local synchronization that applies to a limited time duration such as one (or few) UE operation rounds. For example, once a UE operation is complete, the UE may release the DL synchronization, or may not attempt to maintain the DL synchronization anymore (until a next NW trigger for the UE).

For example, the UE receives a NW trigger, as previously described, that implies or indicates to the UE to start DL synchronization. Upon detection of the NW trigger, the UE starts to search for and detect/receive the synchronization signal. The UE can establish absolute or relative timing based on the synchronization signal receptions.

For example, a synchronization signal can be based on one or multiple of: a low-power sync signal (LP-SS), based on OOK waveform, that is appended to the LP-WUS, or an LP-SS that is transmitted separately from the LP-WUS, or PSS/SSS with or without PBCH.

For example, an LP-SS can be based on a predetermined/preconfigured sequence, such as M-sequence, PN-sequence, ZC-sequence and so on, with a predetermined/preconfigured length (thereby a corresponding number of OOK symbols).

For example, (at least from gNB perspective), it is feasible that an LP-SS is transmitted in a burst (e.g., multiple transmissions) to accommodate multi-beam operation, such as an LP-SS index #1 in time resource #1 associated with gNB beam #1, and an LP-SS index #2 in time resource #2 associated with gNB beam #2, and so on.

For example, when a NW trigger or a separate PDCCH order initiates the RA procedure for the UE, and the UE detects an LP-SS index #2 as a good/best synchronization signal, the UE can select an RO for transmission of PRACH/o-PRACH that is associated with the LP-SS index #2. For example, the gNB (e.g., the BS 102) can determine to receive the PRACH/o-PRACH using a gNB Rx beam #2.

For example, upon reception of the NW trigger, the UE attempts to receive one or multiple instances of the synchronization signal, such as from 1 to 3 or up to 10 instances/copies/bursts of LP-SS to establish DL synchronization.

For example, the UE can expect that the UE can receives (at least) one LP-SS reception in any time period of length T microsecond or T milli-seconds, (or OOK symbols) after a most recent NW trigger (such as LP-WUS/o-PDCCH reception).

In one example, the gNB/Reader may not transmit (or the UE may not expect that the NW/Reader transmits) the synchronization signal, such as LP-SS, before transmitting the NW trigger. For example, LP-SS is an on-demand signal that is activated and transmitted when the NW trigger indicates initiation of the transmission.

In another example, the synchronization signal is a periodic (and cell-specific) signal that is transmitted by the NW/Reader based on a certain periodicity, independent of transmission or not of a NW trigger. For example, the gNB/Reader may transmit the LP-SS even if the gNB/Reader has not transmitted any (new) NW triggers.

For example, the UE can establish absolute DL synchronization, such as absolute timing, when a time-domain resource allocation, such as one or more of: symbol indexes, subframe indexes, half-frame indexes, and so on, for the synchronization signal are known (e.g., predetermined or preconfigured) to the UE.

For example, the UE can establish relative DL synchronization, such as relative timing, when a time-domain resource allocation for the synchronization signal may not be known to the UE. For example, the UE can determine the timing relative to a time-domain resources of synchronization signal, such as first/last OOK symbols of an LP-SS, without being able to determine an absolute timing with respect to a reference resource grid, such as frame numbers, subframe numbers, and so on.

Upon synchronization, the UE can establish DL timing to the level of symbol timing (with some potential residual error) and up to a periodicity of the synchronization signal.

For example, the UE can establish DL timing to the level of OOK symbol timing, up to a periodicity of the LP-SS or up to a periodicity of the NW trigger such as LP-WUS. For example, the UE can determine DL timing at least relative to timing/period of LP-SS or timing/period of NW trigger monitoring occasions (such as LP-WUS reception occasions). For example, the UE may not know the frame boundary (unless the NW trigger provides additional information on the frame timing, such as SFN, or half-frame bit, and so on).

In another example, various methods mentioned herein can apply for an "on-UE-demand" synchronization. For example, the synchronization may be triggered internally by the UE, without any external/NW trigger, such as based on UE detecting an event or based on arrival of UL traffic at the UE (e.g., device-originated autonomous or DOA traffic, also referred to as DO-DOA traffic type). Such synchronization can be referred to as e.g., "on-UE-demand" or based on UE trigger.

With reference to FIG. 19, an example procedure for relative synchronization based on a preamble in the NW trigger is shown.

A third type of UEs, referred to as e.g. Type-S3 UEs, can support on-demand fine synchronization, such as on-demand frame-level synchronization with limited residual time (or frequency) error, via both sequence detection and channel decoding based on e.g. SSB (PSS/SSS/PBCH), which can be upon reception of NW trigger such as LP-WUS or o-PDCCH, as previously described in one or more embodiments herein. In one example, a sequence detection and channel decoding for the synchronization can be based on LP-SS detection along with o-PBCH/o-PDSCH decoding. In yet another example, the on-demand fine synchronization can be based on o-PDCCH decoding that can include a fixed header/preamble or a DMRS.

The above flowchart(s) illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of the present disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A method for an electronic device, the method comprising:

identifying an identity (ID) for the electronic device or an ID for a group of electronic devices that includes the electronic device;

receiving a first trigger in a monitoring occasion (MO) from a set of MOs, wherein the first trigger includes:

a signal for timing acquisition that comprises a predetermined sequence based on an on-off-keying (OOK) waveform, and a physical channel based on the OOK waveform, wherein the physical channel is after the signal;

determining, based on the first trigger, indication for:

the ID for the electronic device or the ID for the group of electronic devices, and a paging cause; and transmitting or receiving a number of signals or channels based on the paging cause.

2. The method of claim 1, wherein the ID for the electronic device is at least one of:

an electronic product code (EPC) or a truncated EPC, a value of an internal flag or an internal state for the electronic device, a first user equipment (UE) ID assigned by a core network (CN), a second UE ID assigned by a radio access network (RAN), a third UE ID associated with IDLE/INACTIVE state operation, or a fourth UE ID assigned by an application layer or by an external management entity.

3. The method of claim 1, wherein the first trigger provides information for at least one of:

parameters for timing acquisition, parameters for the set of MOs, parameters for a random access (RA) procedure, and parameters for subsequent receptions or transmissions.

4. The method of claim 1, wherein the set of MOs includes one of:

all time-domain resources, a first MO in a first time-domain resource within a first time-window and second MOs in second time-domain resources that periodically follow the first MO based on a periodicity, or a third MO in a third time-domain resource within a third time-window and fourth MOs in fourth time-domain resources within a fourth time-window, wherein the fourth time-window starts after the third time-domain resource.

5. The method of claim 1, wherein:

the signal is a preamble, the physical channel is appended to the signal, and the paging cause is associated with at least one of inventory, command, positioning or proximity detection, and read from or write to memory.

6. The method of claim 1, wherein:

the paging cause is associated with inventory, the number of signals or channels include channels associated with a random access (RA) procedure, and the RA procedure is initiated upon reception of:

the first trigger, or a second trigger, wherein the second trigger is received in a MO after reception of the first trigger.

7. The method of claim 6, further comprising:

identifying, from the first trigger or in the second trigger, information for a number of sub-channels in a frequency domain;

determining a sub-channel from the number of sub-channels; and transmitting, in a random access occasion (RO), a physical channel based on the OOK waveform, wherein:

the RO is in the determined sub-channel, the RO is at a time-domain offset after the first trigger or after the second trigger, and the time-domain offset is predetermined, indicated in the first trigger, or indicated in the second trigger.

8. An electronic device comprising:

a processor configured to identify an identity (ID) for the electronic device or an ID for a group of electronic devices that includes the second electronic device; and a transceiver operably coupled with the processor, the transceiver configured to receive a first trigger in a monitoring occasion (MO) from a set of MOs, wherein the first trigger includes:

a signal for timing acquisition that comprises a predetermined sequence based on an on-off-keying (OOK) waveform, and a physical channel based on the OOK waveform, wherein the physical channel is after the signal;

wherein the processor is further configured to determine, based on the first trigger, indication for:

the ID for the electronic device or the ID for the group of electronic devices, and a paging cause; and wherein the transceiver is further configured to transmit or receive a number of signals or channels based on the paging cause.

9. The electronic device of claim 8, wherein the ID for the electronic device is at least one of:

an electronic product code (EPC) or a truncated EPC, a value of an internal flag or an internal state for the electronic device, a first user equipment (UE) ID assigned by a core network (CN), a second UE ID assigned by a radio access network (RAN), a third UE ID associated with IDLE/INACTIVE state operation, and a fourth UE ID assigned by an application layer or by an external management entity.

10. The electronic device of claim 8, wherein the first trigger provides information for at least one of:

parameters for timing acquisition, parameters for the set of MOs, parameters for a random access (RA) procedure, and parameters for subsequent receptions or transmissions.

11. The electronic device of claim 8, wherein the set of MOs includes one of:

all time-domain resources, a first MO in a first time-domain resource within a first time-window and second MOs in second time-domain resources that periodically follow the first MO based on a periodicity, or a third MO in a third time-domain resource within a third time-window and fourth MOs in fourth time-domain resources within a fourth time-window, wherein the fourth time-window starts after the third time-domain resource.

12. The electronic device of claim 8, wherein:

the signal is a preamble, the physical channel is appended to the signal, and the paging cause is associated with at least one of inventory, command, positioning or proximity detection, and read from or write to memory.

13. The electronic device of claim 8, wherein:

the paging cause is associated with inventory, the number of signals or channels include channels associated with a random access (RA) procedure, and the RA procedure is initiated upon reception of:

the first trigger, or a second trigger, wherein the second trigger is received in a MO after reception of the first trigger.

14. The electronic device of claim 13, wherein:

the processor is further configured to:

identify, from the first trigger or in the second trigger, information for a number of sub-channels in a frequency domain, and determine a sub-channel from the number of sub-channels, the transceiver is further configured to transmit, in a random access occasion (RO), a physical channel based on the OOK waveform, the RO is in the determined sub-channel, the RO is at a time-domain offset after the first trigger or after the second trigger, and the time-domain offset is predetermined, indicated in the first trigger, or indicated in the second trigger.

15. A first electronic device comprising:

a processor configured to identify an identity (ID) for a second electronic device or an ID for a group of electronic devices that includes the second electronic device; and a transceiver operably coupled with the processor, the transceiver configured to transmit a first trigger in a monitoring occasion (MO) from a set of MOs, wherein the first trigger includes:

a signal for timing acquisition that comprises a predetermined sequence based on an on-off-keying (OOK) waveform, and a physical channel based on the OOK waveform, wherein the physical channel is after the signal;

wherein the first trigger indicates:

the ID for the second electronic device or the ID for the group of electronic devices, and a paging cause; and wherein the transceiver is further configured to receive or transmit a number of signals or channels based on the paging cause.

16. The first electronic device of claim 15, wherein:

the signal is a preamble, the physical channel is appended to the signal, the paging cause is associated with at least one of inventory, command, positioning or proximity detection, and read from or write to memory, and the ID for the second electronic device is at least one of:

an electronic product code (EPC) or a truncated EPC, a value of an internal flag or an internal state for the second electronic device, a first user equipment (UE) ID assigned by a core network (CN), a second UE ID assigned by a radio access network (RAN), a third UE ID associated with IDLE/INACTIVE state operation, and a fourth UE ID assigned by an application layer or by an external management entity.

17. The first electronic device of claim 15, wherein the first trigger provides information for at least one of:

parameters for timing acquisition, parameters for the set of MOs, parameters for a random access (RA) procedure, and parameters for subsequent receptions or transmissions.

18. The first electronic device of claim 15, wherein the set of MOs includes one of:

all time-domain resources, a first MO in a first time-domain resource within a first time-window and second MOs in second time-domain resources that periodically follow the first MO based on a periodicity, or a third MO in a third time-domain resource within a third time-window and fourth MOs in fourth time-domain resources within a fourth time-window, wherein the fourth time-window starts after the third time-domain resource.

19. The first electronic device of claim 15, wherein:

the paging cause is associated with inventory, the number of signals or channels include channels associated with a random access (RA) procedure, and the RA procedure is initiated upon transmission of:

the first trigger, or a second trigger, wherein the second trigger is transmitted in a second MO after transmission of the first trigger.

20. The first electronic device of claim 19, wherein:

the first trigger or the second trigger includes information for a number of sub-channels in a frequency domain, the transceiver is further configured to receive, in a random access occasion (RO), a physical channel based on the OOK waveform, the RO is in a sub-channel from the number of sub-channels, the RO is at a time-domain offset after the first trigger or after the second trigger, and the time-domain offset is predetermined, indicated in the first trigger, or indicated in the second trigger.

* * * * *